United States Patent
Strauss et al.

(10) Patent No.: US 11,061,865 B2
(45) Date of Patent: *Jul. 13, 2021

(54) BLOCK ALLOCATION FOR LOW LATENCY FILE SYSTEMS

(71) Applicant: Amazon Technologies, Inc., Seattle, WA (US)

(72) Inventors: Jacob A. Strauss, Boston, MA (US); Michael Robert Frasca, Cambridge, MA (US); Neal John Charbonneau, Medford, MA (US)

(73) Assignee: Amazon Technologies, Inc., Seattle, WA (US)

( * ) Notice: Subject to any disclaimer, the term of this patent is extended or adjusted under 35 U.S.C. 154(b) by 1 day.

This patent is subject to a terminal disclaimer.

(21) Appl. No.: 16/678,969

(22) Filed: Nov. 8, 2019

(65) Prior Publication Data

US 2020/0125535 A1 Apr. 23, 2020

Related U.S. Application Data

(63) Continuation of application No. 15/081,652, filed on Mar. 25, 2016, now Pat. No. 10,474,636.

(51) Int. Cl.
*G06F 16/17* (2019.01)
*G06F 3/06* (2006.01)
*G06F 16/182* (2019.01)

(52) U.S. Cl.
CPC ........ *G06F 16/1727* (2019.01); *G06F 3/0604* (2013.01); *G06F 3/064* (2013.01);
(Continued)

(58) Field of Classification Search
CPC .. G06F 16/182; G06F 16/1727; G06F 3/0613; G06F 3/604; G06F 3/0631; G06F 3/064; G06F 3/0643; G06F 3/067
See application file for complete search history.

(56) References Cited

U.S. PATENT DOCUMENTS 6,654,772 B1 11/2003 Crow et al.
6,842,754 B2 1/2005 Muntz
(Continued)

FOREIGN PATENT DOCUMENTS

| CN | 1481636 | 3/2004 |
|---|---|---|
| WO | 1999038095 | 7/1999 |
| WO | 2015153671 | 10/2015 |

OTHER PUBLICATIONS

U.S. Appl. No. 15/081,647, filed Mar. 25, 2016, Jacob A. Strauss.
(Continued)

*Primary Examiner* — Kalpit Parikh

(74) *Attorney, Agent, or Firm* — Robert C. Kowert; Kowert, Hood, Munyon, Rankin & Goetzel, P.C.

(57) ABSTRACT

An LL server (LLS) may process metadata requests for a file system in LL mode in a distributed file storage services (DFSS). For requests that require allocating blocks to file system objects in the backing store, instead of relying on distributed transactions used for file systems in high throughput (HT) mode, a pool of blocks may be pre-allocated for the LL file system in the backing store, and a free block list may be maintained in local memory of the LLS. When a metadata operation requires blocks to be allocated, the blocks are assigned to the respective object from the blocks in the pool. A background process may allocate new blocks in the pool upon the number of blocks dropping below a threshold, or upon block allocation rate for the file system increasing.

20 Claims, 25 Drawing Sheets

(52) U.S. Cl.
CPC ............ *G06F 3/067* (2013.01); *G06F 3/0613* (2013.01); *G06F 3/0631* (2013.01); *G06F 3/0643* (2013.01); *G06F 16/182* (2019.01)

(56) References Cited

U.S. PATENT DOCUMENTS

| | | | |
|---|---|---|---|
| 7,043,637 | B2 | 5/2006 | Bolosky et al. |
| 7,240,114 | B2 | 7/2007 | Karamanolis et al. |
| 8,112,395 | B2 | 2/2012 | Patel et al. |
| 8,112,452 | B2 | 2/2012 | Adya et al. |
| 8,205,090 | B2 | 6/2012 | Oom Temudo de Castro et al. |
| 8,229,985 | B2 | 7/2012 | Turner et al. |
| 8,285,689 | B2 | 10/2012 | Du et al. |
| 8,356,162 | B2 | 1/2013 | Muff et al. |
| 8,429,248 | B1 | 4/2013 | Ketrenos et al. |
| 8,489,658 | B2 | 7/2013 | Turner et al. |
| 8,539,008 | B2 | 9/2013 | Faith et al. |
| 8,578,127 | B2 | 11/2013 | Thatcher et al. |
| 9,171,009 | B1 | 10/2015 | Faibish et al. |
| 10,474,636 | B2 | 11/2019 | Strauss et al. |
| 2002/0023156 | A1 | 2/2002 | Chujo et al. |
| 2002/0138559 | A1 | 9/2002 | Ulrich et al. |
| 2004/0088297 | A1 | 5/2004 | Coates et al. |
| 2004/0103105 | A1 | 5/2004 | Lindblad et al. |
| 2004/0148306 | A1 | 7/2004 | Moulton et al. |
| 2004/0181605 | A1 | 9/2004 | Nakatani et al. |
| 2005/0027795 | A1 | 2/2005 | San Andres et al. |
| 2007/0067332 | A1 | 3/2007 | Gallagher et al. |
| 2008/0104032 | A1 | 5/2008 | Sarkar |
| 2010/0011037 | A1 | 1/2010 | Kazar |
| 2010/0095059 | A1 | 4/2010 | Kisley et al. |
| 2010/0205231 | A1 | 8/2010 | Cousins |
| 2011/0060887 | A1 | 3/2011 | Thatcher et al. |
| 2011/0307534 | A1 | 12/2011 | Peng et al. |
| 2012/0011398 | A1 | 1/2012 | Eckhardt et al. |
| 2012/0192018 | A1 | 7/2012 | Norman et al. |
| 2012/0233310 | A1 | 9/2012 | Agarwala et al. |
| 2012/0254126 | A1 | 10/2012 | Mitra et al. |
| 2013/0227236 | A1 | 8/2013 | Flynn et al. |
| 2014/0310499 | A1 | 10/2014 | Sundararaman et al. |
| 2014/0344507 | A1 | 11/2014 | Piggin et al. |

OTHER PUBLICATIONS

U.S. Appl. No. 15/081,651, filed Mar. 25, 2016, Jacob A. Strauss.
U.S. Appl. No. 14/231,088, filed Mar. 31, 2014, Pradeep Vincent.
U.S. Appl. No. 14/230,378, filed Mar. 31, 2014, Jacob A. Strauss.
U.S. Appl. No. 14/231,077, filed Mar. 31, 2014, Jacob A. Strauss.
U.S. Appl. No. 14/231,057, filed Mar. 31, 2014, Pradeep Vincent.
U.S. Appl. No. 14/701,464, filed Apr. 30, 2015, Tarang Gupta.
Pierre Lombard, et al., "nfsp: A Distributed NFS Server for Clusters of Workstations", Parallel and Distributed Processing Symposium., Proceedings International, IPDPS 2002, Abstracts and CD-ROM. IEEE, 2001, pp. 1-14.
Scott A. Brandt, et al., "Efficient Metadata Management in Large Distributed Storage Systems", Proceeding of the 20th IEEE, 11th NASA Goddard Conference on Mass Storage Systems and Technologies (MSS'03), Computer Society, 2003, pp. 1-9.
S. Shepler, et al., "Network File System (NFS) Version 4 Minor Version 1 Protocol", The Internet Engineering Task Force (IETF), Retrieved from URL: http://www.hjp.at/doc/rfc/rfc5661.html on Mar. 25, 2016, 2010, pp. 1-618.
Uresh Vahalia, et al., "Metadata Logging in an NFS Server", IN USENIX, 1995, pp. 1-12.
USENIX, "A Directory Index for Ext2", Daniel Phillips, Sep. 19, 2001, pp. 1-13.
"HyperDex: A Distributed, Searchable Key-Value Store" Robert Escriva et al., Aug. 13-17, 2012, pp. 1-12.
"Paxos Made Simple", Leslie Lamport, Nov. 1, 2001, pp. 1-14.
2012 Storage Networking Industry Association, "An Overview of NFSv4: NFSv4.0, NFSv4/1, pNFS, and proposed NFSv4.2 features" Jun. 2012, pp. 1-14.
Amazon Web Services "Amazon Virtual Private Cloud, User Guide, API Version" Feb. 1, 2014, pp. 1-155.
U.S. Appl. No. 14/231,116, filed Mar. 31, 2014, Matti Juhani Oikarinen.
U.S. Appl. No. 14/231,106, filed Mar. 31, 2014, Matti Juhani Oikarinen.
U.S. Appl. No. 14/231,098, filed Mar. 31, 2014, Pradeep Vincent.
U.S. Appl. No. 14/231,095, filed Mar. 31, 2014, Joshua Samuel Hendrickson.
U.S. Appl. No. 14/231,070, filed Mar. 31, 2014, Matti Juhani Oikarinen.
U.S. Appl. No. 14/231,063, filed Mar. 31, 2014, Matti Juhani Oikarinen.
U.S. Appl. No. 14/231,047, filed Mar. 31, 2014, Pradeep Vincent.
U.S. Appl. No. 14/701,462, filed Apr. 30, 2015 Jacob David Luszcz, et al.
International Search Report and Written Opinion, dated Jul. 10, 2015, Amazon Technologies, Inc., pp. 1-16.

BLOCK ALLOCATION FOR LOW LATENCY FILE SYSTEMS

This application is a continuation of U.S. patent application Ser. No. 15/081,652, filed Mar. 25, 2016, which is hereby incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

Some large provider networks implement a variety of storage services, such as services that implement block-level devices (volumes) or objects that can be modeled as arbitrary bit buckets accessible via respective URLs (uniform resource locators). However, a number of applications running at data centers of a provider network may still face limitations with respect to their use of some of the more common storage-related programmatic interfaces, such as various industry-standard file system interfaces. Some industry-standard file systems may have been designed prior to the large-scale deployment of network-accessible services, and may therefore support consistency models and other semantics that are not straightforward to implement in distributed systems in which asynchronous interactions, failures of individual components and network partitions or networking-related delays are all relatively common.

Figure 1:
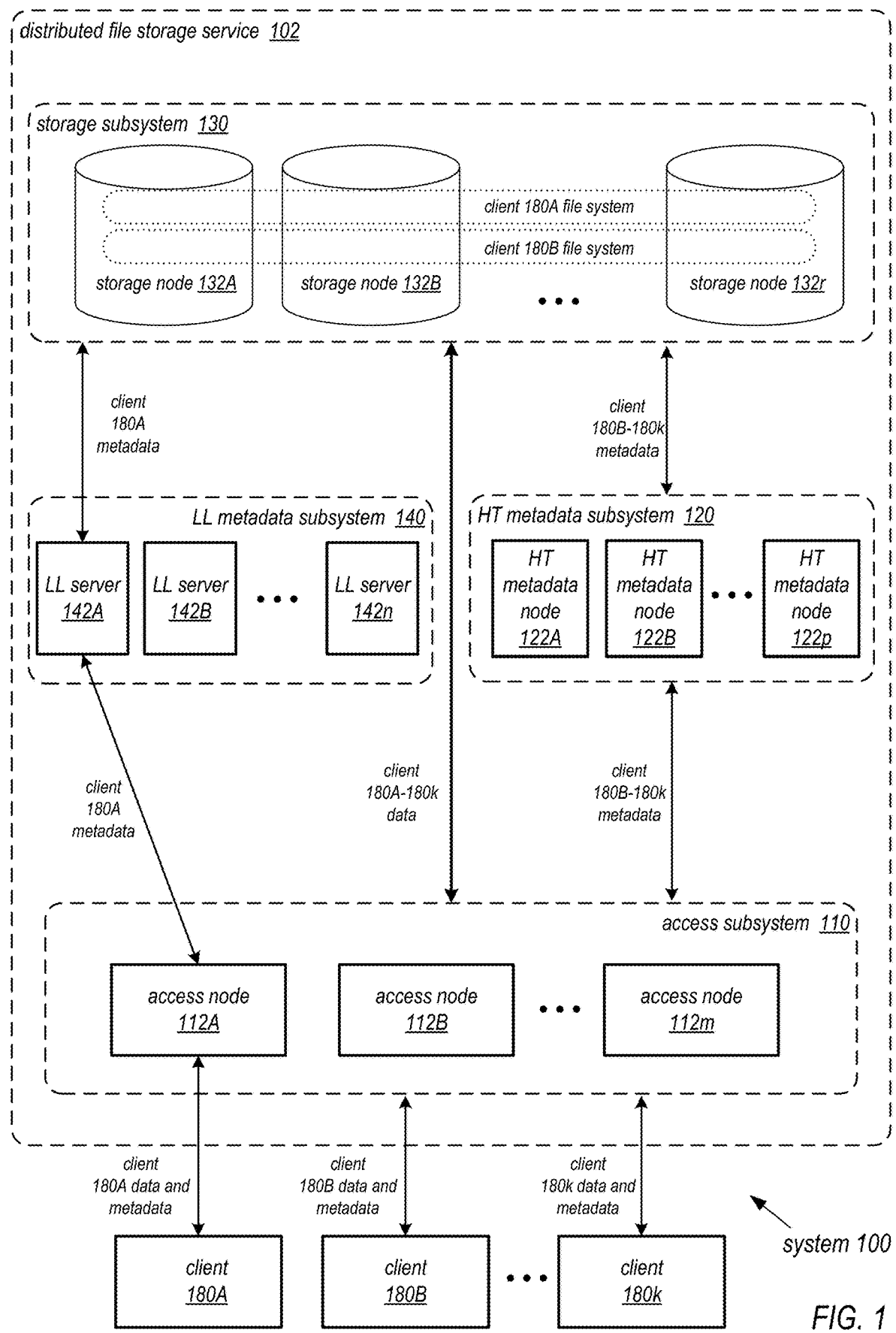
FIG. 1 provides a high-level overview of a distributed file storage service that includes a low latency metadata subsystem (LLMS), according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for providing low latency access to a multi-tenant distributed file storage service (DFSS) are described. Embodiments of a low latency metadata subsystem (LLMS) for a DFSS is described that resides between DFSS client instances and backend storage implemented by a storage subsystem of the DFSS, for example a block-based backend storage subsystem (BSS). An example DFSS in which embodiments of the LLMS may be implemented is illustrated in FIGS. 16 through 19 and described later in this document in the section titled Distributed File Storage Service. In some embodiments the DFSS and LLMS may be implemented using resources of a provider network, and may be used for file-related operations by multiple different applications or clients running at compute instances of the provider network. FIGS. 20 through 23 and the section titled Example provider network environment illustrate an example provider network environment in which embodiments may be implemented, according to some embodiments. The LLMS may reduce latency of individual operations when compared to a high-throughput metadata subsystem (HTMS) of the DFSS, and may thus increase throughput of client workloads which consist of sequences of dependent operations.

In some embodiments, the DFSS provides a file service (e.g., a network file system (NFS) v4.0 service, or other file system technology services) to clients running on customer's client instances, for example in a provider network environment. The DFSS stores data and metadata for each client's file system(s) in a file store on a storage subsystem. Broadly defined, data is the content of the files in a client's file system, and metadata is information about the files, directories, and other structures of the file system. Data operations on the file system may include any update to the content of a file or files in the file system, for example reads, writes, appends, and deletes. Metadata operations on the file system may include any operation that affects the structures of the file system, for example creating, deleting, moving, or renaming files or directories, and truncate and append operations on files.

The HTMS prioritizes overall file system throughput levels and scalability over single-client application performance. Applications whose overall performance depends on sequences of serial operations may tend to run more slowly (e.g., with higher latency for file system operations) against HTMS than they do against a single-box server (e.g., an NFS server). The performance disparity of sequential applications using HTMS is a consequence of distributed, multi-zone availability and scalability provided by the DFSS.

In some embodiments, the DFSS distributes each file system's data and metadata over blocks of data stored in a large set of replicated state machines (an extent is a single instance of a replicated state machine). Each storage node in the backend storage subsystem (BSS) of the DFSS may participate in multiple extents. No single storage node in the BSS knows the state of an entire file system in the DFSS, or even the entire state of a file or directory. Metadata operations which atomically modify multiple blocks (e.g., creating a file edits both the new file and its containing directory) use distributed transaction chains based on two-phase-commit.

In some embodiments, client instances communicate with a set of hubs or access nodes in an access subsystem of the DFSS. The access nodes serve as file system (e.g., NFS) protocol endpoints, and issue data and metadata requests to the BSS. The access nodes provide the appearance of a single server even though there are multiple active access nodes for each file system, and a client may switch between access nodes based on server-side load decisions. File system operations against a set of access nodes are fully consistent: metadata operations are serializable across the entire file system, as are each page component (e.g., 32 KB or less) of larger read and write operations. Applications using DFSS see the expected close-to-open semantics, or read-after-write for applications which eschew file system client caches. Close-to-open cache consistency guarantees that when a file is closed, subsequent opens will see the latest changes to the file. Read-after-write consistency guarantees that new file system objects and data added to a file system are immediately visible to clients of the file system.

In some embodiments, client instances running in different availability zones can each use and modify a DFSS file system through an access node in their local availability zones, and failures in one availability zone do not prevent other availability zones from continuing all operations normally.

In at least some embodiments, all file system data in DFSS using HTMS is coded across replicas in multiple availability zones, which means that all read or write operations require one or more cross-availability zone roundtrips. Performance targets for DFSS using HTMS are defined in terms of file system-wide throughput and IOPS. These performance targets may result in significantly longer application-visible delays than a single-node file system server would deliver for two reasons: 1) with a single-node server many operations (e.g., opening an existing file, retrieving a file's attributes) require only an in-memory lookup, so that the most significant component of overall latency is the network hop between client and server, and 2) many application level operations decompose into multiple file system operations. Both of these points of comparison are significantly slower when operating against HTMS than when operating against a local file system.

For example, in an NFS file system, an application which creates many files in a loop, such as TAR, performs multiple NFS operation for each file, e.g. CREATE, WRITE, CLOSE, GETATTR, and SETATTR. Of these operations, only the WRITE pipelines with the others. As a result, each application iteration takes considerable time (e.g., 45-60 milliseconds (ms)) per file using HTMS. On a single-node NFS server, only the CLOSE operation modifies state and waits for the storage system at all, and the other operations only require a round trip between the client and the NFS server. Thus, the same client running against a same-availability zone single server running NFS exporting a file system on a DFSS volume would take much less time (e.g., 3-4 ms) per file, and thus the client may generally experience lower latency for the operations than they would for a file system using HTMS.

In addition to applications which are inherently serial, the latencies of DFSS using HTMS also limit an important class of multithreaded applications. For example, multithreaded or multiprocess workloads that open many files, such as a web server serving content out of DFSS, serialize file open and close requests from that application, and thus may reduce benefits of distributing files across the backend storage fleet. Except for these serial operations, this class of applications would be a good match for DFSS using HTMS.

This limit arises from a combination of a file system's method of handling non-idempotent operations, and an implementation choice of file system clients that creates a single operation sequence per user. Some file systems, such as NFS v4.0, may permit each one of these operation sequences to only have one operation outstanding at a time. This combination means that operations (such as opening or closing files) performed by different threads or processes serialize all operations. This property affects DFSS using HTMS because open operations take longer in HTMS, and thus are more likely to limit overall application performance.

Low Latency Metadata Subsystem (LLMS)

Embodiments of an LLMS may thus be provided that target single-client sequential workloads. The HTMS of the DFSS provides support for high-throughput (HT) access to file systems in the DFSS. The LLMS adds support for low latency (LL) access to file systems in the DFSS, but also preserves support for HT access to file systems through the HTMS.

In at least some embodiments, the LLMS includes low latency servers (LLSs) that are added to the DFSS data plane. One or more file systems may be assigned to each LLS in the LLMS. An LLS serves as the single authoritative owner of a given file system's metadata structure and operations. However, a file system may be transitioned to a different LLS, for example in cases where an access node cannot access the LLS currently assigned to the file system. Serving as a single point between a DFSS client instance that accesses the file system and the backend storage of the DFSS, the LLS can decide the order that file system metadata operations take place without coordinating with any other servers or nodes on the data plane, and may respond to metadata requests immediately without needing to check with any other DFSS component. In addition, an LLS may cache file system metadata read from the backend storage subsystem (BSS) (e.g., metadata pages), and thus at least some metadata read requests may be fulfilled from the metadata cache without having to access the metadata from the BSS.

In some embodiments, a file system may run in either HT mode using the HTMS or in LL mode using the LLMS. In some embodiments, the DFSS may provide methods and apparatus whereby file systems may transition between the two modes. Thus, a file system may be in HT mode or in LL mode at different times. Some DFSS components or services may be adapted for use in both modes, so the DFSS architecture may contain both LL and HT versions of components and services, for example LL and HT metadata nodes as described herein.

In HT mode, file system requests proceed from a file system client (e.g., a network file system (NFS) client) running on a customer's client instance through a load balancing service to a DFSS hub server (referred to as an access node) in an access layer or subsystem of the DFSS. The access node converts the file system operations into either metadata requests directed to any HT metadata node in HTMS, or data read or write operation directed to a specific backend storage subsystem (BSS) extent for that data block. For metadata write operations, the HTMS converts these into distributed transactions which ultimately result in BSS read and write operations.

In LL mode, client file system requests proceed to a DFSS access node as in HT mode. The access node converts the file system operations into metadata requests and data read or write requests. However, if the access node determines that the file system is currently in LL mode, the access node sends all metadata requests to an LLS to which that file system is assigned. The access nodes send data read and write requests for the file system directly to the BSS as they do for file systems in HT mode.

While embodiments are described as sending metadata for file systems to one of the metadata subsystems and data for file systems to the BSS, in some embodiments some of a file system's data may be sent to the metadata systems, for example as part of particular metadata operations.

In at least some embodiments, an LLS includes an LL metadata node which translates file system-level metadata operations into block reads and transactional writes, and an LL metadata manager that maintains a metadata page cache and a metadata file system journal for each file system assigned to the LLS. The LLS may satisfy most read requests for a file system directly from the file system's page cache, rather than requiring roundtrips to read pages from the BSS. For metadata writes, instead of using distributed transactions as is done in HT mode, the LLS first writes metadata operations into journal pages of a per-file-system journal, and returns success to clients a soon as the journal writes are durable. In some embodiments, the journal pages may be stored in blocks in the BSS, but the metadata journal operations may have lower latency than HT mode transactions because journal writes for all affected pages may occur in parallel. In addition, in some embodiments, the LLS and journal for a file system may be collocated in the provider network (e.g., in the same region or zone) to reduce or eliminate network hops between regions or zones of the network when performing the journal writes. In some embodiments, the LLS flushes journal writes to the backing BSS blocks and trims those entries from the journal; however, these operations may be performed asynchronously with and thus not in-line with client requests and other operations of the LLS.

Embodiments of the LLMS may provide similar durability and consistency properties as does the HTMS, and may tolerate the complete failure of any single server as well as the complete failure of larger sets of servers such as loss of a complete available zone. The LLMS also provides for consistent and atomic metadata operations.

FIG. 1 provides a high-level overview of a distributed file storage service (DFSS) that includes a low latency metadata subsystem (LLMS), according to at least some embodiments. As shown, a system 100 may include a DFSS 102 that may be logically divided into subsystems. For example, a DFSS 102 may include a storage subsystem 130, an access subsystem 110, a high throughput (HT) metadata subsystem 120, and a low latency (LL) metadata subsystem. Each subsystem may include a plurality of nodes or servers, such as storage nodes 132A . . . 132r of storage subsystem 130, HT access nodes 112A . . . 112m of HT access subsystem 110, HT metadata nodes 122A . . . 122p of HT metadata subsystem 120, and LL servers 142A . . . 142n of LL metadata subsystem 140. Each node may, for example, be implemented as a set of processes or threads executing at a respective physical or virtualized server in some embodiments. The number of nodes or servers in any given subsystem may be modified independently of the number of nodes or servers in the other subsystems in at least some embodiments, thus allowing deployment of additional resources as needed at any of the subsystems (as well as similarly independent reduction of resources at any of the subsystems). The term "server" may be used herein as an equivalent of the term "node".

In at least some embodiments, the storage nodes 132 may store extents, for example using some combination of solid state drives (SSDs) and rotating disks. An extent, which may for example include some number of gigabytes of (typically but not always) contiguous storage space at some set of physical storage devices, may represent a unit of storage replication. Thus, a number of physical replicas of any given logical extent may be stored. Each extent replica may be organized as a number of physical pages, with the pages representing the smallest units in which reads or writes are implemented within the DFSS 102. As discussed below with respect to FIG. 18, a given file store object (e.g., a file or a metadata structure) may be organized as a set of logical blocks, and each logical block may be mapped to a set of pages within a data extent. Metadata for the file store object may itself include a set of logical blocks (potentially of different sizes than the corresponding logical blocks for data), and may be stored in pages of a different extent. In some embodiments, replicated state machines may be used to manage updates to extent replicas.

The access subsystem 110 may present one or more file system interfaces to clients 180A-180k, such as file system APIs (application programming interfaces). In at least some embodiments, a set of load balancers (e.g., software or hardware devices that may be configured independently of the DFSS 102 itself) may serve as intermediaries between clients 180A-180k of the DFSS 102 and the access subsystem 110. In some cases, at least some aspects of load balancing functionality may be implemented within the access subsystem 110 itself. In at least some embodiments the access nodes 112A-112m may represent service endpoints established within the appropriate network fabric that is concurrently being used by clients 180A-180k. In some embodiments, special network addresses associated with isolated virtual networks may be assigned to access nodes 112A-112m. In some embodiments, access nodes 112A-112m may authenticate an incoming client connection, e.g., based on the client's network identity as well as user identity. In some cases, access nodes 112A-112m may interact with identity/authentication services similar to Active Directory Service or Kerberos. Some file system protocols that may be supported by the distributed file storage service 102 (such as NFSv4 and SMB2.1) may require a file server to maintain state, for example pertaining to locks and opened file identifiers. In some embodiments, durable server state, including locks and open file states, may be handled by the HT metadata subsystem 120 for file systems in HT mode or LL servers 142 for file systems in LL mode rather than the access subsystem 110, and as a result the access subsystem 110 may be considered a largely stateless server fleet that can be scaled up and down as needed. In some embodiments, for file systems in HT mode, access nodes 112A-112m may cache metadata state pertaining to various file store objects, and may use the cached metadata to submit at least some internal I/O requests directly to storage nodes 132A-132n without requiring interactions with metadata subsystem 120.

In some embodiments, HT metadata subsystem 120 may be responsible for managing various types of file store metadata structures, including for example the logical equivalents of inodes, file/directory attributes such as access control lists (ACLs), link counts, modification times, real file size, logical block maps that point to storage subsystem 110 pages, and the like. In addition, the metadata subsystem 120 may keep track of the open/closed state of the file store objects and of locks on various file store objects in some embodiments. The metadata subsystem 120 may sequence and coordinate operations so as to maintain desired file store object consistency semantics, such as the close-to-open semantics expected by NFS clients. The metadata subsystem 120 may also ensure sequential consistency across operations that may involve multiple metadata elements, such as renames, deletes, truncates and appends, e.g., using the distributed transaction techniques described below. Although the metadata subsystem 120 is logically independent of the storage subsystem 130, in at least some embodiments, persistent metadata structures may be stored at the storage subsystem 130. In such embodiments, even though the metadata structures may be physically stored at the storage subsystem 130, the metadata subsystem 120 nodes may be responsible for such tasks as identifying the particular storage nodes 132 to be used, coordinating or sequencing storage operations directed to the metadata, and so on. In at least some embodiments, the metadata subsystem 120 may reuse some of the state management techniques employed by the storage subsystem 130, such as the storage subsystem 130's consensus-based state replication machinery.

In HT mode, requests proceed from a client 180 (e.g., a network file system (NFS) client) running on a customer's client instance through a load balancing service to an access node 112 in the access subsystem 110 of the DFSS. The access node 112 converts the file system operations into either metadata requests directed to any HT metadata node 122 in HTMS 120, or data read or write operation directed to a specific backend storage subsystem (BSS) 130 extent for that data block. For metadata write operations, the HTMS 120 converts these into distributed transactions which ultimately result in BSS 130 data read and write operations.

Figure 2:
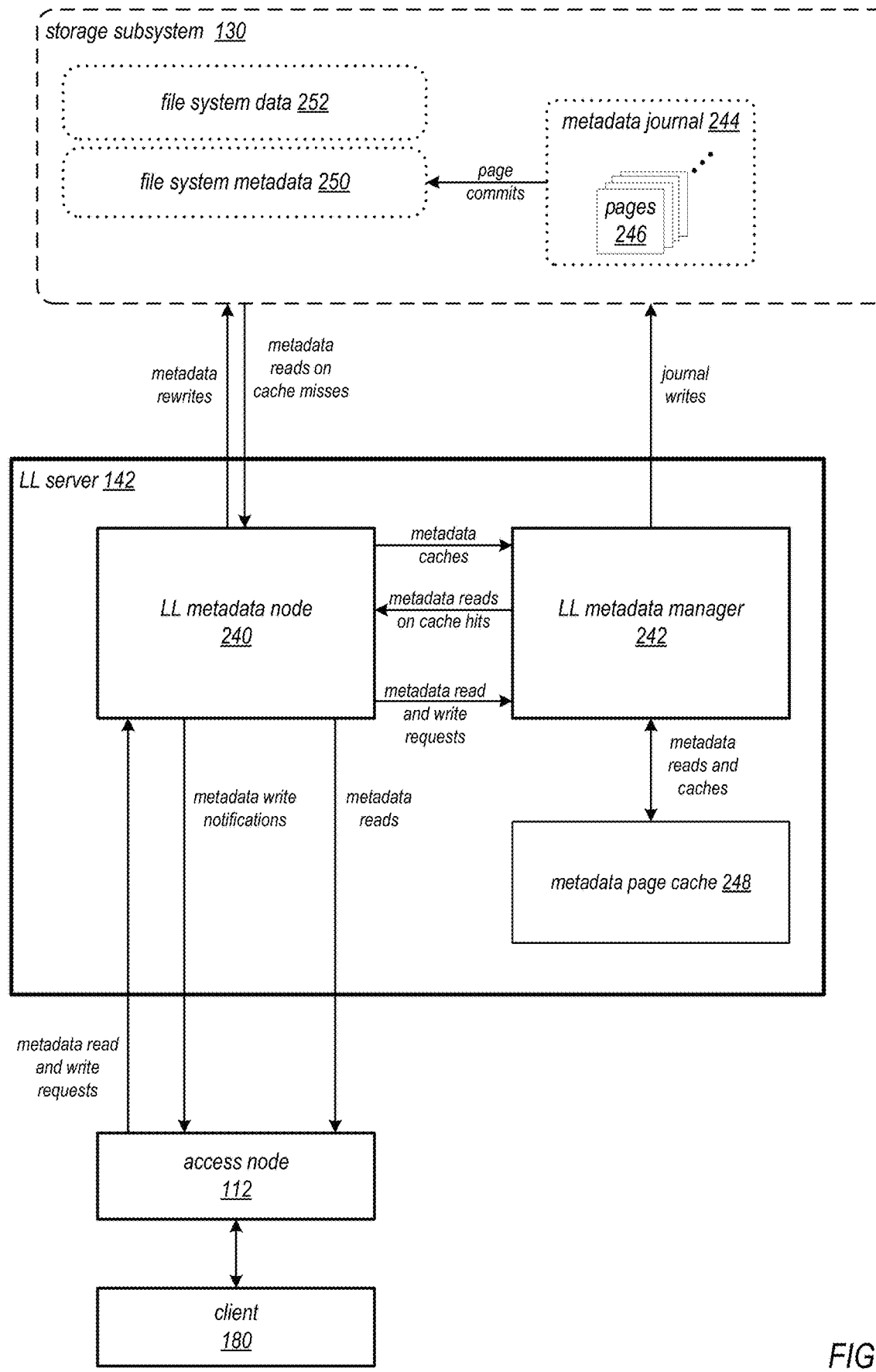
FIG. 2 illustrates components and operations of a low latency server (LLS) in an LLMS, according to at least some embodiments.

In LL mode, client 180 requests proceed to a DFSS access node 112. However, if the access node 112 determines that the respective file system is currently in LL mode, the access node 112 sends all metadata requests to an LLS 142 for that file system. An example LLS 142 is illustrated in FIG. 2, according to some embodiments. The access node 112 sends data read and write requests for the file system directly to the BSS 130 as is done in HT mode.

For example, as illustrated in FIG. 1, a file system of client 180A is in LL mode. Requests from client 180A are sent to an access node 112A of access subsystem 110. Access node 112A determines that the file system is in LL mode, and thus sends metadata requests for the file system to an LL server 142A which has been designated as the LL server 142 for that file system. LL server 142A handles the metadata requests as described in reference to FIG. 2. Data read and write requests for the file system are sent to respective extent(s) in the BSS 130. For file systems of clients 180B-180k in HT mode, access nodes 112A-112m send metadata requests to the HT metadata subsystem 120, where the metadata requests may be handled by any of the HT metadata nodes 122A-122p; data read and write requests for the file systems in HT mode are also sent to respective extent(s) in the BSS 130.

Figure 12:
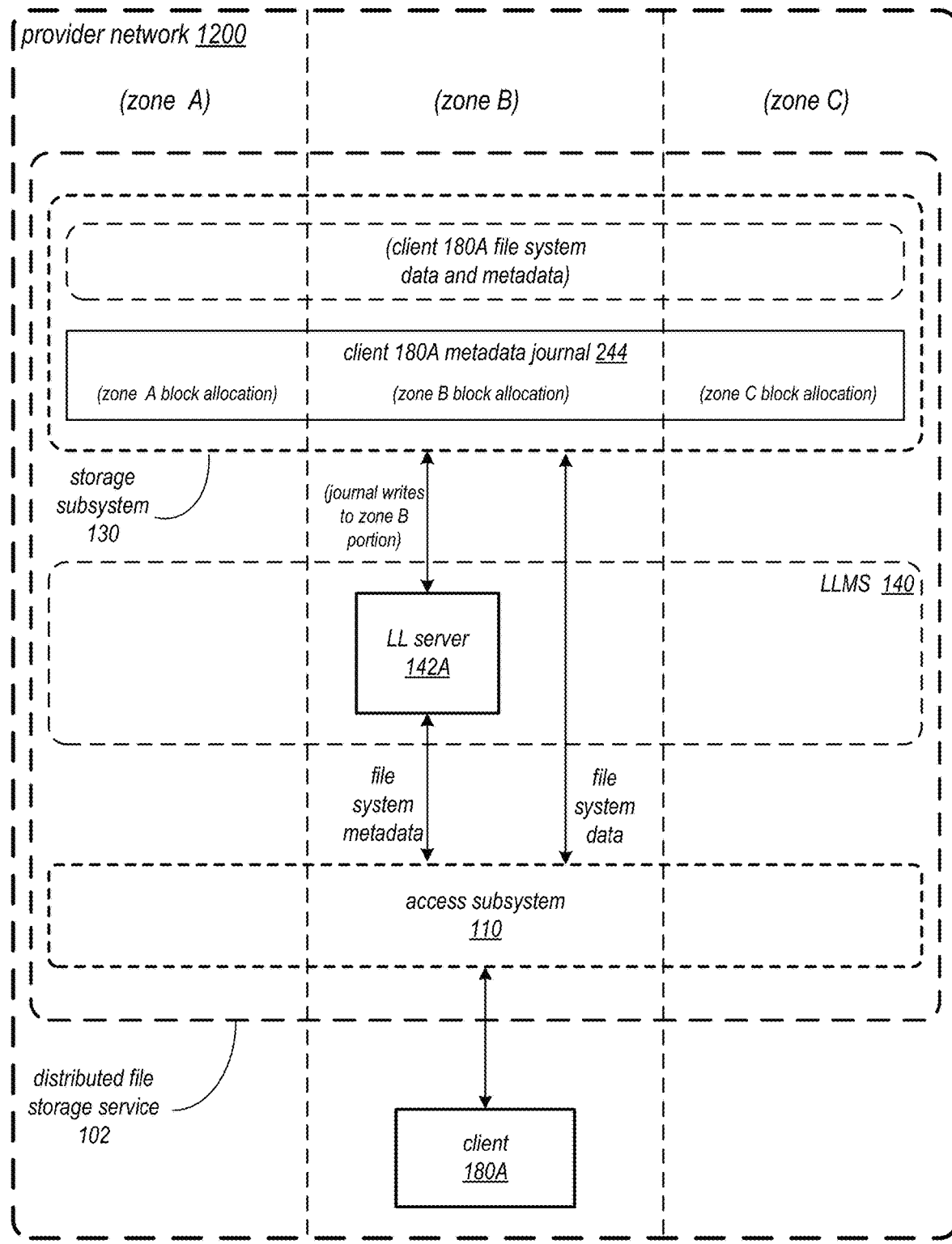
FIG. 12 illustrates an example provider network environment that includes multiple regions or zones in which embodiments of a DFSS that implements an LLMS as described herein may be implemented.
Figure 24:
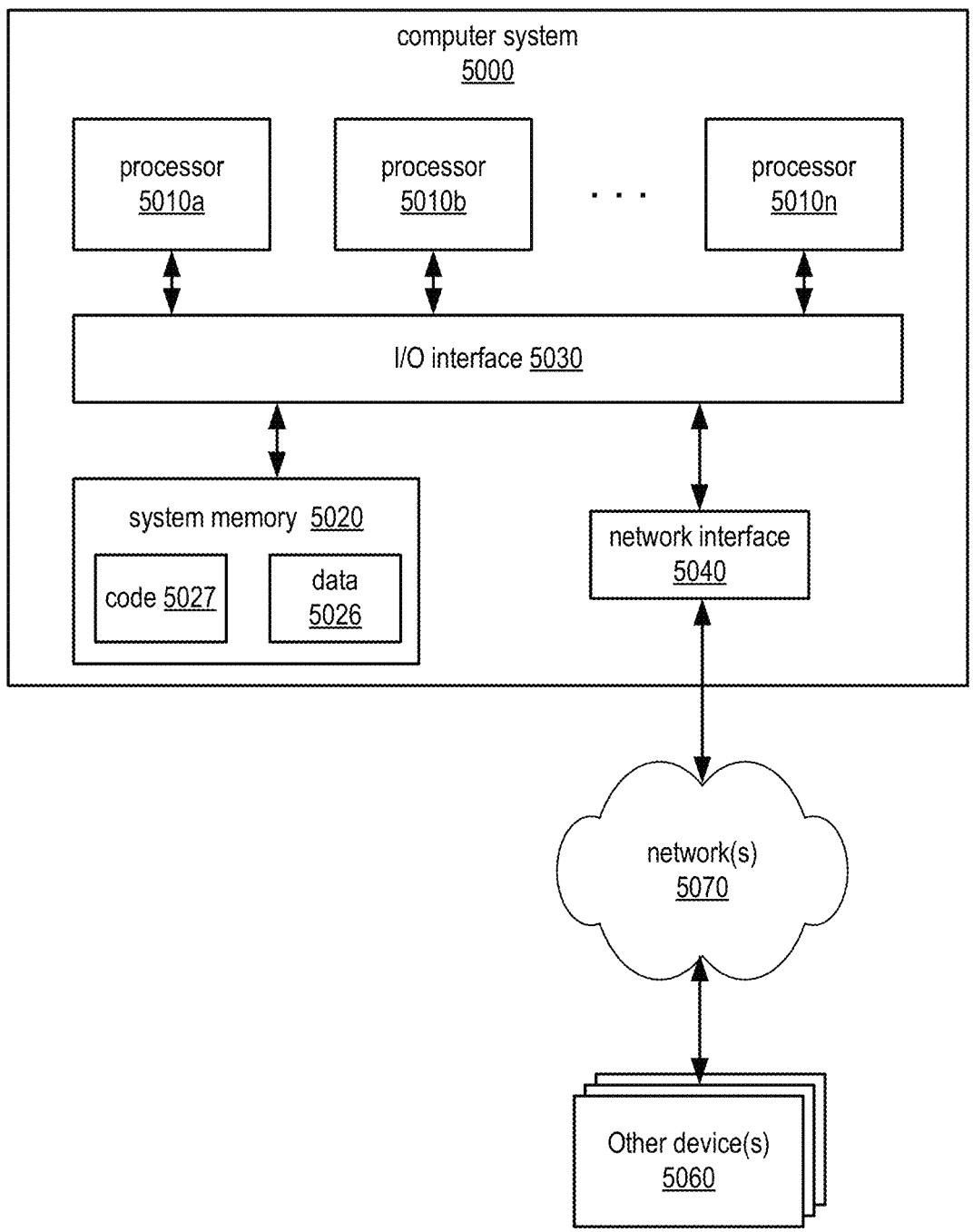
FIG. 24 is a block diagram illustrating an example computer system that may be used in some embodiments.

FIG. 2 illustrates components and operations of a low latency server (LLS) of an LLMS for a file system in LL mode, according to at least some embodiments. An LLS 142 as illustrated in FIG. 2 may be used in the DFSS 102 of FIG. 1, in some embodiments. In some embodiments, each LLS 142 in the LLMS 140 may be assigned to one or more file systems of the DFSS 102 that is in LL mode. Alternatively, in some embodiments, there may be one LLS 142 in the LLMS 140 for each file system of the DFSS 102 in LL mode. In some embodiments, each LLS 142 may be implemented as or by a separate physical computing device (or two or more computing devices) in the LLMS 140 on the provider network. An example computing device that may be used in embodiments is illustrated in FIG. 24. In some embodiments, each LLS 142, or one or more components of an LLS 142 as illustrated in FIG. 2, may be instantiated as a separate virtual machine (VM) on a physical computing device (or on two or more physical computing devices) in the LLMS 140 on the provider network; the LLMS 140 may include one or more physical computing devices each including one or more of the LLS 142 instances or components thereof. In some embodiments, the LLMS 140 may be distributed across two or more zones of the provider network, with each zone including LLS 142 instance(s) for zone-local file system(s), for example as illustrated in FIG. 12. In some embodiments, the LLMS 140 may include an LLS management service that may allocate existing or provision new LLS 142 instances for file systems, for example when a new file system is being initialized in LL mode, when a file system is transitioning from HT mode to LL mode, when an LLS 142 instance for a file system in LL mode fails, or when a file system is migrated to a different zone of a multi-zone provider network.

In some embodiments, an LLS 142 may include, but is not limited to, an LL metadata node 240 and an LL metadata manager 242. In some embodiments, each LLS 142 may manage a metadata page cache 248 and a metadata journal 244 for file systems assigned to the LLS. In some embodiments, the file systems assigned to the LLS share the same metadata cache, but each has a separate metadata journal. Alternatively, in some embodiments, instead of a shared cache, each file system may have a separate metadata cache.

In some embodiments, a file system's metadata page cache 248 may be implemented in memory and/or storage of or local to the LL server 142 assigned to the file system. In some embodiments, metadata page cache 248 may be ephemeral, and thus not persisted when transitioning the file system to a new LL server 142.

In some embodiments, a file system's metadata journal 244 may be implemented in persistent storage. In some embodiments, as shown in FIG. 2, metadata journal 244 may be implemented in the backend storage subsystem 130 that also stores the file system's data 252 and metadata 250. In some embodiments, metadata journal 244 may instead be implemented in a different storage subsystem or storage service external to the LL server 142, or in storage or memory of or local to the LL server 142.

In some embodiments, a metadata journal 244 for a file system may be allocated in the storage subsystem 130 upon assignment of an LL server 142 for the file system when the file system is initially created in LL mode, or when the file system is first converted from HT mode to LL mode. In some embodiments, the journal 244 may be of fixed size; for example, by default a journal 244 may be allocated that can store 100, 200, or some other appropriate number of pages 246. In some embodiments, the size of the journal 244 may be dynamically increased by allocating additional storage space, or decreased by deallocating storage space, for example based on heuristics including but not limited to journal write and page commit rates. In some embodiments, a file system's journal 244 may persist when transitioning the file system to a new LL server 142 for the file system, for example when an LLS 142 instance for the file system in LL mode fails, or when the file system is migrated to a different zone of a multi-zone provider network. Methods for transitioning to a new LLS 142 instance for a file system in LL mode are described elsewhere in this document. In some embodiments, a file system's journal 244 may persist when the file system is converted from LL mode to HT mode, and from HT mode to LL mode.

In some embodiments, an LL metadata node 240 and an LL metadata manager 242 may be implemented as processes or virtual machines (VMs) within the LL server 142, or on different devices that together may be considered as an LL server 142 as described herein. In some aspects, the LL metadata node 240 may operate similarly to the HT metadata nodes 122 of the HTMS 120. However, the LL metadata node 240 operates differently than the HT metadata nodes 122 as described below.

For file systems in HT mode, for metadata read and write requests, an access node 112 sends the requests to one of the HT metadata nodes 122 in the HT metadata subsystem 120. In HT mode, there is no dedicated node 122 for a file system, and so the requests may go to any of the nodes 122.

In some embodiments, for read requests in HT mode, the HT metadata node 122 converts the file system requests into distributed transactions and makes remote transaction calls to different extents across the backend storage subsystem 130 to fetch the requested metadata blocks from the backing store. The HT metadata node 122 assembles the fetched metadata and returns it to the access node 112, which reformats the metadata and returns it to the requesting client 180. In the backing store, the metadata blocks to be read may be spread across multiple extents and zones. For read operations that can be parallelized, the overall delay (latency) may be the longest (in terms of round trip time) of any of the backend operations. However, many read operations cannot be parallelized, for example a block A may need to be read to determine another block B that needs to be read; note that block B may be in a different extent, on a different storage node 132, or in a different zone, and thus these operations may involve a significant round trip time. In these cases, the total latency may be the sum of all the round trip times.

In some embodiments, for write requests in HT mode, the HT metadata node 122 may first perform read operations to determine locations of metadata that is to be modified, for example to read a file's inode, to read a block map to determine where a particular portion of a file is, and so on. The HT metadata node 122 then generates a commit transaction message and sends the message to a transaction manager that makes remote transaction calls to different extents across the backend storage subsystem 130 to modify the metadata blocks in the backing store. Once the metadata writes have all been completed (committed in the backing store), the HT metadata node 122 notifies the access node 112. Thus, total latency for a write request includes the latency for the initial read operations plus the longest latency for any of the transactional operations to modify the metadata blocks in the backing store.

In some embodiments, for file systems in LL mode, for metadata read and write requests, an access node 112 determines an LL server 142 for the file system and sends the requests to the LL metadata node 240 on the server 142. Each file system in LL mode is assigned to a particular one of the LL servers 142 in the LLMS, and so the requests for the file system may all go to the same LL metadata node. If the access node 112 cannot locate or communicate with the LL server 142 for the file system, or if the LL server 142 to which request(s) are sent responds that the file system is not assigned to it, then the access node 112 may communicate with the LLMS 110 to assign another LL server 142 to the file system. An LL server 142 transition process may then be performed, for example as described later in this document.

In some embodiments, for metadata read requests in LL mode, instead of making remote transaction calls to different extents across the backend storage subsystem 130 to fetch the requested metadata blocks from the backing store as is done in HT mode, the LL metadata node 240 sends the read request to the LL metadata manager 242 on the LL server 142. The LL metadata manager 242 checks the metadata page cache 248 to determine if the requested metadata is locally cached. For cache hits, the LL metadata manager 242 returns the requested metadata to the LL metadata node 240. For cache misses, the LL metadata manager 242 notifies the LL metadata node 240, which may then get the metadata from the backend storage subsystem 130 in a similar fashion as described above for the HT metadata nodes 122. The LL metadata node 240 assembles the metadata fetched from the cache 248 and/or the backend storage system 130 and returns it to the access node 112, which reformats the metadata and returns it to the requesting client 180. Metadata fetched from the backend storage system 130 for cache misses is also cached to the local metadata cache 248. For file systems and LL metadata nodes 240 that have been running for a while, most if not all of the file system metadata may be locally cached in the metadata page cache 248 and thus in LL mode most if not all metadata read operations may be performed without accessing the backend storage system 130 and thus with significantly reduced latency than is provided in HT mode.

In some embodiments, the low latency server 142 may perform one or more operations using the metadata that was read from the cache 248 and/or fetched from the backend storage subsystem 130 as described above. In some cases, the operations may include fetching additional metadata from the cache 248 and/or the backend storage subsystem 130. The LL server 142 may return results of the operation(s) to the access node 112 that sent the metadata request; the results may, but do not necessarily, include at least some of the metadata that was read from the cache 248 or fetched from the backend storage subsystem 130. In some embodiments, for at least some metadata requests, the low latency server 142 may use the metadata internally, for example as part of a sequence of operations in performing the metadata request such as reading pages, deciding what writes to issue, and so on, and may only return a final result of the operations to the access node 112. The access node 112 may further process and/or reformat the results of the operation(s), and may return the final results to the requestor, for example a client 180.

In some embodiments, the LL metadata node 240 may rewrite pages to the BSS 130 in some cases, for example to update a slot number or identifier (slot ID) of a page that was fetched from the BSS 130 before caching the page in metadata page cache 248 when transitioning from HT to LL mode.

For metadata write requests in LL mode, the LL metadata node 240 may generate a commit transaction message similar to the commit transaction message generated by an HT metadata node 122 in HT mode. However, instead of sending the message to a transaction manager that makes remote transaction calls to different extents across the backend storage subsystem 130 to modify the metadata blocks in the backing store, the LL metadata node 240 sends the commit transaction message to the LL metadata manager 242 on the LL server 142. In some embodiments, the LL metadata manager 242 may perform validation of the transaction, for example to verify that the write transaction is correctly ordered with respect to all other transactions for the file system. If the validation succeeds, the LL metadata manager 242 generates one or more journal write requests for the metadata write operation and sends the journal write requests to the backend storage subsystem 130 to be stored in pages 248 in the metadata journal 244 on the backend storage subsystem 130. In at least some embodiments, the journal write requests can be parallelized. Once the LL metadata manager 242 receives an indication from the backend storage subsystem 130 that the journal writes have been committed to the metadata journal 244, the LL metadata manager 242 informs the LL metadata node 240, which in turn notifies the access node 112 that the request has been fulfilled (i.e., that the metadata write has been committed to the journal 244). Thus, instead of having to wait for all of the transactional operations to modify the metadata blocks affected by the metadata write request to be committed in the backend storage subsystem 130 as in HT mode, in LL mode the LL metadata node 240 only needs to wait for the (possibly parallelized) journal write requests to be committed to the metadata journal 244 to inform the access node 112, thus significantly reducing the latency at the access node 112 for metadata write operations when compared to similar metadata operations for file systems in HT mode.

While not shown in FIG. 2, in some embodiments, a journal flushing process may commit the journal pages 246 from the file system's journal 244 to extents in the backend storage subsystem 130. Committing the journal pages 246 may, for example, involve committing the actual metadata modifications indicated by the respective journal pages 246 to blocks in various extents in the backend data store 130. The journal pages 246 may be, but are not necessarily, flushed from the journal 244 in FIFO order. In at least some embodiments, journal flushing is performed asynchronously to the metadata operations being performed by the LL server 142. Although performed asynchronously to the metadata operations being performed by the LL server 142, the journal flushing process may flush pages 246 from the journal 244 at a rate that ensures there is free space in the journal 244 for future journal writes received from the LL metadata manager 242.

As noted above, in some embodiments, the LL metadata manager 242 may perform validation of the transaction, for example to verify that the write transaction is correctly ordered with respect to all other transactions for the file system. If validation fails, the LL metadata manager 242 informs the LL metadata node 240, which in some embodiments may retry the write request, for example by re-performing any reads (e.g., of inodes, block maps, etc.) necessary for the write request, generating a new commit transaction message, and submitting the message to the LL metadata manager 242.

While metadata read and write requests for a file system are generally described herein as being initiated by a client 180 associated with the file system, metadata read and write requests may be initiated by other components of the DFSS 102. For example, an access node 112 may itself generate metadata read and/or write requests for a file system, or other nodes in one of the subsystems may generate read and/or wrote requests for a file system. Thus, the requests may be broadly described as coming from a source, where the source may be a client 180, an access node 112, or some other entity or node in the DFSS 102.

Figure 3:
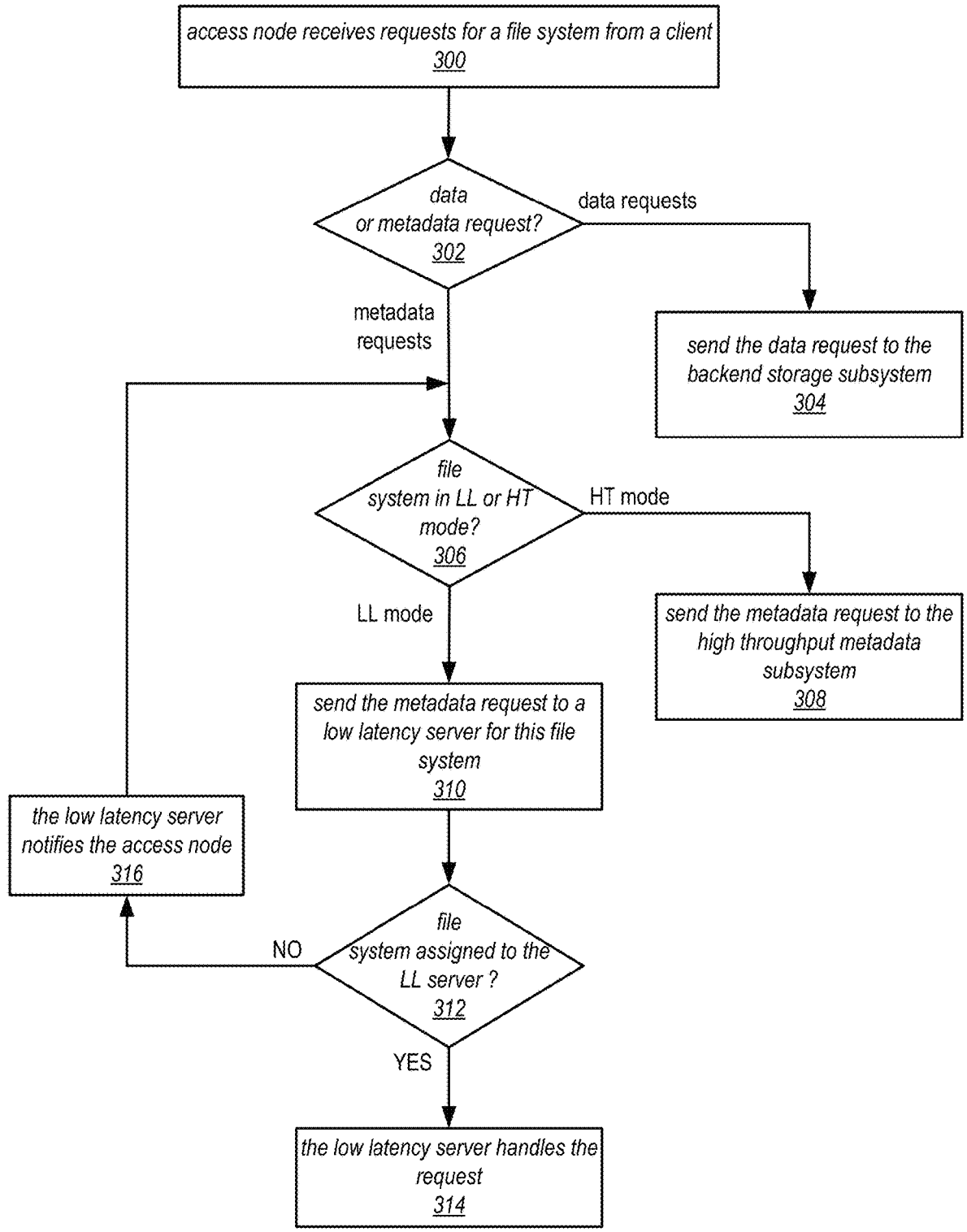
FIG. 3 is a high-level flowchart of a method of operation of an access node when processing file system requests from clients in a distributed file storage service (DFSS) that includes an LLMS and a high-throughput metadata subsystem (HTMS), according to some embodiments.

FIG. 3 is a high-level flowchart of a method of operation of an access node 112 when processing file system requests from clients 180 in a DFSS 102 that includes an LLMS 140 and an HTMS 120, according to some embodiments. As indicated at 300, an access node 112 receives requests for a file system from a DFSS client 180. At 302, the access node 112 determines whether the requests are data or metadata requests. For data requests, the access node 112 sends the data requests (both read and write requests) to the backend storage subsystem 130, as indicated at 304.

Figure 13:
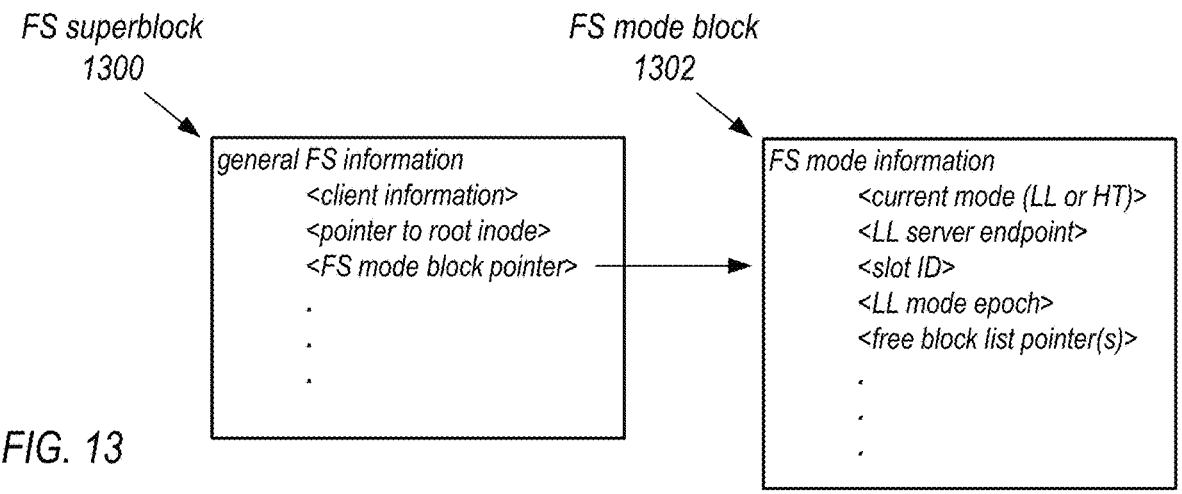
FIG. 13 illustrates an example superblock for a file system, according to some embodiments.

For metadata requests, at 306, the access node 112 determines whether the file system is in LL mode or HT mode. In some embodiments, each file system in the DFSS 102 has a data structure (referred to as a superblock) associated with it that includes information about the file system in the DFSS. FIG. 13 illustrates an example superblock for a file system, according to some embodiments. A file system (FS) superblock 1300 may include information about the file system, for example where the file system's inodes are, information about the client that owns the file system, and so on. In some embodiments, the superblock 1300 may include fields that contain file system (FS) mode information for the file system, or alternatively the FS mode information may be included in a block attached or linked to the superblock 1300 that may be referred to as an FS mode block 1302 as shown in FIG. 13. The FS mode information may, for example, include an indication of which mode (LL or HT) the file system is currently in, and if in LL mode, an indication of the current low latency (LL) server 142 for the file system (e.g., an LL server endpoint address). The FS mode information may include other information for the FS in LL mode, for example an indication of a slot ID of the journal 244 for the file system, an indication of a current LL mode "epoch" for the file system that is, for example, used (and incremented) when transitioning to a new LL server 142 for the file system, and an indication of or link to one or more free lists of pre-allocated blocks for the file system which may collectively be referred to as a block pool (described later in this document). The access node 112 may thus access the file system's superblock 1300 to determine its current mode and, if in LL mode, the current LL server 142 for the file system (e.g., as indicated in the FS mode block 1302).

Figure 4:
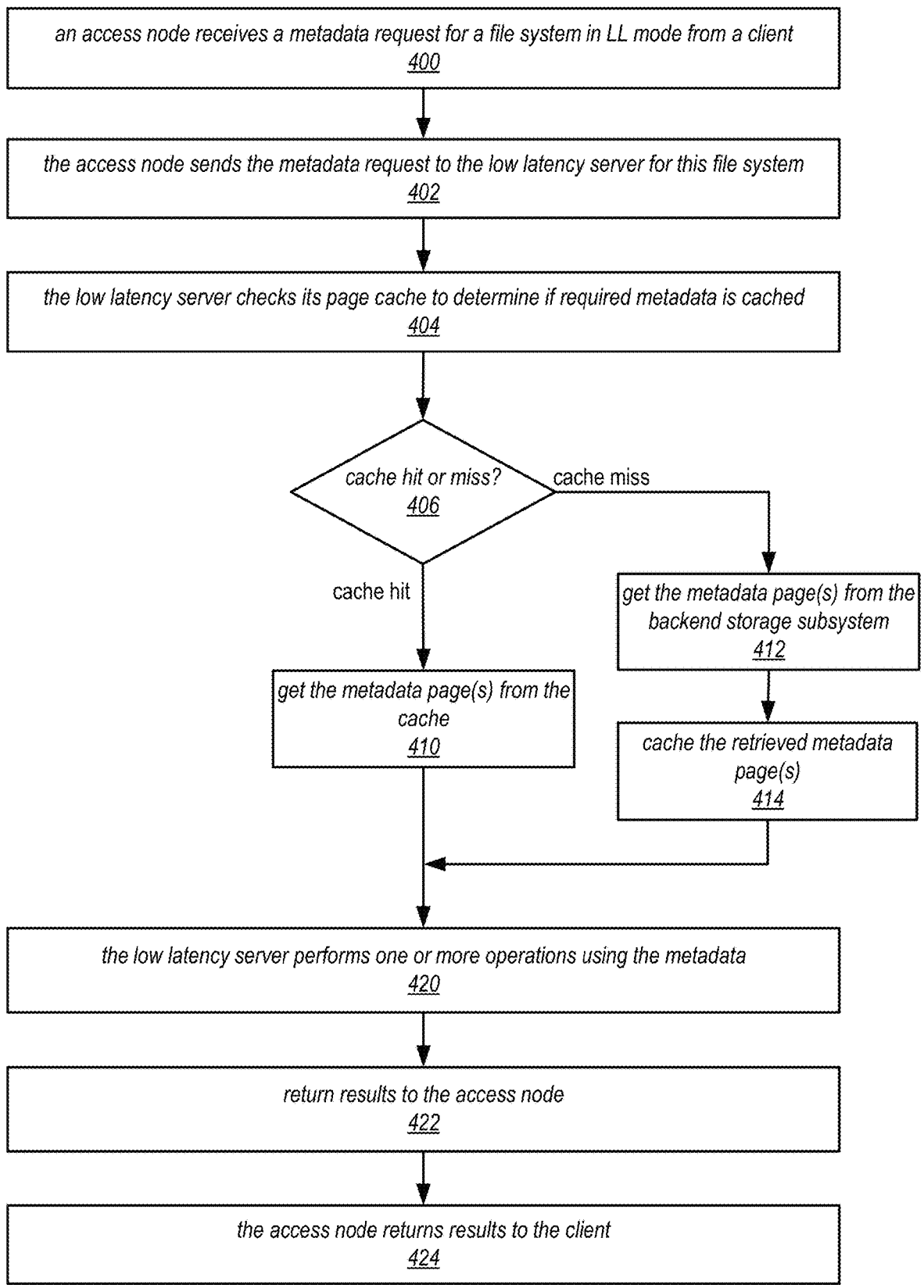
FIG. 4 is a flowchart of a method for processing metadata read requests for a file system in low-latency mode, according to some embodiments.

At 306, if the file system is in HT mode, the access node 112 sends the metadata requests to the high throughput metadata subsystem (HTMS) 120, as indicated at 308. At 306, if the file system is in LL mode, then the access node 112 instead sends the metadata requests to an LL server 142 for this file system, as indicated at 310. At 312, if the LL server 142 is currently assigned to the file system, then as indicated at 314, the metadata requests may then be handled by the LL server 142 for the file system, for example as illustrated in FIG. 4 (read request processing) and FIG. 5 (write request processing). At 312, if the LL server 142 is not assigned to the file system, the LL server 142 notifies the access node 112 as indicated at 316. The access node 112 may have a stale view of which mode the file system is in or of which LL server 142 is assigned to the file system; for example, the file system may have transitioned from LL mode to HT mode. Thus, the access node 112 may again determine a current mode for the file system as described above, and the method returns to element 306.

While not shown in FIG. 3, at 310, if the access node 112 cannot locate or communicate with the LL server 142 for the file system, then the access node 112 may communicate with the LLMS 110 to assign a new LL server 142 for the file system. An LL server 142 transition process may then be performed, for example as described later in this document.

FIG. 4 is a high-level flowchart of a method for processing metadata requests for a file system in LL mode, according to some embodiments. As indicated at 400, an access node 112 receives a metadata request for a file system in LL mode, for example from a client 180. As indicated at 402, the access node 112 sends the metadata request to the low latency (LL) server 142 for this file system. While not shown in FIG. 4, if the access node 112 cannot locate or communicate with the LL server 142 for the file system, then the access node 112 may communicate with the LLMS 110 to assign a new LL server 142 for the file system. An LL server 142 transition process may then be performed, for example as described later in this document.

At 404, the LL server 142 checks its page cache 248 to determine if metadata required to perform one or more operations indicated by the request is locally cached. In some embodiments, an LL metadata node 240 on the server 142 receives the metadata request and sends one or more requests for metadata to the LL metadata manager 242 on the LL server 142. The LL metadata manager 242 checks the metadata page cache 248 to determine if the requested metadata is locally cached, and on cache hits may return the metadata to the LL metadata manager 242.

At 406, if there is a cache hit, then the LL server 142 gets the metadata page(s) from the cache 248, as indicated at 410. At 406, if there is a cache miss, then the LL server 142 gets the metadata page(s) from the backend storage subsystem 130, as indicated at 412. In some embodiments, for cache misses, the LL metadata manager 242 notifies the LL metadata node 240, which may then get the metadata from the backend storage subsystem 130 in a similar fashion as described above for the HT metadata nodes 122. At 414, the LL server 142 caches the metadata pages retrieved from the backend storage subsystem 130 in its metadata cache 248.

At 422, the low latency server 142 may perform one or more operations using the metadata that was read from the cache 248 and/or fetched from the backend storage subsystem 130. In some cases, the operations may include fetching additional metadata from the cache 248 and/or the backend storage subsystem 130. At 422, the LL server 142 may return results of the operation(s) to the access node 112 that sent the metadata request; the results may, but do not necessarily, include at least some of the metadata that was read from the cache 248 or fetched from the backend storage subsystem 130. In some embodiments, for at least some metadata requests, the low latency server 142 may use the metadata internally, for example as part of a sequence of operations in performing the metadata request such as reading pages, deciding what writes to issue, and so on, and may only return a final result of the operations to the access node 112. The access node 112 may further process and/or reformat the results of the operation(s), and may return the final results to the requestor, for example a client 180, as indicated at 424.

While not specifically shown in FIG. 4, in some cases there may be a cache hit for some metadata and a cache miss for other metadata. In these cases, the LL server 142 may get the missing metadata from the backend storage subsystem 130, combine the retrieved metadata with the metadata fetched from the cache 248, cache the metadata retrieved from the backend storage subsystem 130 in its metadata cache 248, perform one or more operations as necessary using the metadata, and return results to the access node 112.

Figure 5:
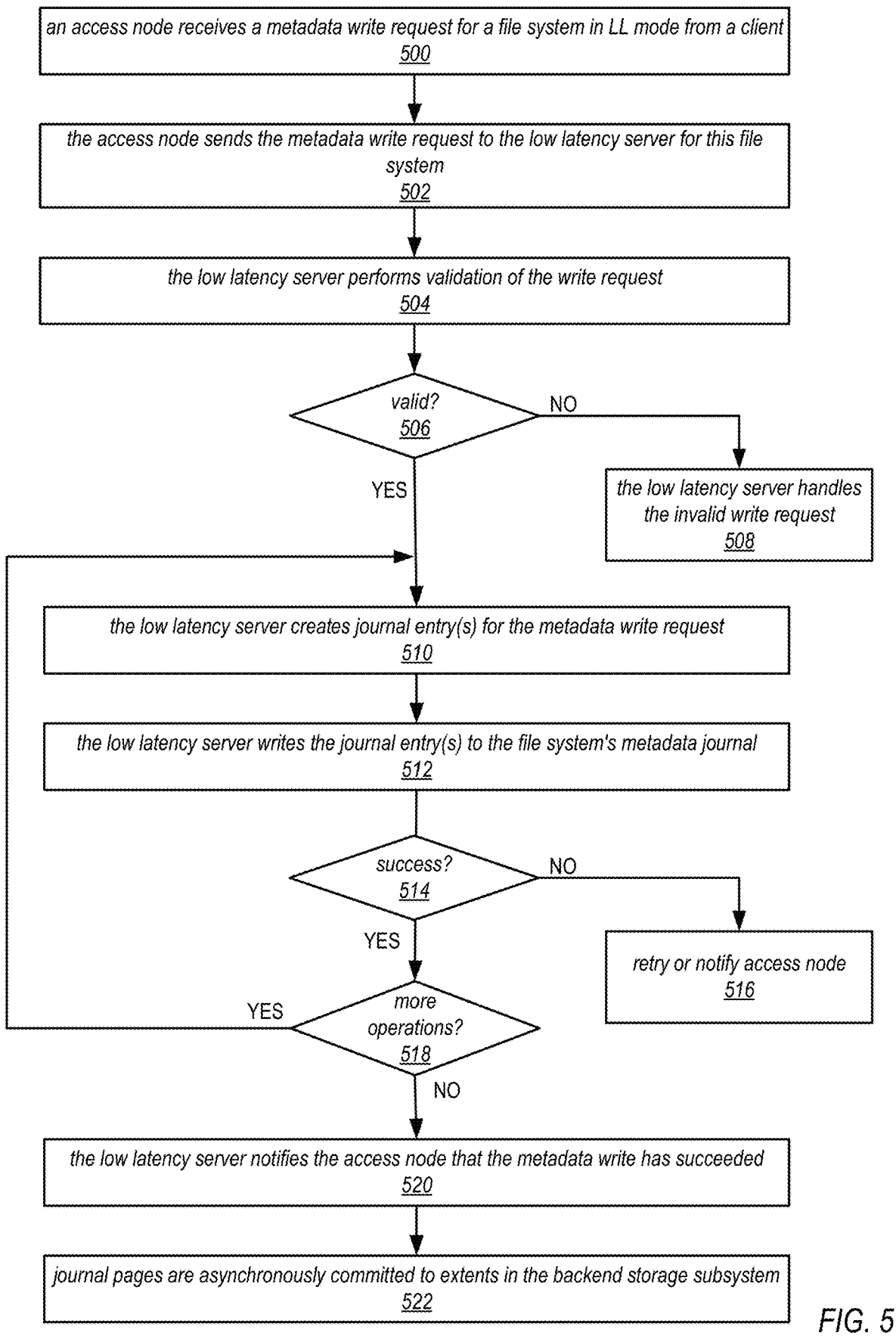
FIG. 5 is a high-level flowchart of a method for processing metadata write requests for a file system in low-latency mode, according to some embodiments.

FIG. 5 is a high-level flowchart of a method for processing metadata write requests for a file system in LL mode, according to some embodiments. As indicated at 500, an access node 112 receives a metadata write request for a file system in LL mode from a client 180. As indicated at 502, the access node 112 sends the metadata write request to the low latency (LL) server 142 for this file system. While not shown in FIG. 5, if the access node 112 cannot locate or communicate with the LL server 142 for the file system, then the access node 112 may communicate with the LLMS 110 to allocate or instantiate a new LL server 142 for the file system. An LL server 142 transition process may then be performed, for example as described later in this document.

As indicated at 504, the LL server 142 performs a validation of the write request. For example, validation may include verifying that the write transaction is correctly ordered with respect to all other transactions for the file system. In some embodiments, an LL metadata node 240 on the LL server 142 receives the write request, generates a commit transaction message for the write request, and sends the commit transaction message to the LL metadata manager 242 on the LL server 142. In some embodiments, the LL metadata manager 242 may perform the validation of the transaction.

At 506, if the write request is not valid, the LL server 142 handles the invalid write request as indicated at 508. In some embodiments, the LL metadata manager 242 may perform the validation of the transaction and, if validation fails, the LL metadata manager 242 informs the LL metadata node 240, which in some embodiments may retry the write request, for example by re-performing any reads (e.g., of inodes, block maps, etc.) necessary for the write request, generating a new commit transaction message, and submitting the message to the LL metadata manager 242.

At 506, if the write request is valid, then the method proceeds to 510 to process the write request. As indicated at 510, the LL server 142 may create one or more journal entries for the metadata write request. In some embodiments, the LL metadata manager 242 generates one or more journal write requests for the metadata write operation.

As indicated at 512, the LL server 142 writes the journal entry(s) to the file system's metadata journal 244. In some embodiments, the LL metadata manager 242 sends the journal write requests to the backend storage subsystem 130 to be stored in pages 248 in the metadata journal 244 on the backend storage subsystem 130. In at least some embodiments, the journal write requests can be parallelized.

At 514, if the journal writes do not succeed for some reason, then at 516 the LL server 142 may either retry the writes or notify the access node 112. At 514, if the journal writes succeed, then the method goes to 518. For some workflows, the LL server 142 may perform one or more read and/or write operations as part of a workflow, and may write pages to the journal 244 as part of the operation(s). If the operation(s) succeed, the LL server 142 may begin a next part of the workflow, and thus at 518 may loop back to element 510 to perform more operations as shown in FIG. 5. At 518, if there are no more operations to perform, then the method goes to element 520.

As indicated at 520, the LL server 142 notifies the access node 112 that the metadata write has succeeded. In some embodiments, once the LL metadata manager 242 receives an indication from the backend storage subsystem 130 that all of the journal writes for the write operation(s) have been committed to the metadata journal 244, the LL metadata manager 242 informs the LL metadata node 240, which in turn notifies the access node 112 that the metadata write has been committed.

As indicated at 522, journal pages are asynchronously committed to extents in the backend storage subsystem 130 to free space in the journal for more metadata operations. Committing the journal pages 246 involves committing the actual metadata modifications indicated by the respective journal pages 246 to the metadata blocks in various extents in the backend data store 130. In some embodiments, a journal flushing process may commit journal pages 246 from the file system's journal 244 to extents in the backend storage subsystem 130. The journal pages 246 may be, but are not necessarily, flushed from the journal 244 in FIFO order. In at least some embodiments, journal flushing is performed asynchronously to the other metadata operations being performed by the LL server 142. Although performed asynchronously to the metadata operations being performed by the LL server 142, the journal flushing process may flush pages 246 from the journal 244 at a rate that ensures there is free space in the journal 244 for future journal entry writes from the LL server 142.

LL Mode Conversions and LLS Transitions

In at least some embodiments, the low-latency metadata subsystem (LLMS) of a distributed file storage DFSS (see, e.g., FIG. 1) relies on recording file system metadata changes in a single per-file system metadata journal of recent writes. However, low-latency server (LLS) instances may fail or otherwise become available, or a file system may be migrated (e.g., to another zone in the DFSS), which may require the file system's LLS to be migrated as well. In addition, in some embodiments, file systems within the DFSS may operate in either low latency (LL) mode or high throughput (HT) mode, and in some embodiments may be converted from LL mode to HT mode, and from HT mode to LL mode. Thus, embodiments may provide safety mechanisms to ensure that at most one LLS uses a file system's metadata journal at a time in cases of LLS failures and migrations. In addition, safety mechanisms may be provided for transitions (in both directions) between LL mode and HT mode (referred to as file system (FS) mode transitions), and that allow other components of the DFSS (e.g., access nodes) to determine whether a file system is currently operating in LL mode or HT mode.

In at least some embodiments, both of these safety mechanisms may involve the use of write barriers; however, the two safety mechanisms may involve different methods and may provide different invariants to the rest of the DFSS. In some embodiments, for LLS-to-LLS transitions, a write barrier may be used where a successor LLS first reads and then writes each page of the file system's metadata journal, which ensures that even if the state of the old LLS is unknown or still has journal write operations in flight that all of those operations will fail and not occur, resulting in a single irrevocable transition to the new LLS. The section titled Low latency server transitions, and in particular the subsection titled FS metadata journal, provides details for the safety mechanisms and other techniques used for LLS-to-LLS transitions.

In some embodiments, for FS mode transitions, a different method may be used that involves adding a version tag (referred to as a slot ID) to each page in the DFSS and verifying that every write operation uses the correct FS mode for that slot ID, and thus does not permit the system go backwards. The form of write barrier used for FS mode transitions is different from the journal barrier used for LLS-to-LLS transitions in that not all system components encounter the barrier at the same time—mode transitions happen on a block-by-block basis, and do not require that unrelated operations know the newest FS mode if there are no shared blocks between the two. The section titled File system mode conversions provides details for the safety mechanisms and other techniques used for FS mode transitions.

Many systems may use leases for guaranteeing that resources have at most one owner at a time. One advantage of using write barriers instead of leases for guaranteeing that resources have at most one owner at a time is that there are no time dependencies when using write barriers—there is no need to assume that the time between checking lease validity and a write operation is small in order to ensure consistency. However, in some embodiments, the LLMS may use leases in addition to the write barrier methods, but only for read operations which have no associated write operation as delays in these operations do not cause corrupted file system structures. A journal lease mechanism that may be used in some embodiments of the LLMS are described below in the subsection titled Journal leases.

Low Latency Server Transition Safety

In some embodiments, it may at times be necessary or desirable to switch a file system running in low latency (LL) mode to a different LL server (LLS) instance. For example, if an access node of the DFSS cannot locate or communicate with the LLS instance for the file system, then the access node may communicate with the LLMS to allocate or instantiate a new LLS instance for the file system. As another example, the LLMS may detect that an LLS instance has failed, or needs to be taken out of service for some reason. As another example, the LLS instance for a file system may be migrated for various reasons, for example to a different zone of the DFSS as illustrated in FIG. 12. Once it is determined that a new LLS instance is needed for a file system, a new LLS may be assigned to the file system by the LLMS, and an LL server transition process may then be performed. This section describes the LL server transition process, according to some embodiments. In addition, this section provides additional details about the metadata journal and LL server journal operations for a file system, in some embodiments.

In some embodiments of an LLMS, there are at least two structures for a file system in LL mode that are persisted across transitions to new LLS instances: the block pool, and the metadata journal. In some embodiments, the metadata cache is not persisted. Handling a file system's block pool during LLS transitions is described in the section titled Block allocation for low latency mode file systems. This section addresses handling of the metadata journal during LLS transitions, in particular write barrier methods that may, for example, help ensure that any inflight journal writes from the predecessor LL server fail. Further, this section further describes how an LLS, in particular the LL metadata manager of an LLS, provides a metadata cache and journals metadata writes, and how the LLMS guarantees at most one active LLS per file system in LL mode. Also described are some aspects of the backend storage subsystem (BSS) of the DFSS that support LL mode and LLS transitions for file systems.

For the sake of this discussion, an LL server is the single metadata owner of a file system at a particular point in time, and may also be referred to as an LLS. An LL file system is a DFSS file system in LL mode which uses an LLS. An HT file system is a DFSS file system in HT mode, which thus has no single metadata owner (e.g., no associated LLS), and uses HTMS transactions for all metadata changes.

Figure 6:
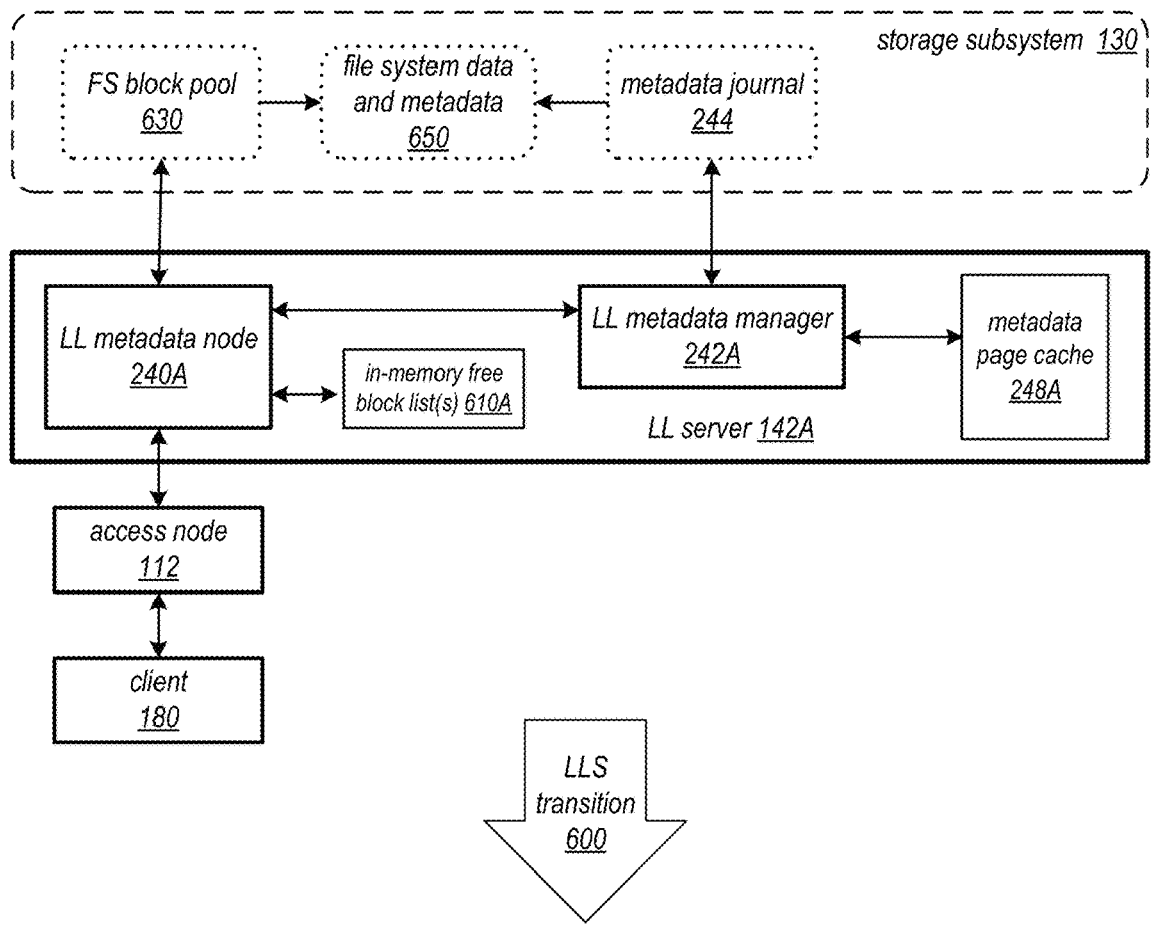
FIG. 6 illustrates low latency server transitions in an LLMS, according to some embodiments.

FIG. 6 illustrates low latency server transitions in an LLMS, according to some embodiments. The top portion of FIG. 6 shows an LL server 142A for a client 180's file system. The LL server 142A instance includes an LL metadata node 240A and LL metadata manager 242A. The LL metadata node 240A manages an FS block pool 630 for the file system, and maintains an in-memory free block list 610A. The LL metadata manager 242A maintains an in-memory metadata page cache 242A, and writes journal entries to a metadata journal 244 maintained on the backend storage subsystem 130.

Figure 7A:
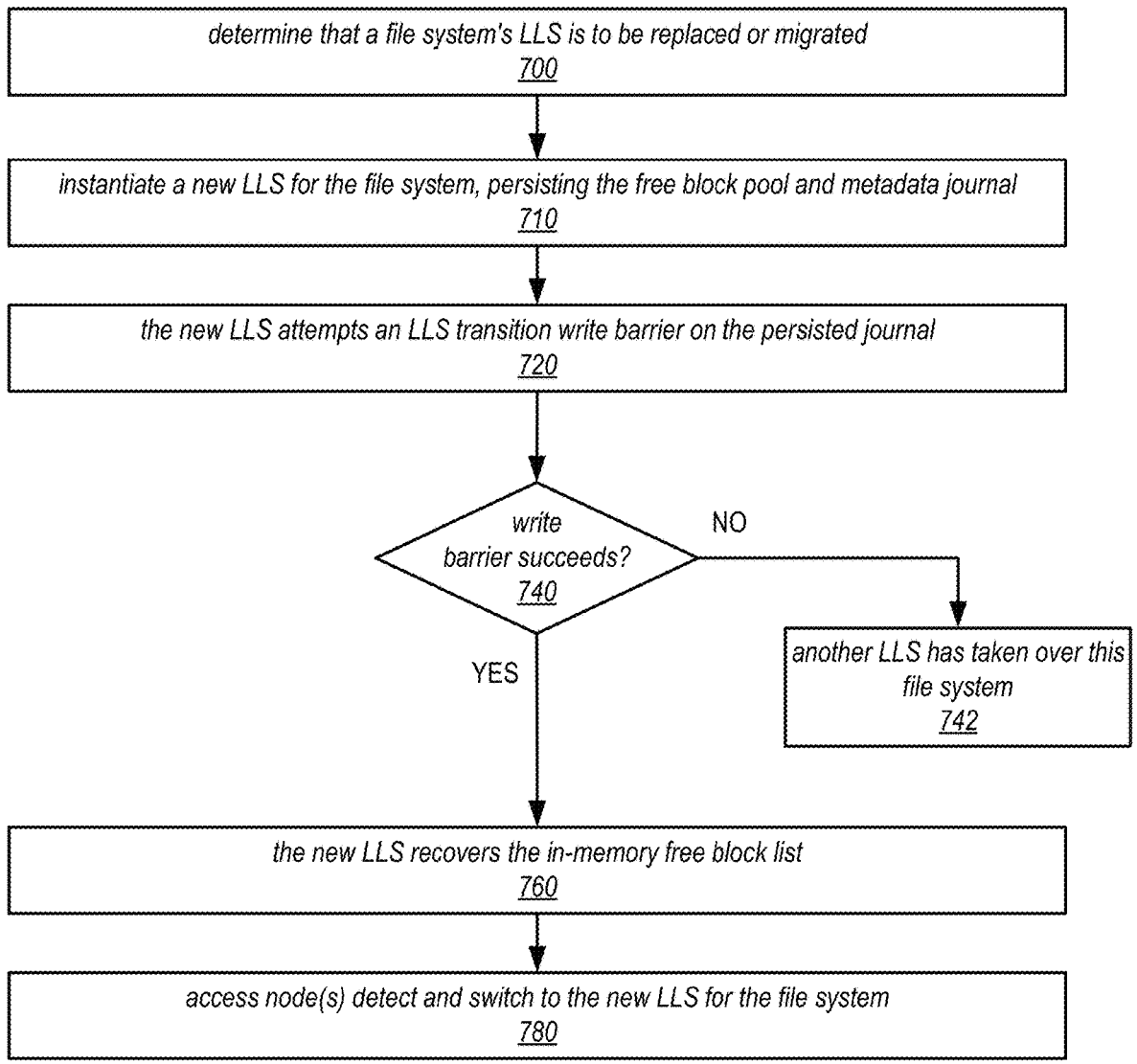
FIGS. 7A and 7B provide a flowchart of a method for transitioning to a new low latency server for a file system, according to some embodiments.
Figure 7B:
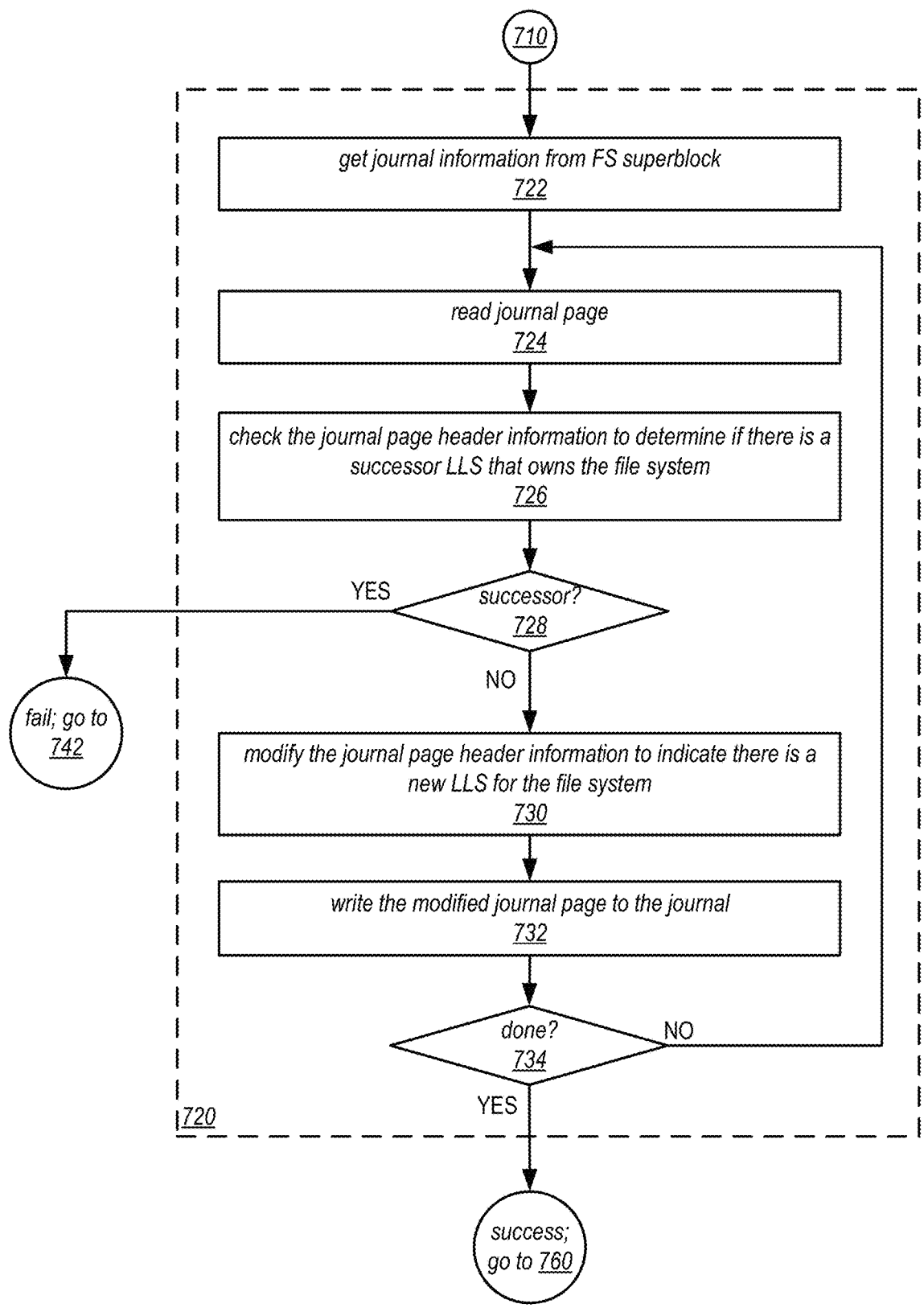

At some point, it may be necessary or desired to replace or migrate the file system's LL server 142. An LLS transition process or method 600 may be performed to replace or migrate the LL server 142, for example as illustrated in FIGS. 7A and 7B. The bottom portion of FIG. 6 shows a new LL server 142B for the client 180's file system during and after the LLS transition process 600. The LL server 142B instance includes an LL metadata node 240B and LL metadata manager 242B. During the transition process 600, the LL metadata node 240B may access the persisted FS block pool 630 for the file system to reconstruct an in-memory free block list 610B. Also during the transition process 600, the LL metadata manager 242B may read, modify, and write each page in the persisted metadata journal 244 in the backend storage subsystem 130 as part of a write barrier for the LLS transition. In some embodiments, the in-memory metadata page cache 242 is not persisted across the transition, so the new LL metadata manager 242B may begin filling a new cache 242B with metadata fetched by the new LL metadata node 240B from the BSS 130 after the transition.

FIGS. 7A and 7B provide a high-level flowchart of a method for transitioning to a new low latency server for a file system, according to some embodiments. FIG. 7A illustrates the LLS transition method at a high level, according to some embodiments. As indicated at 700, a determination may be made that a file system's LLS is to be replaced or migrated. As indicated at 710 of FIG. 7A, a new LLS may be assigned for the file system. In some embodiments, the file system's free block pool and metadata journal may be persisted. As indicated at 720 of FIG. 7A, the new LLS attempts an LLS transition write barrier on the persisted journal. FIG. 7B illustrates an LLS transition write barrier method that may be performed at element 720 of FIG. 7A, in some embodiments.

At 740 of FIG. 7A, if the LLS transition write barrier does not succeed, then another LLS has taken over this file system as indicated at 742 of FIG. 7A. In some embodiments, the LLS transition write barrier may involve reading the pages of the journal, checking the journal page header information to determine a current epoch for the journal, and rewriting the journal page to the journal with the LLS's new epoch in the header. If the epoch that is in the journal page header when read from the journal is a later epoch than the epoch of this LLS, then another LLS has succeeded this LLS as owner of the file system, and the LLS transition write barrier fails. In some embodiments, it may not be necessary for the LLS server to perform any other action after its write barrier attempt fails other than a local cleanup.

At 740 of FIG. 7A, if the LLS transition write barrier succeeds, then the method goes to element 760 of FIG. 7A. As indicated at 760 of FIG. 7A, the new LLS may recover the in-memory free block list. In some embodiments, the persisted free block pool for the file system may be recovered, if present. Recovering the free block pool may, for example, include rebuilding the in-memory free block list on the new LL server according to the content of the persisted free block pool. The free block pool and in-memory free block list are further described below in the section titled Block allocation for low latency mode file systems with reference to FIGS. 10 and 11. As indicated at 780 of FIG. 7A, the access node(s) of the DFSS may detect and switch to the new LLS for the file system.

Figure 14:
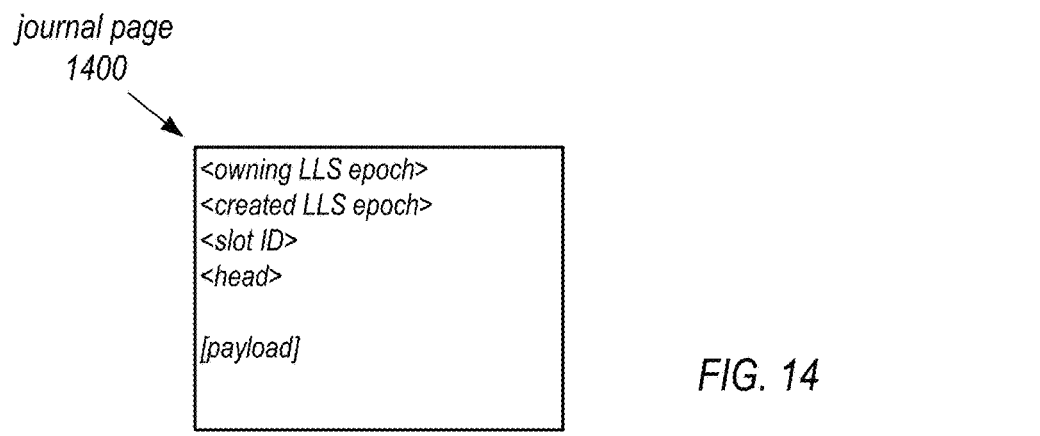
FIG. 14 illustrates an example journal page, according to some embodiments.

FIG. 7B illustrates an LLS transition write barrier method that may be performed at element 720 of FIG. 7A, in some embodiments. As indicated at 722 of FIG. 7B, the new LLS instance may get journal information, for example from the file system's FS mode block as shown in FIG. 13. As indicated at 724 of FIG. 7B, the new LLS instance may read a page from the journal. FIG. 14 illustrates an example journal page 1400, according to some embodiments. As indicated at 726 of FIG. 7B, the new LLS instance may check the journal page header information to determine if there is a successor LLS that owns the file system. In some embodiments, the new LLS may check an owning LLS epoch field in the header to determine the epoch number of the LLS that owns this journal page; a later epoch number than the epoch number of this LLS indicates that another LLS has taken over the file system and is performing or has performed its own LLS transition write barrier. At 728, if a successor LLS is detected, then the LLS write barrier fails, and the method exits to element 742 of FIG. 7A. Otherwise, as indicated at 730 of FIG. 7B, the new LLS may modify the journal page header information to indicate there is a new LLS for the file system. In some embodiments, the new LLS may increment an owning LLS epoch field in the header to indicate that the new LLS now owns this journal page. As indicated at 732 of FIG. 7B, the new LLS may then write the modified journal page to the file system's journal. At 734 of FIG. 7B, if all of the journal pages have been successfully read, checked, modified, and written to the journal, then the LLS transition write barrier is done. Otherwise, the method returns to element 724 of FIG. 7B to read, check, modify, and write the next journal page.

The following sections provide additional details and description for the elements of FIGS. 6, 7A, and 7B.

BSS Support for LL Mode and LLS Transition Safety

In some embodiments, to support LL file systems, the backend storage subsystem (BSS) of the DFSS may include mechanisms to ensure that writes issued from an LL server to the BSS cannot go backwards, either because two writes to the same page issued by the same LL server could be in flight at the same time, or because a prior LL server instance for the same file system could still have active writes in flight. In some embodiments, a requirement to support LL mode is conditional writes with a long span between a BSS read and the following write. For HT mode, the BSS only supports conditional writes based on a window of recent write history for that extent.

In some embodiments, for all extent types in the BSS, a portion (e.g., 64 bits) of the page header may be allocated to hold a slot ID. Existing and newly allocated pages have a slot ID of zero. In some embodiments, a conditional write may be provided which executes the write if (and only if) the slot ID supplied with the write request is larger than the existing value found in the page header. In some embodiments, this slot ID-conditional write may only work for metadata extents.

In some embodiments, executing a write with a slot ID condition may require a read-modify-write operation to first load the old slot ID. These types of conditional writes may only occur while flushing writes from a file system's journal to the backing extent. In some embodiments, because journal flushes do not normally happen in-line with client requests, extra latency from a read-modify-write is not a concern, and therefore it may not be necessary to use additional memory to track all slot IDs. Instead, a cache mechanism may be used for metadata extents only. In some embodiments, the BSS may use this slot ID cache to avoid making all slot ID-conditional writes require a full read-modify-write sequence.

In some embodiments, a journal extent type may be used which holds the blocks that an LL server uses to implement a file system's journal. In some embodiments, a journal extent may have one page per block. Generally, each LL file system may have a relatively small journal (e.g., ~100 to ~1000 entries), so it may not be necessary to minimize the disk space consumed by journal extents. In some embodiments, a journal extent may hold as a BSS state the slot of that page's most recent write. As such, journal extents may accept and enforce conditional writes regardless of how many operations to other blocks fall between a read and write for that block.

Journal Leases

In some embodiments, each LL file system may have a block linked to the file system's superblock that may include LL mode state information (see, e.g., FIG. 13). This block may be referred to as a file system (FS) mode block. In some embodiments, lease information for the LL file system's journal may be maintained in the FS mode block. In some embodiments, an LL server must own a lease before attempting to take ownership of an LL file system's journal. In some embodiments, a valid lease may be required before an LL server may respond to metadata read requests. These two conditions are different: lease ownership describes an epoch owned by a particular LL server, independent of real time, whereas lease validity requires real time to fall within the lease's 'valid after' and 'valid before' parameters.

In some embodiments, a lease record that includes lease information may be persisted in the BSS as part of a file system's FS mode block. The following provides an example lease record (lease_info) that may be used in embodiments, and is not intended to be limiting.

```
LLS_epoch {
    major; // Incremented on each lease acquisition.
    minor; // Reset on each lease acquisition;
           // Incremented on each lease renewal or reclaim.
};
lease_info {
    LLS_epoch LLS_epoch;
    lease_ownership_id; // A unique ID which permits an LLS instance to
                        check after
                        // a restart whether hints about which leases it owns
                        are current.
    address;        // Address for access nodes to contact this lease owner.
    bool abandoned;     // True if the next lease acquirer does not need to
                        wait
                        // for a prior lease to expire.
};
```

In some embodiments, leases may include two parameters, which may be globally known across the DFSS: a validity period T, and a permitted skew S, which means that the lease should still be valid if any two servers' clocks advance by a difference of S over a period of T. In some embodiments, these parameters may be included in the lease record.

In some embodiments, any LLS may claim ownership of a file system's lease at any time by replacing that file system's lease block with a new entry. In some embodiments, however, an LLS may not claim ownership of a file system unless instructed to do so, for example by an LLS management process or server of the LLMS. In some embodiments, a desired major epoch may be included in such requests.

In some embodiments, to acquire a lease, the LLS first reads the lease block. The LLS then records its local time as t0, and issues a write with the new major epoch, setting abandoned=false, and filling in the other fields with the new LLS's information. In some embodiments, this write may be conditional on the prior read. Let t1 be the time when the write response arrives. If the write succeeds, that LLS now owns a lease with the following parameters: valid_before=t0+T, valid_after=t1+T+S, LLS_epoch={e, 0}. However, if the prior entry in the lease block was abandoned (e.g., because it was a new file system or the prior owner (LLS) abdicated), then the new lease has valid_after =t1, e.g., it is valid for use immediately.

In some embodiments, for the purposes of lease management, the valid_before and valid_after components do not describe a time interval: all of the subsequent tests and updates may treat them independently. An LLS owns a lease for a particular epoch if (and only if) the associated BSS write succeeded. In some embodiments, a (possibly empty) interval over which the LLS may use a particular lease to permit read requests and schedule lease renewals may be specified.

In some embodiments, an LLS may locally maintain a lease structure, e.g. in local memory. In some embodiments, the LLS lease structure is not persisted. The following provides an example lease structure, and is not intended to be limiting:

```
struct lease {
    struct timespec valid_before; // A lease is "valid" when t < lease.
    valid_before
    struct timespec valid_after; // and t >= lease.valid_after.
    struct LLS_epoch LLS_epoch;
    lease_ownership_id; // Unique identifier from the lease_info in the
    FS mode block.
};
struct lease acquire_lease(new_epoch_major)
{
    struct lease_info old;
    slot_t old_read_slot = BSS_read_lease(&old);
    struct lease_info new = old;
    if (new_epoch_major <= old.LLS_epoch.major) {
        // Another LLS has already claimed ownership of new_epoch_major.
        // Abort to renominate a new LLS, or retry with a correct epoch.
        // return <an indication that this attempt should not be retried>;
    }
    new.LLS_epoch = (struct LLS_epoch) { .major = new_epoch_major,
    .minor = 0 };
    new.abandoned = false;
    new.lease_ownership_id = generate_unique_id( ); // Blocking call
                                                   containing a
                                                   // no-op BSS write.
    struct timespec t0 = clock_gettime( );   // Must precede the write
                                             attempt.
    BSS_write_lease(&new, old_read_slot); // Conditional on old_read_slot.
    struct timespec t1 = clock_gettime( );
    struct lease ret = UNOWNED_LEASE;
    if (/*write succeeded*/) {
        ret.LLS_epoch = new.LLS_epoch;
        ret.valid_before = t0 + T;
        ret.lease_ownership_id = new.lease_ownership_id;
        if (old.abandoned) {
            ret.valid_after = t1;
        } else {
            ret.valid_after = t1 + T + S;
        }
    } else {
        // Write failed - return ret as is (UNOWNED_LEASE).
        //   This failure is retryable (after rereading).
    }
    return ret;
}
```

In some embodiments, if the abandoned flag was false prior to acquisition, then the new LLS may wait to make use of its new lease—the valid_before and valid_after intervals have an empty intersection immediately after acquisition. In some embodiments, the LLS may issue one or more renew operations to extend the valid_before interval beyond the valid_after starting point.

In some embodiments, once an LLS owns a lease record, it can proceed to load the journal in preparation for issuing its journal write barrier (which guarantees that inflight writes from the prior owner will not arrive after the barrier is complete—see later sections). In some embodiments, pre-write-barrier journal page loads do not need to wait for the new lease to be valid; validity only pertains to metadata reads.

In some embodiments, an LLS process periodically records a set of hints in local storage regarding which file systems it owns. The purpose of lease hints is twofold: 1) if a large number of LLS instances restart at the same time (e.g., power failure), the LLS instances do not have wait for the control plane to remap all file systems before the LL service is operational again, and 2) during process restarts (such as deployments) there should be no requirement that file systems migrate to a new LLS.

In some embodiments, the locally recorded hints may include a list of the following tuples:

```
struct ownership_hint {
    struct block_ptr sbid;    // block identifier
    LLS_epoch_major;          // The minor value may not be included in hints
                              because
                              // it changes frequently, and missing an in-progress
                              // renew does not prevent a reclaim.
    lease_ownership_id;
};
```

In some embodiments, a safety property that an LLS may satisfy before writing out a set of hints: the LLS should not write out a hint for a file system prior to the valid_after point for that lease. Without this requirement, a successor would not know what value to use for valid_after, and would have to set valid_after to (current time+T+S) as upon a new lease acquisition, which would block file system operations. In some embodiments, this requirement may be removed by only writing the ownership hints in the predecessor LLS as part of the first renew that occurs after valid_after.

In some embodiments, upon restart, an LLS looks for a hints file, and if it finds one, attempts to reclaim each lease in the file. If a given reclaim is successful, the LLS may still issue a journal write barrier (see later sections) before using that file system. The write barrier may be necessary to guarantee that any inflight writes from the predecessor process (e.g., a previous LLS for the file system) will fail.

In some embodiments, to renew a lease, an LLS first reads the lease block. If its own LLS epoch is still there, it records the current time t2, increments the local minor epoch of that lease, and then issues a conditional write on that read with the new minor epoch, and all other values the same. If this write succeeds, then the LLS updates its lease and sets valid_before=t2+T. If at this point the valid_before and valid_after periods have a nonempty intersection, then the lease is valid and the LLS can proceed to respond to read requests until the local clock advances past the valid_before value.

If on attempting a renewal, an LLS finds a different entry in the lease block (which should hold a higher major LLS epoch), then it immediately halts use of the lease, and cannot use it again without re-acquiring the lease.

In some embodiments, a renewal attempt may fail for any one of a number of reasons. After such a failure, the requesting LLS may not know whether or not the minor epoch was updated. This situation is acceptable, and does not mean that the owner lost the lease. The owner can issue another read-increment-write attempt; once that attempt succeeds, the expiration time can be updated and the caller can proceed depending on how much time has elapsed since the read-increment-write op was issued.

In some embodiments, to release a lease, an LLS first reads the lease block. Assuming its own entry is there, it first stops using the lease, then it issues a conditional write with abandoned=true.

FS Metadata Journal

This subsection describes aspects of a file system metadata journal, including safety mechanisms for LLS-to-LLS transitions. In some embodiments, a file system's metadata journal may include at least the following attributes:

slot ID: indicates where a journal operation falls in the journal's overall sequence. In some embodiments, a slot ID alone does not uniquely identify an entry, as a later LLS instance may reuse a given slot ID if the prior use was not committed into the journal. In some embodiments, an (LLS_epoch, slot ID) tuple does uniquely identify the content of a journal entry.

head: contains the slot ID of the oldest journal entry for which a trim has not completed.

tail: contains the slot ID of the oldest slot not durable in the journal (e.g., the next to write into unless there are pending writes in flight).

window: contains the number of pages the journal can currently accept appends into.

In some embodiments, a journal may support at least the following operations.

load_journal(LLS_epoch e): After a successful lease acquisition for LLS epoch e, load the content and state of all committed operations in the journal. May return a failure indicating that the journal is owned by some later LLS epoch larger than e, or that the LLS's lease has expired. In some embodiments, it is not possible for the journal to be owned by some earlier LLS epoch less than e.

{journal_slot_t head, tail, window}=get_state( ): return the currently-known committed journal state. This is a local operation. In some embodiments, an event-based version may be provided to notify whenever one of these values changes based on received messages. The state may become invalid if some other LLS begins to load the journal into a later LLS epoch.

data[ ]=get(journal_slot_t js): Return the data content of the journal at slot js. This is a purely local operation. js must satisfy shead<=js<tail, and the caller must not have called trim( ) for any slot value at or above j s. (See below for shead definition.)

append(journal_slot_t js, data[ ]): Write new content into slot js. In some embodiments, the write is not guaranteed to persist until the journal's tail value increases to some value larger than j s. In some embodiments, a caller should not call append( ) more than once for the same slot, should not issue an append for a slot larger than the current committed tail+window, and should not leave gaps. In some embodiments, to not leave gaps, the caller may be required to have already called append( ) for slot js1 unless js==tail.

trim(journal_slot_t js): Tells the journal to discard all entries at and below slot js. At some time after this call, head will contain js+1 (or higher if there is a later trim). In some embodiments, callers which load the journal in a later LLS epoch may still see trimmed entries if the newer LLS epoch begins before the persisted head value changes.

In some embodiments, when an LLS instance first starts up and acquires ownership of a file system, it loads the persisted metadata journal for the file system. In some embodiments, once the load completes, the LLS reads the content of all slots in [head . . . tail] and parses them to determine which slots contain complete and intact write records.

In some embodiments, using a journal requires the caller (e.g., an LLS for the file system) to keep additional ephemeral state information:

shead (speculative head) contains the slot ID of the oldest journal entry for which a trim has not been requested. Immediately after loading, shead==head.

stail (speculative tail), which contains the slot ID of the next entry to write into. Immediately after loading, stail==tail.

Operations that use the journal may include, but are not limited to, committing new writes, and retiring complete entries.

In some embodiments, to commit a new write, a serialized message may be created by the LLS containing all the pages in that transaction, with each labeled with a header listing the start and end slot IDs of that message, beginning at stail and increasing up from there. Appends may be issued for each of those slots, and stail is updated. If the LLS crashes in the middle of this sequence then the successor LLS may skip any partially written transactions because the complete frame may not be present in the journal. After submitting the appends, the LLS waits until the tail advances to cover the entire request, and at that point replies to the caller with success.

In some embodiments, to retire a persisted entry, any time the interval between shead and tail contains a complete frame, the LLS (e.g., a journal flushing process of the LLS) may issue writes for all of those pages to the backing extents. When all of those writes have succeeded, the LLS may issue a trim operation to cover that range of slots, and update shead.

In some embodiments, an LL file system's journal may be implemented as a circular buffer of blocks in BSS. FIG. 14 illustrates an example journal page 1400, according to some embodiments. In some embodiments, the content of each page in the journal may have the following structure, for example as illustrated in FIG. 14. In some embodiments, these fields may not be visible to BSS or to other components or layers of the DFSS.

```
struct journal_page {
    {format version, magic, etc.}
    struct LLS_epoch owning_LLS_epoch; // The LLS epoch of the LLS
                                                      that
                                       // may write a new slot ID into this
                                                      page.
    struct LLS_epoch created_LLS_epoch; // The LLS epoch of the LLS
                                                      which
                                       // originally wrote the payload stored in
                                                      this page.
    journal_slot; // The desired value for 'tail' when this write
            // completes is always the same as its slot ID + 1.
    head; // The (nonspeculative) journal head as of the time this page was
    written.
    payload[ ];
};
```

In some embodiments, each journal page may include a third LLS_epoch field, referred to as the head epoch, or head_LLS_epoch. If following the head pointer in a particular block, the head epoch indicates the epoch that should be found in that destination.

Journal Safety Mechanisms for LLS Transitions

In some embodiments, although an LLS should have a valid lease before it can respond to metadata read requests, it may be required that metadata write operations provide a single serial sequence of operations to a file system without requiring that no LLS still has requests outstanding after its lease expires. To provide such a guarantee, in some embodiments, once an LLS loads (takes ownership of) a journal for a given LLS epoch, any write issued by a prior LLS epoch should fail, and every write in the prior LLS epoch which did succeed should be present in the journal in the successive LLS epochs.

In some embodiments, within an LLS epoch it may be required that no write to a journal page may replace a later write issued by the same LLS, even if write requests arrive out of order or are delayed until after the LLS has retried. In some embodiments, to ensure this behavior, all journal page writes are conditional on their read slots, and these conditional writes still work even if there is a long delay between a BSS read (at load time) and the subsequent write.

In some embodiments, the process of loading a journal may be broken into two stages: a journal write barrier for LLS transitions, followed by a scan to determine the head and tail slots of the journal. In some embodiments, the LL transition write barrier may be performed as follows:

```
bool write_barrier(struct LLS_epoch LLS_epoch, block_ID journal[ ])
{
  for all pages in the journal { // any order, all pages in parallel
    // Read the page from the journal.
    struct journal_page page;
    slot_t prev_write_slot = read(page ID, &page);
    // First, check to make sure another LLS hasn't taken over the FS
    < Check the page's major epoch against the major epoch in the
      input LLS_epoch. >
    < If the page's major epoch is greater than the major epoch in the
      input LLS_epoch, a successor major LLS epoch exists.
      Abort the load of the journal and fail. >
    // Perform a write operation as follows to update the LLS_epoch for
    the page.
    //    If this write barrier is for an acquire, the update to the new
    major
      epoch
    //    is necessary. If this barrier follows a reclaim, the update to the
    //    minor epoch may not be required, but may be useful for
    //    future assertion checks.
    < Set the owning LLS epoch for this page to the epoch for this
      LLS. >
    // Write the page to the journal, conditional on the previous write
    slot.
    slot_t next_write_slot = write(page ID, &page, prev_write_slot);
    // The page content may be stored for use by journal scans and
    // the next_write_slot may be stored for use by journal commit writes.
    if (/*write succeeded*/)
      break; // done with this page
    else
      continue; // read again
  }
}
return true;
}
```

In some embodiments, the scan phase may be performed as follows. A goal of the scan phase is to identify the head and tail values that define the committed portion of the journal. That portion should not include writes that "did not happen" because the writes left a gap in the contiguous slot ID space that some successor epoch filled in.

```
journal_scan(struct journal_page j[ ])
{
  < Locate the head of the journal; set the tail to head+1. >
  //   Get the LLS epoch information for the LLS which originally wrote
  the payload
  //       stored in this page
  prev_LLS_epoch = head.created_LLS_epoch;
  // extend the tail as long as it's contiguous
  while (true) {
    < get next page p>
    //   Check this page's epoch info against the epoch info of the
    previous page
    if (p.slot_ID == tail &&
        (p.created_LLS_epoch.major > prev_LLS_epoch.major ||
         (p.created_LLS_epoch.major == prev_LLS_epoch.major &&
          p.created_LLS_epoch.minor >= prev_LLS_epoch.minor))) {
      // this page is a contiguous extension, so increment tail
      tail++;
      // Get the LLS epoch information for this page
      prev_LLS_epoch = p.created_LLS_epoch;
    } else {
      // end
      return (head, tail);
    }
  }
}
```

Parallel Paths in a Distributed File Storage System

In some embodiments of a distributed file storage system (DFSS), for example as illustrated in FIG. 1, file systems may run in either high throughput (HT) mode to low latency (LL) mode. In addition, in some embodiments, file systems may be converted or transitioned from HT mode to LL mode, and from LL mode to HT mode. Thus, embodiments of a DFSS may provide high throughput in a shared storage system via the high-throughput metadata subsystem (HTMS) for file systems in HT mode while also providing low-latency consistent metadata operations via the low-latency metadata subsystem (LLMS) for file systems in LL mode as described herein, and may allow file systems to be switched between modes. This section provides further details about the DFSS that provides both LL and HT modes to file systems as described above with reference to FIGS. 1 through 5, and in particular describes aspects of the DFSS that support parallel paths for metadata operations according to the two FS modes.

A goal in distributed file systems is to support aggregate read and write throughput at rates higher than any single node in the system can support. Existing systems generally take one of two approaches to achieve this goal: (1) they distribute both files and metadata across the whole system, which permits high data throughput, but breaks consistency as there is no way to safely perform operations which modify objects at multiple servers, or (2) they separate data and metadata and direct updates to the two to different places.

Embodiments of the DFSS using the HTMS as described herein (e.g., in the section titled Example Distributed File Storage Service) may employ a different approach: both file data and metadata are distributed across the entire fleet of storage nodes in the backend storage service (BSS), which provides high aggregate throughput. Instead of abandoning consistency, the DFSS provides consistency through the use of distributed transactions. However, the distributed transaction system may not provide the low-latency experience that a separate metadata approach may provide.

Embodiments of the DFSS using the LLMS as described herein, for example as illustrated in FIG. 1, may provide both low-latency metadata operations and high aggregate read-write throughput, while not requiring the file system clients to be aware of the distinction and to direct their operations to the correct destination in the BSS. Using the LLMS, only the access nodes in the access subsystem need to be aware of the file system's current file system (FS) mode (either LL mode or HT mode) and current low-latency server (LLS) location if in LL mode. The clients perform file system data and metadata operations through the access subsystem the same way in both FS modes, and thus the FS mode that the file system is currently running in may be transparent to the client. Thus the metadata for a client's file system may be handled by either the LLMS in LL mode or by the HTMS in HT mode without the client being aware that the different metadata paths exists, without requiring the support of different protocols by the client, and without requiring the client to know the location of and communicate with particular endpoints in the BSS.

In some embodiments, a challenge in the split metadata path approach in the DFSS is that some operations such as the location of blocks within a file in a file system are stored as metadata (e.g., block map pointers) that is managed by an LLS in LL mode, as opposed to placing all of a single file at one location in the BSS. Methods are described that may ensure that the access nodes in the DFSS cache these block map pointers correctly, and that other operations through the access nodes are performed correctly, in the section titled LLMS integration into DFSS.

File System Mode Conversion

Figure 8:
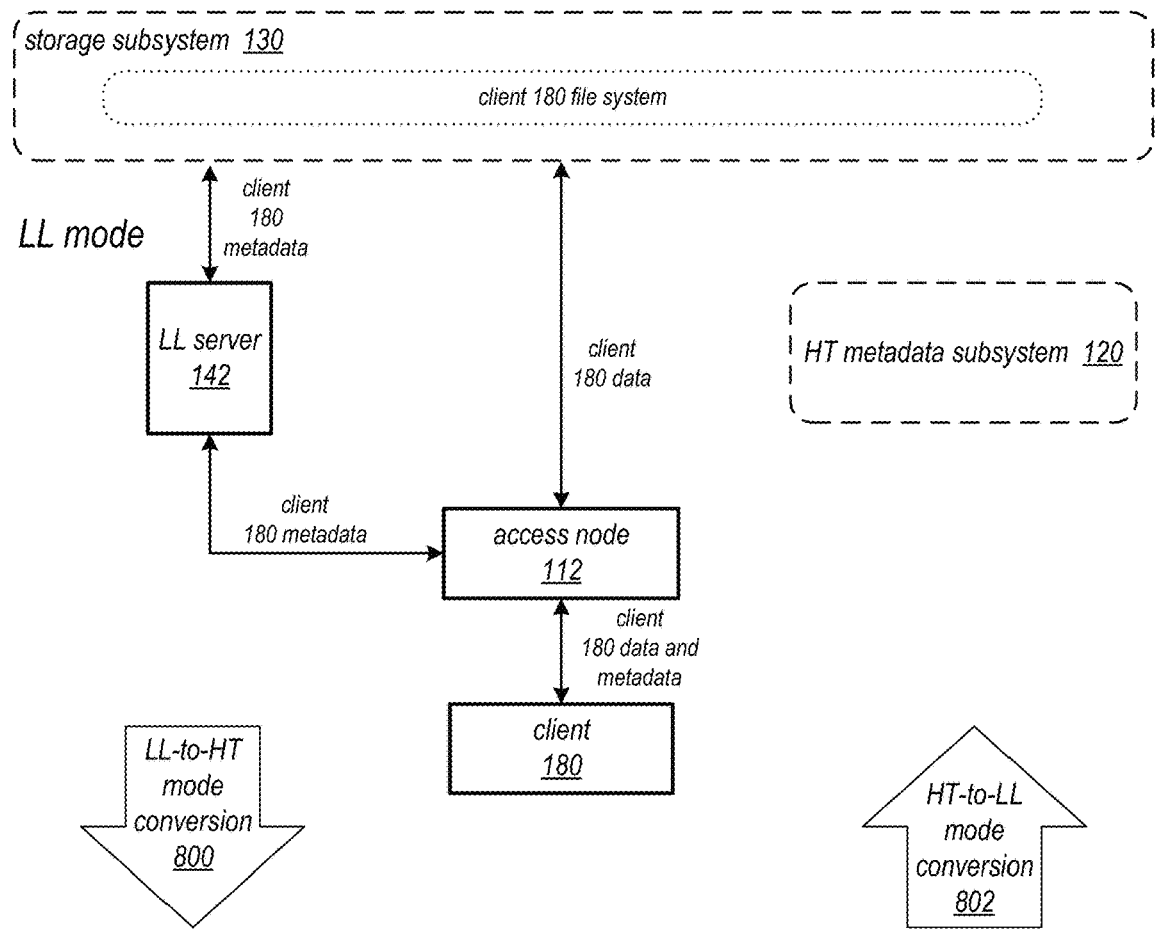
FIG. 8 illustrates converting between file system modes, according to some embodiments.
Figure 8:
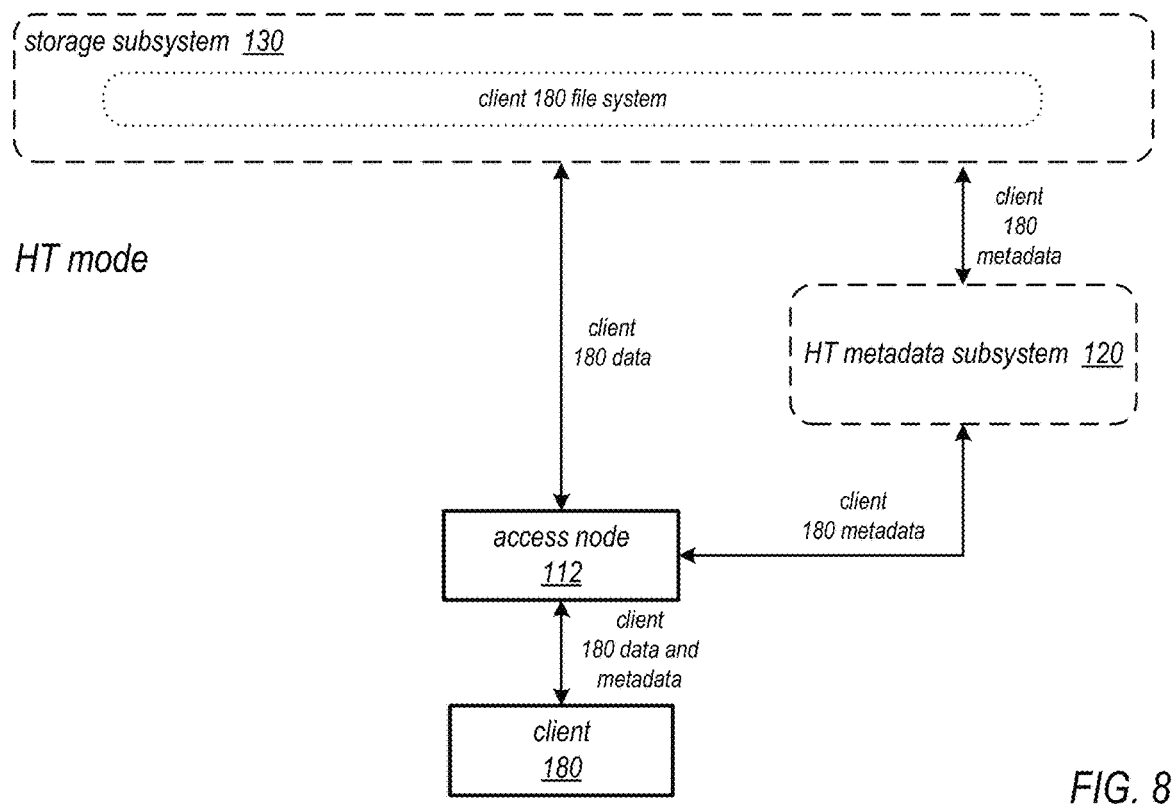
Figure 9A:
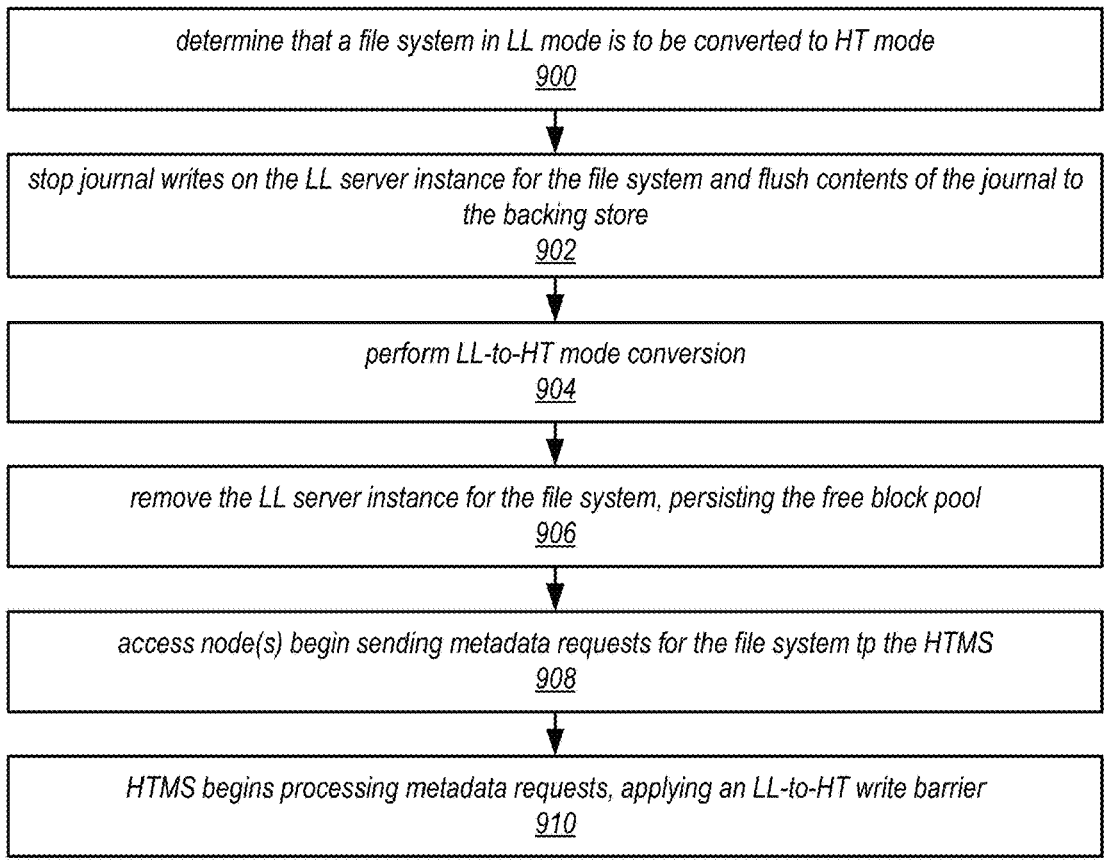
FIGS. 9A and 9B are high level flowcharts of methods for conversions between file system modes, according to some embodiments.

FIG. 8 illustrates converting between file system modes in a DFSS 102 as illustrated in FIG. 1, according to some embodiments. The top portion of FIG. 8 shows a client 180's file system in LL mode; there is an LL server 142 instance associated with the file system. The client 180 communicates with an access node 112 for all file system operations; the access node 112 sends all metadata requests to the LL server 142 instance which performs metadata reads and writes as described herein, for example as illustrated in FIG. 2. In some embodiments, data requests for the file system are handled by the access node 112 by directly communicating with the backend storage subsystem 130. Alternatively, in some embodiments, data requests for the file system may be handled by the access node 112 using the distributed transaction system. The HT metadata subsystem 120 is not currently used for the file system. At some point, an LL-to-HT mode conversion 800 may be performed for the file system, for example as illustrated in FIG. 9A. The bottom portion of FIG. 8 shows the client 180's file system in HT mode after the LL-to-HT mode conversion 800. The client 180 still communicates with an access node 112 for all file system operations. Data requests for the file system are still handled by the access node 112 by directly communicating with the backend storage subsystem 130 or, alternatively, by using the distributed transaction system. However, there is now no LL server 142 instance for the file system; instead, the metadata requests for the file system are sent to the HT metadata subsystem 120, which uses the distributed transaction system to handle the metadata requests. At some point, an HT-to-LL mode conversion 802 may be performed for the file system, for example as illustrated in FIG. 9B, in which case a new LL server 142 may be assigned for the file system, with metadata operations for the file system handled by the new LL server 142 instance.

In some embodiments, a client interface may be provided by the DFSS 102 that may expose an API call to customers of the DFSS 102 that allows the customers to select the mode (LL or HT) for their file system. In some embodiments, a customer may select the mode for new file systems being booted in the DFSS 102, or may choose to change the mode for an existing file system in the DFSS 102.

In some embodiments, instead of or in addition to allowing a customer to specify the mode for a file system, a process or service of the DFSS 102 may automatically determine an FS mode for a customer's new file system or existing file system, for example based at least in part on an evaluation or projection of metadata write operations for the customer's file system, and may automatically set a new file system to one of the FS modes or convert an existing file system from one FS mode to the other FS mode based on that information.

Figure 9B:
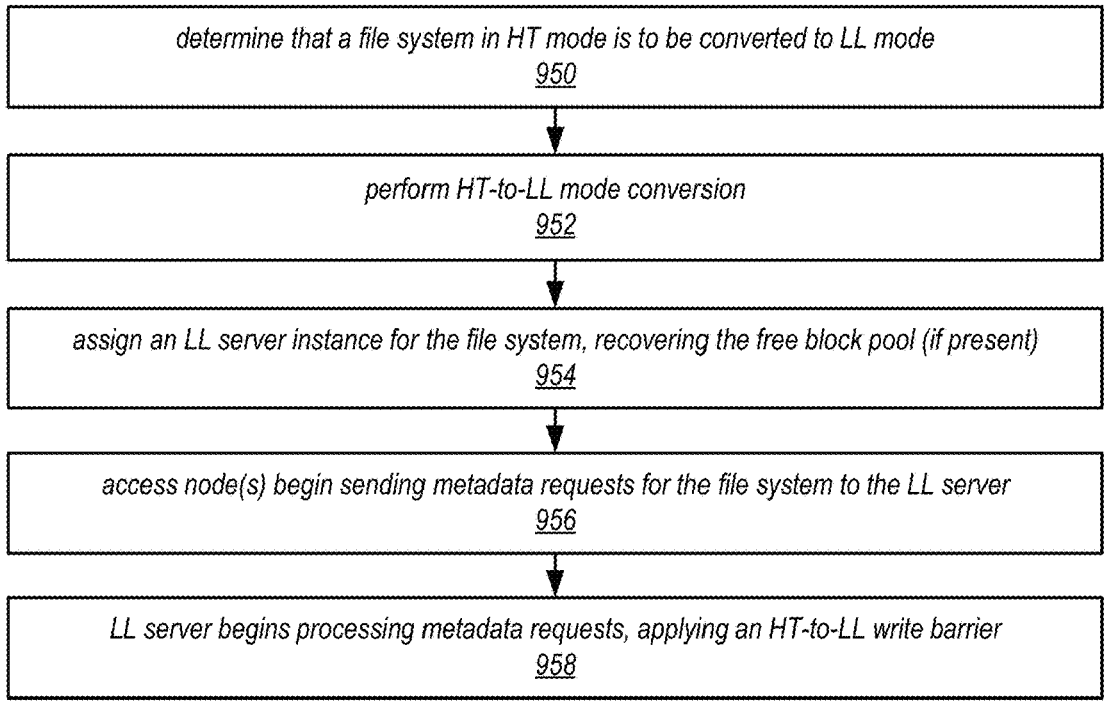

FIGS. 9A and 9B are high level flowcharts of methods for conversions between file system modes, according to some embodiments. FIG. 9A p a high level method for converting a file system from LL mode to HT mode, according to some embodiments. As indicated at 900 of FIG. 9A, it may be determined that a file system in LL mode is to be converted to HT mode. The determination may be made programmatically, or may be determined according to user input. For example, metadata requests to the file system may be monitored and analyzed by a process to determine a best mode for the file system. As another example, a client that owns the file system may request that the file system be converted to HT mode. As indicated at 902 of FIG. 9A, journal writes may be stopped on the LL server instance for the file system, and the journal content may be flushed to the backing store. As indicated at 904 of FIG. 9A, an LL-to-HT mode conversion may be performed. In some embodiments, the mode conversion may involve changing the file system's current mode in the FS mode bock attached to the file system's superblock. As indicated at 906 of FIG. 9A, the LL server instance for the file system may be removed. In some embodiments, the free block pool for the file system may be persisted in the BSS. While not shown, in some embodiments, the allocated blocks for the file system's metadata journal may also be persisted in the BSS (although the content of the journal are flushed as indicated above). As indicated at 908 of FIG. 9A, the access node(s) begin sending metadata requests for the file system to the HTMS. As indicated at 910 of FIG. 9A, the access nodes in the HTMS begin processing the metadata requests for the file system, applying an LL-to-HT write barrier.

FIG. 9B shows a high level method for converting a file system from HT mode to LL mode, according to some embodiments. As indicated at 950 of FIG. 9B, it may be determined that a file system in HT mode is to be converted to LL mode. The determination may be made programmatically, or may be determined according to user input. For example, metadata requests to the file system may be monitored and analyzed by a process to determine a best mode for the file system. As another example, a client that owns the file system may request that the file system be converted to LL mode. As indicated at 952 of FIG. 9B, an HT-to-LL mode conversion may be performed. In some embodiments, the mode conversion may involve changing the file system's current mode in the FS mode bock attached to the file system's superblock. Setting the current mode to LL mode causes HT mode processes to stop and block for the rest of the transition to LL mode to complete. As indicated at 954 of FIG. 9B, an LL server may be assigned for the file system. In some embodiments, the new LL server instance may access the file system's FS mode block (see FIG. 12) to obtain information (e.g., locations for the file system's persisted block pool and journal) and/or to modify one or more of the fields in the FS mode information, for example the LL mode epoch and LL server endpoint. In some embodiments, the persisted free block pool for the file system may be recovered by the new LL server instance, if present. Recovering the free block pool may, for example, include checking available free blocks in the pool and allocating new free blocks if necessary, and generating the in-memory free block list on the new LL server according to the content of the persisted free block pool. The free block pool and in-memory free block list are further described below in the section titled Block allocation for low latency mode file systems with reference to FIGS. 10 and 11. As indicated at 956 of FIG. 9B, the access node(s) begin sending metadata requests for the file system to the LL server instance for the file system. FIG. 9E illustrates an access node attempting to communicate with an LL server for a file system, according to some embodiments. As indicated at 958 of FIG. 9B, the LL server instance begins processing the metadata requests for the file system, applying an HT-to-LL write barrier.

Figure 9C:
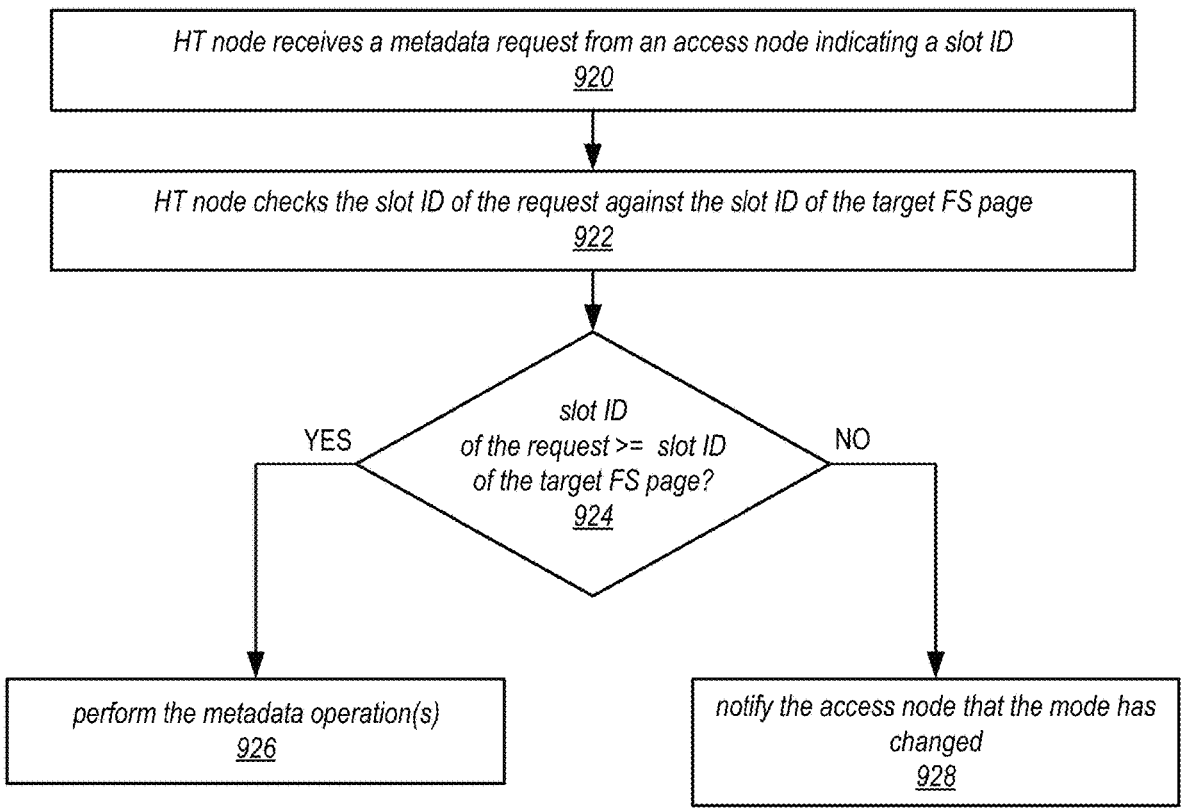
FIGS. 9C and 9D illustrate write barrier methods for file system mode conversions as illustrated in FIGS. 9A and 9B, according to some embodiments.
Figure 9D:
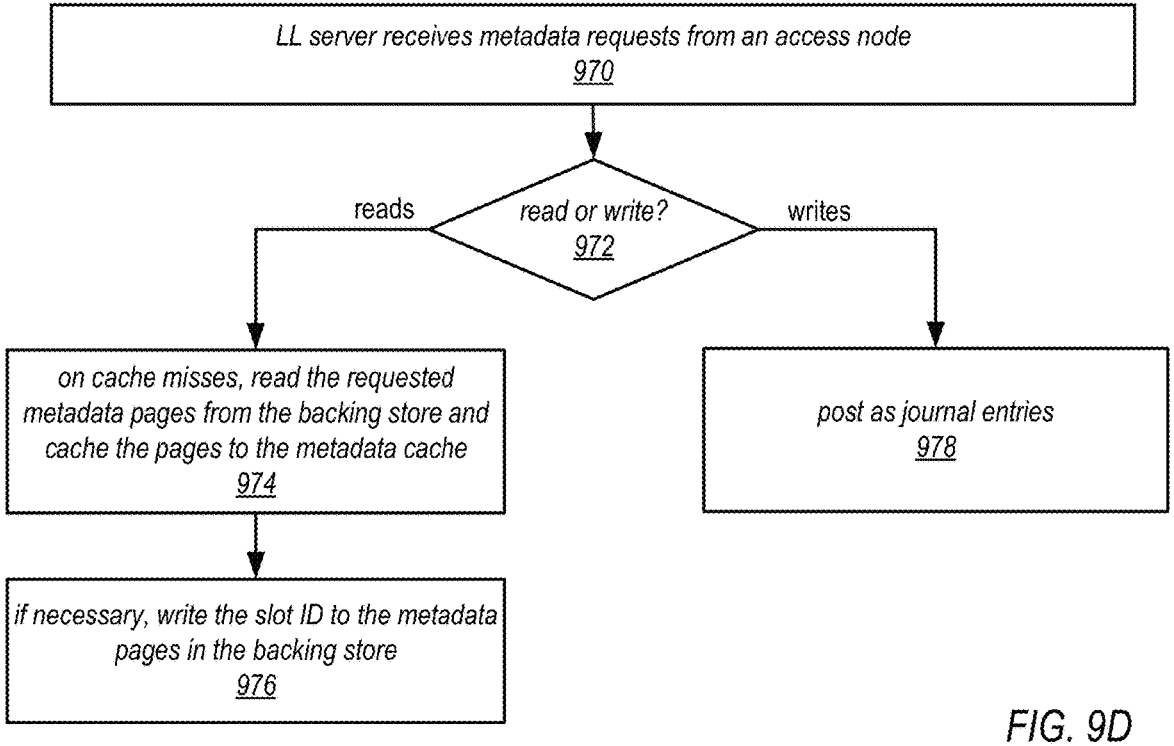
Figure 9E:
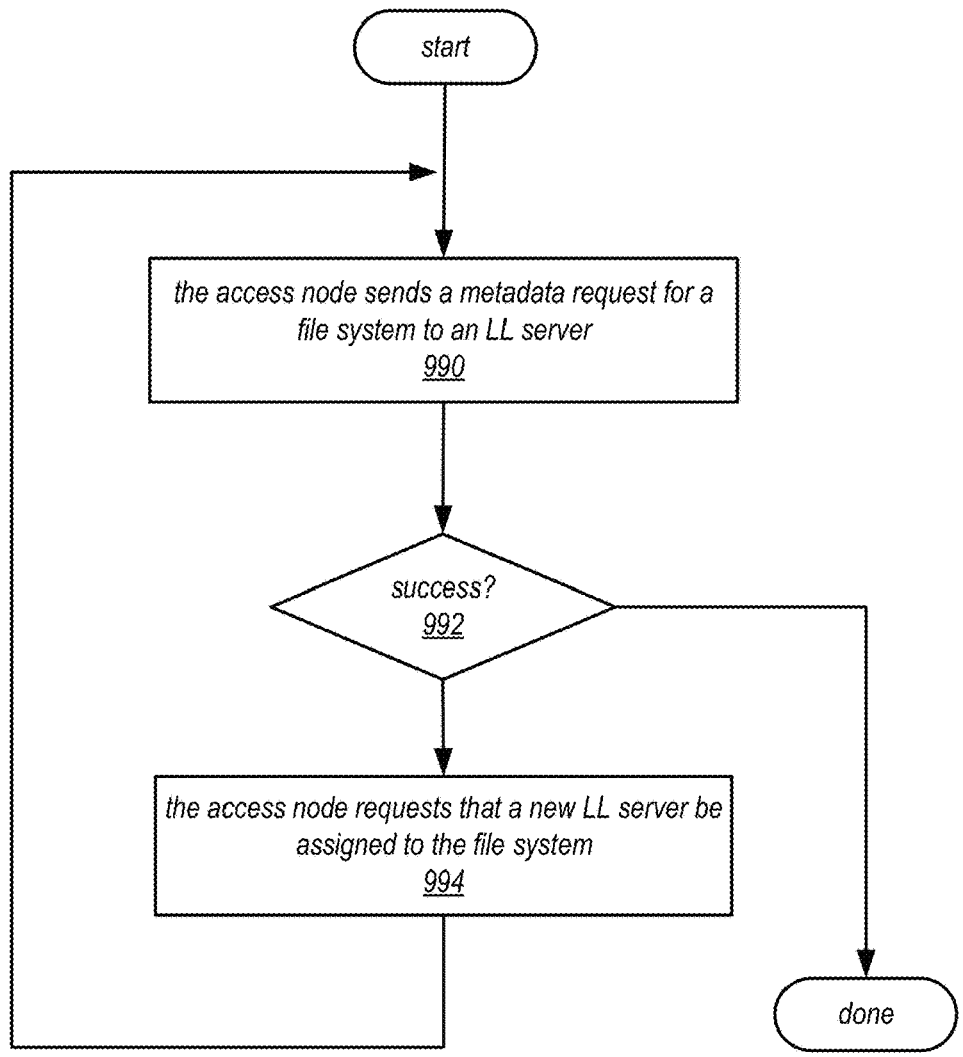
FIG. 9E is a flowchart of a method for an access node to communicate with an LL server for a file system, according to some embodiments.
Figure 15:
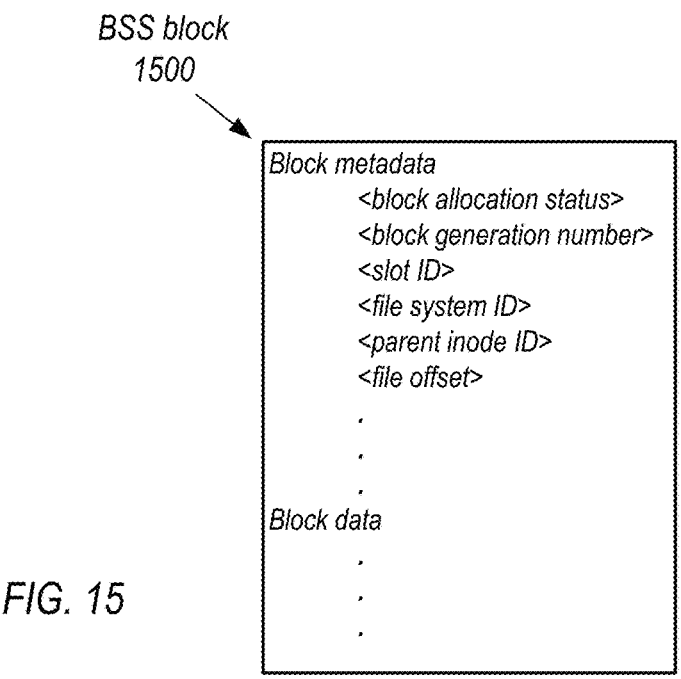
FIG. 15 illustrates an example backend storage subsystem (BSS) block, according to some embodiments.

FIGS. 9C and 9D are high level flowcharts of write barrier methods for file system mode conversions as illustrated in FIGS. 9A and 9B, according to some embodiments. To implement the write barrier methods, embodiments may include a slot ID in each journal page, and may also include a low latency server (LLS) ID in each file system page in the backing store, for example in metadata of each block in the backend storage subsystem. FIG. 14 shows an example journal page 1400, according to some embodiments. FIG. 15 shows an example BSS block 1500, according to some embodiments.

FIG. 9C shows a write barrier method that may be used in the HTMS after converting a file system from LL mode to HT mode, in some embodiments. As indicated at 920 of FIG. 9C, an HT node of the HTMS receives a metadata request for the file system from an access node. The metadata request indicates a slot ID that the access node thinks the file system is currently operating under. As indicated at 922 of FIG. 9C, the HT node checks the slot ID of the request against the slot ID of the target file system page. At 924 of FIG. 9C, if the slot ID of the request is greater than or equal to the slot ID of the target file system page, then the HT node performs the metadata operation in the backing store using the distributed transaction system. Otherwise, if the if the slot ID of the request is less than the slot ID of the target file system, then the HT node notifies the access node that the file system has changed modes as indicated at 928. The access node may then reload its information about the file system, for example from the file system superblock, and may resend the metadata request to the LL server for the file system.

FIG. 9D shows a write barrier method that may be used in the LLMS after converting a file system from HT mode to LL mode, in some embodiments. As indicated at 970 of FIG. 9D, the LL server for the file system receives metadata requests from an access node. At 972 of FIG. 9D, for read requests, on cache misses, the LL server reads the requested metadata pages from the backing store, and caches the pages to the metadata cache as indicated at 974 of FIG. 9D. Note that the metadata cache may initially be empty for the file system; after metadata pages for the file system are written to the metadata cache, requests may be filled from the cache if the respective pages are already cached, or from the backing store if not. As indicated at 976 of FIG. 9D, for at least some metadata pages that are read from the backing store, the LL server may check the slot ID of the pages, and writes the slot ID to the metadata pages in the backing store if necessary to indicate that this LL server now owns the metadata pages in the backing store. In some embodiments, the writes may be performed prior to the caching performed in element 974. However, in some embodiments, the pages may be cached prior to performing the writes. At 972 of FIG. 9D, for write requests, the LL server posts journal entries as previously described.

FIG. 9E is a flowchart of a method for an access node attempting to communicate with an LL server for a file system to handle cases where the attempt fails, according to some embodiments. The method of FIG. 9E may, for example, be performed by an access node at element 956 of FIG. 9B. As indicated at 990 of FIG. 9E, the access node may send a metadata request for a file system in LL mode to an LL server in the LL metadata subsystem, for example to the LL server indicated in the file system's superblock as illustrated in FIG. 13. At 992 of FIG. 9E, if the LL server is currently assigned to the file system, then the attempt succeeds. At 992 of FIG. 9E, if the LL server is not assigned to the file system, then the attempt fails; the access node may receive a message from the LL server indicating that the LL server is not assigned to the file system. At 994 of FIG. 9E, in response to the message, the access node may request the LLMS to assign the file system to another LL server, and the method may return to element 990, where the access node resends the metadata request to another LL server. Alternatively, the access node may try one or more other LL servers prior to requesting assignment of a new LL server to the file system.

File System Mode Conversion Details

When a file system is converted from high throughput (HT) mode to low latency (LL) mode or from LL mode to HT mode, consistency between HT mode and LL mode transactions committed for the file system needs to be ensured. Satisfying this requirement may be challenging because HT mode and LL mode transactions may use different mechanisms to ensure consistency:

HT mode transactions use atomic multi-page writes that are conditional on backed storage system (BSS) information such as BSS slot ID.

LL mode transactions use serialization through a persistent journal safely owned by a single LL metadata manager instance at a time, conditional on presumed authoritative cached page reads made while the LL metadata manager owns the journal, with metadata page writes to backing extents in the BSS (while flushing transactions from the journal) conditional on increasing a slot ID that is stored in page headers of the journal in order to guard against stale writes from LL metadata manager instances.

In the discussion below, it is assumed that slot IDs chosen for LL transactions are strictly increasing across noncontiguous LL mode phases of the file system, which may be required for consistency of LL mode transactions across such phases in some embodiments.

LL to HT Conversion

In some embodiments, when a file system is converted from LL mode to HT mode, no new transactions are committed to its journal, and all committed transactions in its journal are flushed to backing extents. Therefore, late flushing page writes from an LL metadata manager instance do not exceed what should be the final slot ID of any page at the completion of the file system's LL mode phase.

Such late writes may be a problem, however, if writes for subsequent HT mode transactions for the file system could potentially make the metadata pages' slot ID decrease. If, for example, HT transaction page writes simply overwrite the slot ID field in page headers to 0, the following example scenario could happen:

1. While a file system is in LL mode, its LL metadata manager instance journal flushing process issues a slot ID-conditional page write to a metadata block:page (B:0) with a slot ID (e.g., 66). This write remains in transit.
2. The LL metadata manager instance issues the same write over a different connection, which then succeeds. At this point, the file system's journal is flushed, so conversion to HT mode may proceed.
3. The high throughput metadata subsystem (HTMS) writes to B:0 with slot ID 0.
4. The slot ID-conditional page write in step 1 is then processed by the BSS, and it overwrites the page because its specified slot ID (e.g., 66) is greater than 0, and slot ID-conditional writes are not conditional on BSS slot ID.

In some embodiments, this problem may be addressed by requiring that any metadata page write from HTMS specifies a slot ID that is equal to or greater than the current value read from the page's header. If the slot ID of metadata pages never decreases even while a file system is in HT mode, then late page writes from LL metadata manager instances are safe across LL-to-HT mode conversions. In some embodiments, a BSS read page operation may return the current slot ID value in the read page's header, enabling HTMS to specify a value at least as high. In some embodiments, to avoid interfering with future HT-to-LL conversions, the chosen value should be less than any slot ID that will be used for a LL transaction in a subsequent LL mode phase of the file system. The specific slot ID value that HTMS may specify in some embodiments is discussed in the following section.

HT to LL Conversion

In some embodiments, for HT to LL mode conversions, the following conditions may apply:

The conversion should not involve a conditional mechanism on journal flushing page writes because at that point the associated LL transaction has already been committed, with success returned to the client. Page reads cached by an LL metadata manager instance should be ensured to be valid for transactions committed while that LL metadata manager instance owns the file system's journal.

HT transactions may not be synchronized with file-system-wide state. For example, HT transactions are not all conditional on the file system's superblock or FS mode block.

The following is an example possible scenario that may occur:
1. HTMS issues a HT mode transaction with two conditional writes, one to block:page A:0 conditional on current slot 100 and one to B:0 conditional on current slot 200, leaving the slot ID of both pages at their HT-initial value of 0. The calling access node believed the file system to be in HT mode, although the file system may have been converted to LL mode after the access node looked up its mode from the superblock but before HTMS even started this transaction.
2. Conversion to LL mode completes, and in order to satisfy a page read of B:0 from the LL metadata node, the owning LL metadata manager instance caches B:0 slot 200 and slot ID 0.
3. The HT mode transaction of step 1 completes successfully, and A:0 is now at slot 110 and B:0 is now at slot 220.
4. The LL metadata node issues a LL mode transaction including a write to B:0 based on slot ID 0 (whose content match slot 200), which commits to the journal successfully at slot ID 6.
5. The LL metadata manager flushes the LL mode transaction of slot ID 6 from the journal, issues a slot ID-conditional write to B:0 with slot ID 6. 6 is greater than 0, so the write succeeds.

The write to B:0 for the HT mode transaction, which was committed at slot 220 in step 3, is therefore clobbered, although the write to A:0 that was committed at slot 110 as part of the same HT mode transaction remains.

In some embodiments, this problem may be addressed by imposing a write barrier between HT mode transactions from a file system's HT phase and LL metadata manager cache fills of metadata pages dirtied by those transactions in a subsequent LL phase of the file system. In particular, the following methods may be performed in some embodiments.

When a file system is converted from LL mode to HT mode, after all committed transactions are flushed from its journal, the next slot ID in the journal is reserved to represent the upcoming HT phase of the file system. In the special case of a file system being in HT mode on creation, slot ID 0 may be used to represent that initial HT phase.

When a file system is converted from HT mode to LL mode, the next slot ID in the journal is reserved as the initial slot ID of this LL phase. In the special case of a file system being in LL mode on creation, slot ID 0 may be used as the initial slot ID of that initial LL phase.

In both cases, this representative/initial slot ID may be persisted in the file system's superblock along with its mode (HT or LL).

When an access node of the DFSS looks up the mode of a file system, which it does in order to know whether to issue metadata operations to the HTMS or to the LL server for the file system in the LLMS, it also looks up the slot ID. If the mode is HT, the access node passes the slot ID representing this HT phase to HTMS for all operations.

As described in the previous section, in some embodiments, the BSS read page operation may be augmented to return the current slot ID value in the read page's header.

The following describes a write barrier that may be used when switching FS modes in some embodiments.

When HTMS reads a metadata page, if the slot ID in the page's header is greater than the HT phase slot ID passed by the calling access node, HTMS returns an error to the access node indicating that the access node needs to refresh the file system's mode information from the superblock. HTMS page writes are conditional on the BSS slot ID, ensuring that this slot ID condition is maintained if a page write or transaction succeeds.

When an LL metadata manager instance is filling an entry in its page cache with the result of a BSS read page operation, if the current slot ID in the page's header is less than the initial slot ID of the current LL phase (as described above, a property persisted in the superblock along with the epoch, so it is known to the LL metadata manager instance), then before filling the cache entry the LL metadata manager instance issues a conditional write to the page setting the slot ID in its header to that initial value for the phase. If the conditional write fails, the LL metadata manager instance reads the page again and retries.

This method may add to the cost of some LL metadata manager instance page cache fills, making them a read-modify-write instead of just a page read, but only incurs that extra cost once per LL phase of the file system per metadata page that existed before that phase. In some embodiments, it is not necessarily a goal to optimize the speed of file system mode conversions, but it may desirable to avoid perpetual cost to LL mode file system performance for the sake of HT-to-LL mode conversion safety, which this write barrier method may satisfy.

In some embodiments, there are two metadata structures that are only written to with HT mode transactions:
The file system superblock
The FS mode block Since the persisted slot ID lives in these metadata structures, BSS HT mode clients should be able to read the structures without knowing the slot ID in advance. If there were a slot ID-conditional write to these structures that updated the slot ID of the page, BSS HT mode clients hit the HT-to-LL write barrier described above while attempting to learn the slot ID.

The following is an example of the HT-to-LL write barrier method. For the purpose of this example, a file system's superblock contains the following fields related to the file system's current red vs. black mode:
FS mode: HT or LL
Slot ID
LL mode epoch
LL server endpoint (e.g., a socket address)

LL mode epoch and LL server endpoint are only meaningful when the FS mode is LL, although the epoch value is preserved across HT mode phases in between LL mode phases.

The slot ID is meaningful for either mode. For HT mode, slot ID indicates the slot ID used for all transactional page writes started during this HT mode phase. For LL mode, slot ID indicates the initial slot ID of this LL mode phase.

Consider a file system that begins life in LL mode, with the following superblock state:
FS mode: LL
Slot ID: 0
LL mode epoch: 0
LL server endpoint: 12.3.4.56:7890

The LL server for the file system has written transactions through slot ID 400 in the journal

| Slot ID |
| --- |
| 1 . . . 400 |
| LL phase |

The file system is then converted to HT mode. After the conversion is committed, all transactions in the journal are flushed, and then a final slot is committed to the journal to represent the HT phase:

| Slot ID | |
| --- | --- |
| 1 . . . 400 | 401 |
| LL phase | HT phase |

In some embodiments, a slot may be written to indicate the commitment of the file system to HT mode conversion, before flushing. In some embodiments, a slot write may be performed that brings the journal's head up to reflect completion of flushing; this slot write may be, but is not necessarily, to the same slot ID used for the HT phase.

After the above is performed, the superblock has the following state:

FS mode: HT
Slot ID: 401
LL mode epoch: 0
LL server endpoint: 12.3.4.56:7890

An access node in the DFSS reads the superblock to determine the file system's mode. If the mode is HT, the access node also uses the slot ID, passing it to HTMS for all transactions. HTMS checks that the slot ID in the page header of all metadata pages read is less than or equal to the slot ID passed by the calling access node. If that condition fails, an error is returned to the access node indicating that it needs to refresh the file system's state from its superblock. If that condition succeeds, then any slot-conditional write of such pages ensures that it holds for the duration of an HT mode transaction. That condition fails if an LL metadata manager for a later LL phase of the file system has filled its cache with such a page.

Assume that the file system is converted back to LL mode after the access node has read the file system's HT mode and 401 slot ID. The superblock state becomes:
FS mode: LL
Slot ID: 402
LL mode epoch: 1
LL server endpoint: 12.3.4.56:7890
And the slot ID history becomes:

| Slot ID | | |
| --- | --- | --- |
| 1 . . . 400 | 401 | 402 . . . |
| LL phase (LL epoch 0) | HT phase | LL phase (LL epoch 1) |

When the LL server needs to read a page from a backing extent to fill its cache, it first issues a normal BSS read page, which returns the slot ID from the page header as well as the slot ID. If the page header's slot ID>=402, the cache fill can complete with the result of the page read. Otherwise, the LL server issues a BSS write page conditional on the read slot that is a no-op except that it specifies a new value of 402 for the slot ID in the page header. If this conditional write fails, the LL server can just retry by reading the page again. Once the conditional write succeeds, the cache fill can complete with the result of the read, and LL mode transactions may be committed based on the cached page data. A late HT mode transaction writing to this page will then fail on reading the newly-written slot ID, either on first read or on re-read after a conditional write failure.

LLMS Integration into DFSS

As shown in FIG. 2, to improve the latency of DFSS metadata operations, embodiments of an LLMS are described that may provide a metadata page cache and per-file system metadata journal both managed by an LL metadata manager. In some embodiments, the LL metadata manager may support BSS read/write and transaction APIs, and all metadata operations for a given file system may be directed to a single LL metadata manager in the LLMS by access nodes in the access layer. In some embodiments, to achieve scale requirements and to reduce the pressure on the page cache and journal, DFSS requests for file data blocks in a file system are not routed through the file system's LL metadata manager.

In some embodiments, the LLMS de-linearizes internal metadata and file data operations in the DFSS. This may affect some operations of the DFSS, and modifications may be made to the DFSS to maintain consistency guarantees. In particular, file system (e.g., NFS) read and write operations should behave correctly despite the fact that backend read/write requests are not serializable with respect to metadata operations that also affect file data blocks (i.e. block allocation, deletion, and backpointer updates).

LL Metadata Manager

In some embodiments, the LL metadata manager resides between the access layer and the BSS in the DFSS. In some embodiments, one or more file systems in LL mode may be assigned to an LL metadata manager. Alternatively, in some embodiments, there is one LL metadata manager per DFSS file system in LL mode. All requests in the LLMS for a given file system will go through its assigned LL metadata manager. This may be done so that (1) the LL metadata manager can authoritatively cache metadata to reduce read latency, and (2) the LL metadata manager can record multi-extent transaction updates in a single per-file system journal. The journal is a durable store (e.g., using the BSS), and responses to requests can be sent as soon the updates are in the journal. The journaled operations may be asynchronously applied to the backing extents in the BSS.

In some embodiments, there may be a single metadata node instance in the LLMS per LL file system (referred to as an LL metadata node); the access node(s) in the access layer may communicate with the LL metadata node for a file system in LL mode for file system metadata operations. In some embodiments, the LL metadata node may be collocated it with the LL metadata manager (e.g., on an LL server 142 as illustrated in FIG. 2), for example to reduce latencies. This does not affect access node-metadata node interactions, but it may simplify internal metadata node operations, for example block allocation.

In some embodiments, the access node may bypass the LL metadata manager (and the journal and cache) for file data read and write requests in the LL file system; thus, stale information may be observed in the BSS. The journal contains block allocation/deletion commands, and unless requests are routed through the LL metadata manager, the access node may observe old states. This may affect several operations in the DFSS. The following sections describe several methods and mechanisms that may be used in embodiments of an LLMS to address this issue.

Block Allocation

FIG. 15 illustrates an example block 1500 in a BSS, according to some embodiments. A BSS block 1500 may include block metadata and block data. A BSS block 1500 assigned to a file system may be either a metadata block or a data block for the file system, depending on the type of extent in which the block is located; the extent's type may be indicated in extent header information. In some embodiments, for block allocation (and deallocation) in the BSS, there are two attributes or fields of a block 1500's metadata that may be modified: a block allocation status, and a block generation number. The block allocation status is a per-block field (e.g., a bit) that indicates whether or not the block is in use by a file system. The generation number is a token generated during block allocation that may, for example, be used to verify that the physical block 1500 has not been deleted and reallocated for another purpose. In some embodiments, the block metadata may also include a slot ID field. The slot ID may for example, be used to indicate an LLS that owns the page, and may also be used in a write barrier method, for example as illustrated in FIG. 9C, to determine if the file system to which this block is allocated is in LL mode or has changed FS modes. In some embodiments, the slot ID for a file system is incremented for each new LLS instance assigned to the file system, and thus higher slot IDs indicate more recent LLS instances.

In some embodiments, additional metadata may be stored within a block 1500, for example a file system ID (fsid) for the file system to which this block is allocated, a parent inode ID, and a file offset. These additional metadata may, for example, be used for various assertions and disaster recovery situations. In some embodiments, the pair <generation, fsid> may be referred to as the block owner, and the pair <parent inode ID, file offset> may be referred to as the backpointer.

In some embodiments, the per-block metadata resides in the BSS extent. However, in LL mode, any changes to the per-block metadata may first be written to the metadata journal for the file system by the LL metadata manager. As a result, the BSS extent is not the sole authority regarding the allocation status of a block 1500. Unflushed updates to the block metadata may exist in the journal, and this may require techniques for the access nodes in the DFSS to interact with file data in a DFSS that implements LL mode file systems and a LLMS, for example as described below.

Extending a File

Consider a scenario in the DFSS using HTMS in which a data block D is being added to inode I as a result of a client's request to expand a file. In some embodiments, the following time-line of events may occur:

1. The access node makes a request to the HTMS to extend the file.
2. The LL metadata node finds a free block D (e.g., in the FS block pool), and with a transaction allocates the block with generation number G and adds the block pointer to the inode's block map.
3. The access node receives a response with the pointer to the new block, D:G.
4. The access node issues a write block request to the BSS for block D:G.
5. The BSS receives the request, validates that D is allocated with generation G, and updates the block's page data.
6. The access node issues a set attribute request to the HTMS, which updates the change attribute for I.

The above actions correspond to the following state changes:

[A] D is allocated as D:G (allocated=true, owner=<G, F>, backpointer=null).
[BP] D:G is updated with backpointer=<I, offset>.
[FP] I is updated to include a forward pointer to D:G.
[W] D:G's data is updated, using owner=<G,F> and backpointer=<I,offset>.
[C] I is updated with a new change attribute.

In the DFSS using HTMS, A, BP, and FP may be performed in a single transaction and thus occur at the same linearization point. W occurs at a strictly later point in time, followed by C. In other words,

A=BP=FP<W<C

This operation is successful because the following constraints are met.

A<=BP:D:G is allocated before the backpointer is set
A<W:D:G is allocated before the write is issued In some embodiments, for the file system to be in a consistent state at all times, the following constraints should be met:

A=BP=FP:D:G is atomically allocated with the addition of forward and backward pointers.

Note that BP and FP have no effect on the outcome of the write. The backpointer update may seem like a concern as it also affects the state of D. However, in some embodiments, the backpointer is not validated on writes, for example due to engineering constraints. Instead, the backpointer is updated with the current value provided with the data write request. Any reordering of BP and FP with regard to the data-write (W) are not visible to the client.

Extending a File in LL Mode

In the DFSS using LLMS, there may be a more complex relationship of the operations in time if metadata requests are routed through the LL metadata manager while data requests are issued directly against the BSS. Also, the point of view has an effect on what is seen.

External View:
A<C
BP<C
FP<C
W<C
File System View:
A=BP=FP<C
W<C

Several critical properties may be affected when the LL metadata manager is bypassed for data read/writes. The allocation of A potentially conflicts with other requests in the system, and since the atomicity of {A, BP, FP} is lost, it may not be possible to properly abort BP and FP. In addition, the isolation property that A=BP=FP is broken externally, which implies that all metadata operations, including those not initiated by clients (e.g., a file system consistency check (FSCK)), should be run through the LL metadata manager.

Another issue in LL mode when bypassing the LL metadata manager is that the write is no longer guaranteed to succeed. The write request (W) can reach the block D before the allocation of D:G is applied from the LL metadata manager's journal. Thus, in some embodiments, the following techniques may be used to maintain correctness in some embodiments.

Per-File System Free Block Pool

In some embodiments, a set of "free" blocks in the BSS that are pre-allocated to a file system but not yet linked to a file system object may be maintained. The set of free blocks may be referred to herein as a block pool (see, e.g., FIG. 10). Blocks from the file system's block pool may be used by the associated LL metadata node when objects need to be allocated for the file system in LL mode. Any changes to the block pool (e.g., pre-allocating new free blocks) may be performed through the transaction infrastructure as these operations should serialize with operations on the block pools of other file systems in LL mode, and of block operations for file systems in FS mode. This provides the following causal relationships.

External View:
A<BP
A<FP
A<W<C
File System View:
A<BP=FP<C
A<W<C

The critical constraint A<W is thus maintained, and the client observable behavior is substantially identical to that for file systems in HT mode. The data write is able to complete because the journal is bypassed, and the data block is directly allocated prior to the request to the LL metadata node to extend the file.

However, through all points of view, A<BP and A<FP. In other words, there may exist points in time in which D is allocated and associated with the file system, but does not have a useful backpointer. (In some embodiments, some file system operations, for example FSCK, may be modified to allow for this state). Further, the state of D has bifurcated into two different identities. The backpointer should be read through the LL metadata manager to maintain the expected consistency with regard to the forward pointer, though the data portion of D may still be accessed directly in the BSS. D's allocation bit is also only readable through the LL metadata manager (i.e. a successful write to the BSS is not proof that the block was allocated). In this example, block pointers were requested from the LL metadata node, which linearizes this request with others that mutate the state of the block map. Thus, in the discussion of methods for truncating a file later in this document, additional methods for handling cases where the block pointers are fetched from the access node's block map cache are described.

Concurrent Requests

In some embodiments, multiple read and write requests for the same portion of a file may be concurrently issued by a client. In some embodiments, there may be no strong guarantees about the outcome of these types of workloads. However, methods may be provided that help to insure that behavior when handling concurrent requests for file systems in LL mode is correct.

In some embodiments, if two writes to the same new portion of a file are concurrently issued, then their metadata changes may be properly serialized in the LL metadata manager, and both requests are eventually directed to the same data block. In some embodiments, ordering with regard to data writes or the subsequent attribute updates may not be guaranteed.

In some embodiments, concurrent reads and writes for file systems in LL mode may be affected by the LL metadata manager as described below. Consider a read and write concurrently issued for the same new region of a file. Both requests may contact the LL metadata manager to get the block located at the given offset. If the read request wins, then no pointer is returned and the access node returns zeros back to the client. There is a race that occurs if the write request wins. Consider the following set of actions:

[A] D is allocated as D:G (allocated=true, owner=<G, F>, backpointer=null)
[BP] D:G is updated with backpointer=<I, offset>
[FP] I is updated to include a forward pointer to D:G
[R] D:G's data is read, expecting owner=<G, F> and backpointer=<I, offset>
[W] D:G's data is updated, using owner=<G, F> and backpointer=<I, offset>

The following causal relationships is observed by the access node:
A<BP=FP<C
A<W
A<R The relationship BP<R is lost, as BP may only exist in the intent log when the data read is issued to the BSS. In the current system, we verify the content of the backpointer after a data-read (for paranoia, not correctness). Because of the LL metadata manager, the backpointer may be null (or some other sentinel chosen when allocating the block). In some embodiments, the backpointer could be read through the LL metadata manager before issuing the BSS read, but that may be costly. Instead, in some embodiments, validations of read responses may be updated to accept null as an acceptable value. Using this method, there is no client-observable change in behavior when a file system is in LL mode.

Deleting a File

In some embodiments of a DFSS, file deletion may take one of two paths, depending on the file size: (1) the file and its data blocks are deleted in-line with the client request, or (2) the file is renamed into a pending deletion directory, and the data blocks are truncated during a background job before the inode is itself deleted.

In some embodiments, the LL metadata manager may not introduce any significant change in behavior for file deletions. In some embodiments of the DFSS, large files are asynchronously deleted, and thus the access node properly handles the scenario where a file is deleted but its data blocks are still accessible. For read operations, the access node may issue an attribute check and observe if a file was deleted by a previous request. For write operations, there is also an attribute check, but it may be fulfilled from an access node-local cache. Some embodiments may rely on the attribute update after the data write occurs to observe if the file was deleted.

Truncating a File

In some embodiments, truncate requests may be serialized through the LL metadata manager. In some embodiments, the correctness of individual or concurrent truncate requests may not be a concern. However, in some embodiments, the following methods may be employed so that a truncate properly affects subsequent read/write operations.

In some embodiments, when a client receives a response to a truncate request, the RBX journal will contain all block deletions and block map updates related to the request. However, access nodes may still have pointers to these deleted blocks in their block map cache. In DFSS using HTMS for file systems in HT mode, the access node learns that a block map cache entry is stale when a pointer is followed during reads/writes. However, in DFSS using LLMS for file systems in LL mode, the extent is no longer the authority of a block's allocation status. Thus, in some embodiments, the access node observes the allocation status in the LL metadata manager to properly linearize read and write operations with any previous truncate operation, as described below.

Read Operations

Consider the following scenario in which Client 1 is truncating a file to zero, and Client 2 is reading the file at offset=x. The concern is with the case that Client 2 issues the read after Client 1 receives a response from the truncate request:

Client 1 issues truncate of I to zero bytes.
  [T] D:G is deleted a during truncate of I.
Client 2 issues a 1-byte read of I at offset=x.
  [L] Look up block_ID for <I, offset>, and finds D:G in the access node's cache.
  [V] The access node verifies that D:G is allocated via the LL metadata manager or LL metadata node.
  [R] D:G's data is read, expecting owner=<G, F> and backpointer=<I, offset>

The step [V] for Client 2 may ensure that the result of the read is consistent with truncate [T]. Because [T]<[V], Client 2 observes that cached block map pointers are stale. In some embodiments, to reduce latency, [V] may be issued concurrently with the data read [R]. If [V] fails, we restart the operation even if the data-read succeeded.

Write Operations

In some embodiments, the write case may be handled similarly to the read case. As in the read case, a verification step [V] ensures that any data block IDs that are used are current with regard to prior truncate operations:

Client 2 issues a 1-byte read of I at offset=x.
  [L] Look up block ID for <I, offset>, and finds D:G in the access node's cache.
  [V] The access node verifies that D:G is allocated via the LL metadata manager or LL metadata node.
  [W] D:G's data is written with owner=<G, F> and backpointer=<I, offset>.
  [C] I is updated with a new change attribute.

In some embodiments, to avoid additional latency, [V] may be combined with the attribute update [C]. However, [V] executes before [C] so that attributes are only updated after the data write occurs. In some embodiments, the access node may clear the block map cache entry and retry if [V] fails. The subsequent attempt issues a write request to the LL metadata node, and a new block may be assigned to the file if needed.

Unaligned Truncates

In some embodiments, if a truncate does not align to block boundaries, a metadata node may zero-out the portion of the block that was truncated. These writes should go directly to the BSS instead of to the journal, as BSS is the authority for file data.

Inlined Inode Data

In some embodiments of a DFSS a first portion (e.g., 4 KB) of a file may be stored in the second page of the inode block. In some embodiments, this data is zeroed as part of the final truncate transaction. However, the journal cannot contain any updates to data pages (as the BSS owns file data), and thus in some embodiments the BSS may be directly updated to zero the data prior to the commit of the final truncate transaction. Some embodiments may use assertions to verify that the inlined data pages are never modified using the file system's metadata journal.

Free Block Management

The management of a per-file system free block pool may pose two competing requirements. First, allocating a block can interfere with other clients in a system, which means that multi-extent transactions (e.g., by the LL metadata node associated with the file system) should be used to pre-allocate the block and insert an associated pointer into the free block pool. Second, the LL metadata manager uses the journal to insert blocks into file system objects (e.g. expanding a file), also referred to herein as assigning the free blocks to file system objects. To meet both requirements, a method is needed to remove pointers from the free block pool once assigned by the LL metadata manager. The following provides example methods that may be used in some embodiments.

Using the distributed transaction system supported by the BSS, remove the block from the free block pool: In some embodiments, multi-extent transactions may be used to atomically remove the block from the free block poll and place the commit record in the journal for the set of operations that link the block into the file system. However, this method may add to the latency of common requests (e.g. expand file, create link, etc.). Also, this method may require a new type of transaction instruction.

Partitioned free-pool: In some embodiments, the free block pool may be partitioned into two collections; (1) is used by a worker to expand the free pool, while (2) is exclusively used by the LL metadata node to pick blocks from. (1) grows with multi-extent transactions, while (2) only issues pointer removals via updates in the journal. There may be a point in time in which a collection of type (1) is sealed from further additions, and is now available for use by (2). A new instance of (1) must be created and linked into the superblock.

Other methods that may be used for allocating and assigning blocks from a free block pool are discussed in the following section titled Block allocation for low latency mode file systems.

Block Allocation for Low Latency Mode File Systems

In some embodiments of a distributed file storage service (DFSS), the low latency metadata subsystem (LLMS) splits the process of allocating and assigning blocks in the backend storage subsystem (BSS) to files for a file system in low latency mode into two separate phases: one phase which uses distributed, multi-extent transactions, for example as used in the high throughput metadata subsystem (HTMS), to allocate blocks to the low latency mode file systems into a dedicated per-file-system pool of free blocks in the BSS, and a second phase which assigns those free blocks out of the pool to individual files or other file system data structures for the respective file system.

In some embodiments, the HTMS does not differentiate between these two phases; a single transaction allocates blocks in the BSS and assigns the allocated blocks to files by creating metadata links all as part of a single atomic operation. In the LLMS, these operations are split into separate phases for at least two reasons. First, operations performed by a low latency server (LLS) in the LLMS occur only in the context of a single file system, so the LLS operations may not provide the isolation between file systems that is required for block allocation because the blocks are allocated out of a single global pool. The second reason is that the multi-extent transactional operation for block allocation and assignment used in HTMS takes longer—permitting the LLS to allocate blocks from a dedicated pool of pre-allocated free blocks for the file system may reduce latency.

In at least some embodiments, in the first phase of block allocation and assignment in the LLMS, an asynchronous process of the LLS (e.g., implemented by the LL metadata node on the LLS) monitors the number of free blocks in the file system's block pool and uses the multi-extent, distributed transaction system used by HTMS to pre-allocate replacement blocks in the BSS (e.g., when the number of blocks fall below a low water mark, or in anticipation of demand based on analysis of allocation rate), and maintains a link (e.g., in local memory of the LLS) to the pre-allocated free blocks in the free block pool. In the second phase, other process(es) of the LLS (e.g., implemented by the LL metadata manager on the LLS) assign free blocks out of the pool to files or other file system data structures for the respective file system in response to file system operations received from an access node of the DFSS. In at least some embodiments, the block assignments may be performed by the LLS process(es) performing journal writes to the file system's metadata journal in the BSS. The LLS notifies the access node of the block assignments as soon as the journal writes are committed to the journal. The corresponding journal pages are asynchronously committed in the BSS; however, the access node can write data to the assigned blocks without waiting for the respective block assignments to be committed to the BSS.

Using different components for the two phases permits those components to use different isolation guarantees. In LLMS, the global allocation performed in the first (pre-allocation) phase provides isolation between different file systems but is not latency sensitive, whereas the second (assignment) phase only needs to ensure that allocations are isolated between other uses of the same file system. In addition, the LLMS block allocation method permits data writes to occur to a block in the BSS out of order with respect to the blocks' assignment to a file; the LLMS block allocation method does not need to ensure that blocks are assigned in the BSS before the blocks are used.

Figure 10:
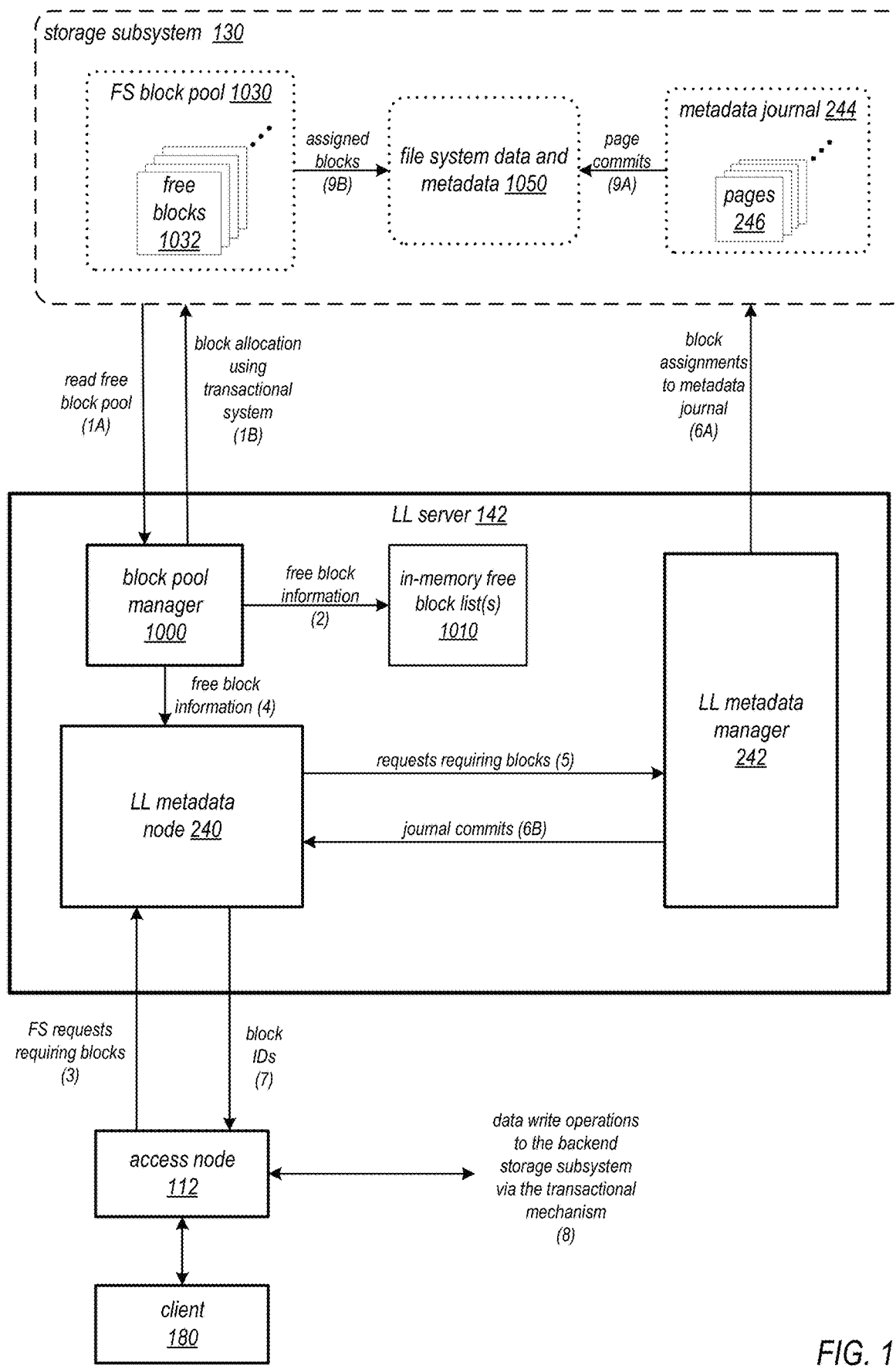
FIG. 10 illustrates block allocation and assignment for file systems in low-latency mode in a DFSS, according to some embodiments.

FIG. 10 illustrates block allocation and assignment for file systems in low-latency mode in a DFSS, according to some embodiments. The block allocation and assignment components and methods as illustrated in FIG. 10 may be implemented in a DFSS 102 as illustrated in FIGS. 1 and 2, in some embodiments. In some embodiments, an LLS 142 may include, but is not limited to, an LL metadata node 240, an LL metadata manager 242, a metadata page cache 248, and a metadata journal 244. In some embodiments, metadata page cache 248 may be implemented in memory and/or storage of or local to the LL server 142. In some embodiments, metadata journal 244 may be implemented in the backend storage subsystem 130 that also stores the file system's data and metadata 1050. In some embodiments, metadata journal 244 may instead be implemented in a different storage subsystem or storage service external to the LL server 142, or in storage or memory of or local to the LL server 142. In some embodiments, an LL metadata node 240 and an LL metadata manager 242 may be implemented as processes or virtual machines (VMs) within the LL server 142.

In some embodiments, the LL server 142 may implement a block pool manager 1000. In some embodiments, the block pool manager 1000 may be implemented by the LL metadata node 240 of the LL server. The block pool manager 1000 may maintain pre-allocated free blocks 1032 in FS block pools 1030 on the storage subsystem 130 for each LL file system associated with the LL server 142. In some embodiments, a file system's FS block pool 1030 may be attached or linked to the file system's superblock, for example as pointer(s) to linked list(s) of free blocks 1032 in an FS mode block as illustrated in FIG. 13. In some embodiments, the FS block pool 1030 for a file system persists across transitions to new LL servers 142 and across conversions between FS modes. Upon assignment of an LL server 142 to a file system in LL mode, the block pool manager 1000 may read the free block pool 1030 for the file system to determine the number of free blocks 1032 in the pool 1030 (1A in FIG. 10). If necessary, the block pool manager 1000 pre-allocates additional free blocks 1032 in storage subsystem 130 for the file system in LL mode associated with the LL server 142 (1B), for example using the multi-extent distributed transaction system that may also be used by the HTMS for storage subsystem 130 block allocation to file systems in HT mode. If no FS block pool 1030 exists for a file system that is assigned to the LL server 142, for example if the file system is a new file system that is starting up in LL mode or if this is the first time the file system has been transitioned to LL mode, the block pool manager 1000 may create a block pool 1030 for the file system and fill the block pool 1030 with pre-allocated free blocks 1032. In some embodiments, the block pool manager 1000 also records information about the pre-allocated free blocks 1032 in the file system's block pool 1030 (e.g., block IDs) to a free block list structure 1010 for the file system maintained in memory of the LL server 142 (2).

The block pool manager 1000 may, for example, be implemented as a background process that monitors available free blocks 1032 in the FS block pool 1030 and may use the distributed transaction system to pre-allocate new free blocks 1032 in the storage subsystem 130, for example if the number of available free blocks 1032 in the pool 1030 fall below a threshold or low water mark. In some embodiments, instead of or in addition to pre-allocating free blocks 1032 for a file system based on a low water mark, the block pool manager may monitor a block usage (or block allocation) rate for the file system, and may proactively pre-allocate additional free blocks 1032 as the demand for blocks increases so that the blocks are available as needed. Block pre-allocation may be performed by the block pool manager 1000 asynchronously with file system operations performed by the LL metadata node 240 and LL metadata manager 242 ((3)-(7) in FIG. 10).

While not shown in FIG. 10, in some embodiments there may be two or more different types of blocks that are used by the file system and that are pre-allocated by the block pool manager 1000 as free blocks 1032 in pool 1032. Broadly, there may be one or more block types for file system data, and one or more block types for file system metadata. In some embodiments, the block pool manager 1000 may pre-allocate blocks for each type, and may maintain separate lists in the file system's FS block pool 1030 and free block list structure 1010 for each block type. The block pool manager 1000 may monitor the pool 1030 of free blocks 1032 of each type, and may pre-allocate new free blocks 1032 for any block type, for example if the number of free blocks 103 of a type drops below a threshold for that type, or if demand for that type increases.

As previously noted, the LLMS 110 may need to assign a new LL server 142 for a file system in LL mode, for example if the current LL server 142 for the file system goes down or otherwise becomes available. An LL server 142 transition process may then be performed, for example as described later in this document. In some embodiments, the FS block pool 1030 in storage system 130 persists across the transition, for example attached to the file system's superblock as shown in FIG. 13; however, the free block list 1010 maintained in local memory of the LL server 142 is ephemeral, and is lost when the server 142 goes down or becomes unavailable. Thus, in some embodiments, during the transition process to a new LL server 142, in addition to reading the FS block pool 1030 and allocating additional free blocks 1032 as necessary, the new LL server may reconstruct the in-memory free block list 1010 from the persisted block pool 1030 information read from storage subsystem 130, for example by accessing the information from the file system's superblock.

FIG. 10 graphically illustrates a method or process for assigning blocks for a file system in LL mode in the LLMS, according to some embodiments. At (3), the LL data node 240 of the LL server 142 for the file system may receive a file system request from an access node 112 in the access subsystem 110 of the DFSS 102; the file system request may be for an operation that requires new blocks to be assigned in the backend storage system 130 for the file system. Examples of operations that may require new blocks include, but are not limited to, file system data operations such as creation of new files and extension of existing files, and file system metadata operations such as creation of new directories or other metadata structures.

Instead of using the multi-extent distributed transaction system to allocate blocks for the operation as is done by the HT metadata nodes 122 in the HTMS, in the LLMS, the LL metadata node 240 of the LL server 142 for the file system may access the free block list 1010 (e.g., via the block pool manager 1000) to locate free blocks 1032 for the operation (4). The LL metadata node 240 may then send an indication of the request to the LL metadata manager 242 on the LL server 142, including an indication of the free blocks 1032 for the operation (e.g., block IDs for one or more free blocks 1032) (5). In some embodiments, instead of the LL metadata node 240 accessing the list 1010 to locate free blocks 1032, the LL metadata manager 242 may obtain information about free block(s) to be assigned to fulfill the request from the in-memory free block list 1010 after receiving the request from the node 240. The LL metadata manager 242 generates one or more journal write requests for the block assignment(s) and sends the journal write requests to the backend storage subsystem 130 to be stored in pages 248 in the metadata journal 244 on the backend storage subsystem 130 (6A). In at least some embodiments, two or more journal write requests may be parallelized. Once the LL metadata manager 242 receives an indication from the backend storage subsystem 130 that the journal writes have been committed to the metadata journal 244, the LL metadata manager 242 informs the LL metadata node 240 that the journal writes have been committed (6B). The LL metadata node 240 in turn notifies the access node 112 of the assigned block IDs for the operation indicated by the request (7). Note that if the operation includes a metadata read/write operation, then the LL server 142 may perform the metadata operation as previously described.

After receiving the block IDs from the LL metadata node 240, the access node 112 may perform data write operations for the client 180 to the blocks (8). Thus, instead of having to wait for all of the transactional operations to both allocate and assign blocks for an operation in the LL file system to be committed in the backend storage subsystem 130 as in HT mode, in LL mode the LL metadata node 240 only needs to wait for the (possibly parallelized) journal write requests to be committed to the metadata journal 244 to inform the access node 112 of the block assignments, thus significantly reducing the latency at the access node 112 for block allocation and assignment for file system operations such as file creation or file extension operations when compared to similar operations for file systems in HT mode.

Figure 11:
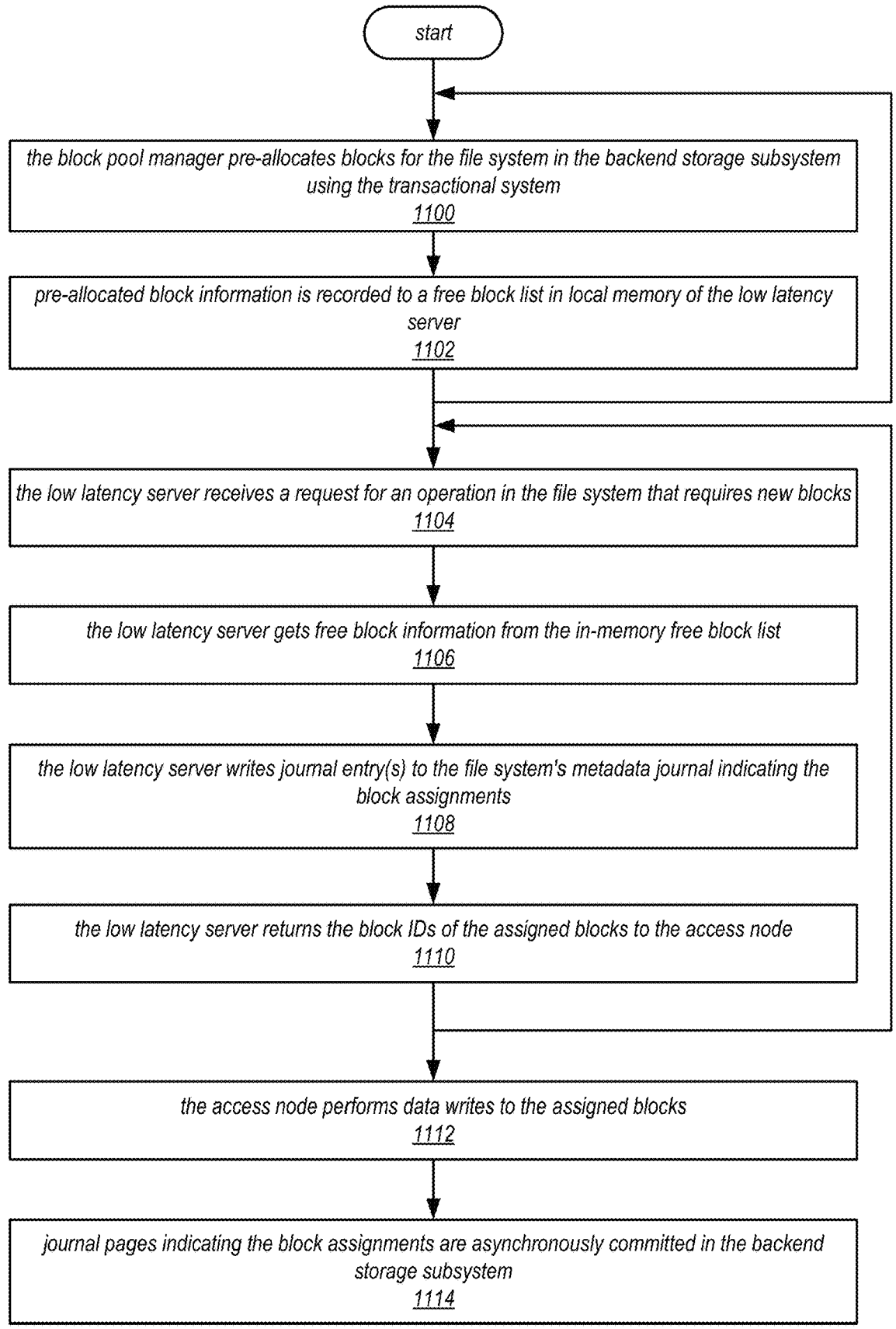
FIG. 11 is a flowchart of a method for block allocation and assignment for file systems in low-latency mode in a DFSS, according to some embodiments.

FIG. 11 is a flowchart of a method for block allocation and assignment for file systems in low-latency mode in a DFSS, according to some embodiments. The block allocation and assignment method as illustrated in FIG. 11 may be performed in a DFSS 102 as illustrated in FIGS. 1, 2, and 10, in some embodiments. As indicated at 1100, a block pool manager 1000 (e.g., a background process of the LL server 142) pre-allocates free blocks 1032 for the file system in LL mode in the backend storage subsystem 130 using the distributed transaction system that is also used by the HT metadata nodes 122 to allocate and assign blocks for file systems in HT mode. The pre-allocated free blocks 1032 may be maintained in an FS block pool 1030 on the storage subsystem 130 specific to the LL file system associated with the LL server 142. In some embodiments, the FS block pool 1030 may be attached or linked to the LL file system's superblock, for example as pointer(s) to linked list(s) of free blocks 1032 as illustrated in FIG. 13.

As indicated at 1102, pre-allocated block information is recorded to a free block list 1010 in local memory of the low latency server 142. The block information may include, but is not limited to, block IDs for the free blocks in the backend storage subsystem 130.

Elements 1100 and 1102 correspond to phase one of the block allocation and assignment process for file systems in LL mode. As shown by the arrow returning from element 1102 to element 1100, the background block allocation process (phase one) may continue asynchronously to the operations performed in elements 1104-1114 (phase two). In some embodiments, the block pool manager 1000 may monitor the block pool 1030 for the file system and allocate new free blocks 1032 upon detecting that the free blocks 1032 in the pool have dropped below a threshold or low water mark.

As indicated at 1104, the low latency server 142 receives a request for an operation in the file system that requires new blocks from an access node 112. Examples of operations that may require new blocks include, but are not limited to, file system data operations such as creation of new files and extension of existing files, and file system metadata operations such as creation of new directories or other metadata structures. As indicated at 1106, the low latency server 142 gets free block information (e.g., block IDs) from the in-memory free block list 1010 for blocks to fulfill the operation indicated by the request. As indicated at 1108, the low latency server 142 generates and writes journal entry(s) (e.g., using the distributed transaction system) to the file system's metadata journal 244 in the storage subsystem 130 indicating the block assignments. As indicated at 1110, the low latency server 142 returns the block IDs of the assigned blocks to the access node 112 as soon as the low latency server 142 receives an indication that the journal writes are committed to the journal 244 in the backend store 130.

As indicated by the arrow returning from element 1110 to element 1104, the low latency server may continue to assign blocks for file system operations asynchronously to the operations performed at elements 1112 and 1114.

As indicated at 1112, the access node 112 may perform data writes to the blocks after receiving the block IDs for the assigned blocks from the low latency server 142. Thus, instead of having to wait for all of the transactional operations to both allocate and assign blocks for a file system operation to be committed in the backend storage subsystem 130 as in HT mode, in LL mode the access node 112 only needs to wait to be informed that the journal writes are committed to the metadata journal 244, thus significantly reducing the latency at the access node 112 for block allocation and assignment for file system operations that require block allocation and assignment when compared to similar operations for file systems in HT mode.

As indicated at 1114, the journal pages indicating the block assignments may be asynchronously committed in the backend storage subsystem 130. In some embodiments, a journal flushing process may asynchronously commit the journal pages 246, including pages 246 corresponding to the block assignments, from the file system's journal 244 to extents in the backend storage subsystem 130. In some embodiments, committing the journal page 246 for a block assignment involves committing the actual block assignment of the respective free block(s) 1032 in extents in the backend data store 130, for example by modifying the block headers to indicate the blocks' assignment to files, directories, etc. in the respective file system. In at least some embodiments, journal flushing is performed asynchronously to operations being performed by the LL server 142.

Elements 1112 and 1114 of FIG. 11 may be performed asynchronously to each other and thus in any order. For example, at 1112, the access node 112 may perform a data write to a block after receiving the block ID for the assigned block from the low latency server 142; the journal page that indicates the block assignment for a block that the access node 112 writes to may have, or may have not, been committed to the extent in the backend storage subsystem 130 before the access node 112 writes to the block.

Note that, for file systems in LL mode, the access nodes 112 may write data to blocks assigned by the LL server 142 with a journal write prior to the resulting journal page being flushed to the backend storage subsystem 130, and thus prior to the actual block assignment being committed in the backend storage subsystem 130.

LL Mode Block Allocation and Assignment Details

This section provides further details of block allocation and assignment methods and apparatus for file systems in low-latency mode in a DFSS, according to some embodiments. For file systems in LL mode, block allocation is not performed using multi-extent transactions in-line with client file system requests as is done for file systems in HT mode. Instead, a two-phase method is employed in which a per-file-system pool of pre-allocated blocks is maintained (phase one), and block assignment for the file system is performed by moving a free block from the pool to its target location via journal operations performed by the LL server (phase two). Thus, latency is reduced for operations that require block allocations in LL mode because the access node(s) in the DFSS only need to wait for a journal commit to be confirmed rather than having to wait for a multi-extent transactional operation to perform the block allocation and assignment as is done in HT mode.

Embodiments may include a free block list structure (referred to as a block pool), maintained in the backend storage system, for each file system in LL mode. In some embodiments, the block pool for a file system is only modified by the LL server using the distributed transaction system that is also used for HT file system operations in the DFSS. The LL server may implement background threads or processes that pre-allocate blocks of all types using transactions and adds the blocks to the block pool. In some embodiments, once a block is added as a free block to the block pool for the file system, the block is not modified using the HT transaction system (i.e., the block is now owned by the LL server).

In some embodiments, each file system in the DFSS may have an associated persistent data structure (referred to as a superblock) that may include information about the file system, for example where the file system's inodes are (e.g., a pointer to a root inode), information about the client that owns the file system, and so on, for example as shown in FIG. 13. In some embodiments, a file system (FS) mode block may be attached or linked to the superblock that contain FS mode information for the file system. The FS mode information may, for example, include an indication of which mode (LL or HT) the file system is currently in, and if in LL mode, an indication of the current low LL server for the file system. In some embodiments, each block that is allocated and added to the block pool will have the FS mode block as its parent. In some embodiments, the block pool may be maintained as a linked list of block pool pointers with the head of the list stored in the FS mode block. In some embodiments, each linked list node is a page with pointers to block pools.

In some embodiments, when the LL metadata node on the LL server issues a call to find a free block, the block is returned from the block pool for the file system. The LL metadata node issues an LL mode transaction to the LL metadata manager on the LL server to assign the block to an inode; the transaction is written to the file system's journal by the LL metadata manager. The LL mode transaction that is written to the journal reads in the block through the LL metadata manager on the LL server and modifies the block as part of the transaction. When the transaction is committed from the journal, the pointers will be updated in the backing store.

In some embodiments, the file system block pool is persisted in the backend storage system. In some embodiments, an in-memory representation of the block pool is maintained on the LL server (referred to as a free block list). As blocks are added to the block pool, the in-memory free block list is modified accordingly. In some embodiments, the block pool/free block list is not modified in-line with client requests received from the DFSS access node(s). In some embodiments, when a new LL server is assigned for a file system in LL mode, the LL server reads the persisted block pool in the backend storage subsystem to allocate new free blocks if necessary and to re-create the in-memory free block list for the file system.

In some embodiments, the LL server may implement a block pool manager that interacts with the storage subsystem to perform block pool management functions using the distributed transaction system that is also used for HT mode file system transactions in the DFSS. The block pool manager functionality may include, but is not limited to:

Keeping the block pool populated with a sufficient number of free blocks of one or more types. In some embodiments, the block pool manager may monitor the pool and, upon detecting that the number of free blocks of a particular type have fallen below a threshold or low water mark, allocate new blocks of the type in the backend storage system using the distributed transaction system.

Maintaining the in-memory free block list. The free block list is updated upon allocating new free blocks to the block pool.

Pruning the block pool after blocks have been assigned.

In some embodiments, the LL metadata node may access the block pool manager to obtain free block(s) for file system operations being performed. The LL metadata node may then provide block assignment information (e.g., block IDs, file identifiers, etc.) about the block(s) to the LL metadata manager, which posts the block assignment information to the journal. In some embodiments, when committing the journal pages in the storage subsystem to actually perform the block assignments that were posted to the journal, a journal flushing process may use an allocate block process that reads the block from the block pool and ensures that the block has not already been allocated, for example by determining that the block still has the FS mode block as its parent. This check may be performed to insure that the same block is not assigned from the file system's block pool more than once.

Alternative Block Allocation Methods

In some embodiments, a partitioned free block list may be sued, with ownership split between the LL metadata node and the LL metadata manager. In these embodiments, the LL metadata node owns the free block list but passes ownership to the LL metadata manager. The LL metadata manager is then responsible for getting blocks from the free block list for assignment.

In some embodiments, there may be no persisted block pool. Instead, the LL metadata node maintains free block allocations (using the transaction system also used in HT mode) in its local memory. On shutdown/crash of the LL server or LL metadata node, the state of the free block allocations is lost and a cleanup process may be necessary. Thus, without the persisted block pool, there may be operational concerns about how fast garbage could be generated/cleaned up during LL server transitions.

Cross-Zone Resource Placement for LL Mode File Systems

FIG. 12 illustrates an example provider network environment in which embodiments of a DFSS that implements an LLMS as described herein may be implemented. In some embodiments, the low latency metadata subsystem (LLMS) 140 may be implemented in or by a distributed file storage service (DFSS) 102 of a provider network 1200 that includes multiple regions or zones. FIG. 12 shows three zones A, B, and C, but there may be more or fewer zones in a provider network 1200. The DFSS 102 and its components (e.g., the access subsystem 110, backend storage subsystem (BSS) 130, high throughput metadata service (HTMS) (not shown in FIG. 12), and LLMS 140) may be distributed across the zones, with clients' file systems distributed across the BSS 130 and generally accessible by clients 180 in from any zone. The LLMS 130 may create a single low latency server (LLS) 142 instance for each file system in LL mode within a zone.

This section describes methods for distributing LLMS 140 resources across a zone, including the LLS 142 instances and their components, as well as the location of the metadata journal 244 for each file system in LL mode (referred to as a LL file system). In some embodiments, an LL file system and its associated LLS 142 instance may be accessible by clients 180 from all zones. However, there may be a performance advantage (e.g., lower latency) to clients 180 running in the same zone as the LLS 142 instance due to the shorter network round trip time between the clients and the LLS 142. Methods may thus be provided to determine which zone to place the LLS 142 instance for an LL file system in to reduce latency for LL mode operations for client(s) 180 of the file system.

In some embodiments, the choice of which zone of the provider network to place the LLS 142 for their LL file systems in may be provided to the DFSS 102 customers. In some embodiments, a client interface may be provided by the DFSS 102 that may expose an API call to the LLMS 140 to customers of the DFSS 102 that allows the customers to specify a particular zone of the provider network 1200 as the location of the LLS 142 for their LL mode file system. In some embodiments, the customer may choose the zone for the LLS 142 for new file systems being booted in LL mode (or HT file system being converted to LL mode), or may choose to move the LLS 142 for an existing LL file system to a different zone.

In some embodiments, instead of or in addition to allowing a customer to specify a zone for their LLS 142 instance, a process or service of the LLMS 140 may automatically select a zone to place the LLS 142 instance for the customer's LL file system (or to transition the customer's LLS 142 instance to), for example based at least in part on an evaluation of which zone would be optimal for that customer's LL file system and associated provider network resources. In some embodiments, the selection may be based on one or more of the following:

Randomly selecting a zone of the LLS 142.

Selecting a zone with the (most) available capacity in distributed LLMS 142 resources.

Selecting a zone based on where the customer's resources (e.g., client 142 instances) reside (e.g., placing the LLS 142 instance in the same zone as the customer's client 142 instance that will be accessing the LL file system via the LLS 142 instance).

Tracking the request history for a given LL file system. If most of the requests arrive from a zone other than the one currently hosting the LLS 142 instance for the LL file system, move (e.g., via the LLS transition process described herein) the LLS 142 to that zone.

However, note that other methods may be used to select zones for LLS instances 142 in some embodiments.

In some embodiments, in addition to methods for selecting zones in which to place or move LLS 142 instances for LL file systems, methods may be provided for placement of the blocks in the LL file system's metadata journal 244. In some embodiments, each block of a file system's journal 244 resides on a different BSS extent, and each extent hosting journal blocks may include blocks for multiple different file systems. Read and write operations to an extent where the extent's current master is in the same zone as the client 180 experience lower latency due to one less cross-zone network round trip. Latency may be reduced for journal writes by avoiding a cross-zone hop between the LLS 142 in a first zone (e.g., zone B) and BSS node(s) in a different zone (e.g., zone A) that hosts at least part of the file system's journal 244. However, a constraint that may be imposed on the LLMS 140 is that the file system's journal 244 should be accessible even if that first zone (zone B) fails completely. In some embodiments, to reduce latency by limiting or eliminating cross-zone hops for journal writes while also meeting the accessibility constraint, the following methods and apparatus may be implemented.

In some embodiments, an extent type of the BSS that hosts file system journals 244 includes a configuration parameter which indicates a preferred zone for a respective file system. BSS 130 servers in the preferred zone bias mastership of those extents towards the preferred zone by increasing or decreasing the average delay before they nominate themselves for mastership of the extents.

In some embodiments, when allocating blocks to a journal 244, instead of randomly choosing from all journal extents or requiring that the journal 244 be re-created with newly allocated blocks each time an LLS 142 migrates between zones, a journal 244 may be created that consists of segments of similarly-biased extents in the different zones. For recovery and safety properties this results in a single journal 244, but an LLS 142 instance only writes to the journal pages in the same-zone portion of the journal 244. For example, as illustrated in FIG. 12, the journal 244 for a file system may consist of three segments: N blocks with zone A bias, N blocks with zone B bias, and N blocks with zone C bias. The LLS 142 instance for the file system in zone B only writes to blocks in the zone B segment. In some embodiments, each time the LLS 142 instance reaches the end of the zone B segment, the LLS 142 instance writes a skip record into the block (or blocks) in the other two segments. Using this journal organization, the journal write barriers and journal acquisition processes previously described can be performed as if there is a single long journal 244, but each LLS 142 instance for the file system only uses its zone-local segment it for normal operations, which provides lower latency than would be realized by accessing the other segments.

Example Distributed File Storage Service

An example high-availability, high-durability, scalable distributed file storage service in which embodiments of the methods and apparatus for providing a low latency mode for file systems in the distributed file storage service (DFSS) may be implemented is described. In at least some embodiments, the file storage service may be designed to support shared access to files by thousands of clients, where each individual file may include very large amounts (e.g., petabytes) of data, at performance, availability and durability levels that are targeted to be independent of the size of the file and/or the number of concurrent users. One or more industry-standard file system interfaces or protocols may be supported by the service, such as various versions of NFS (network file system), SMB (Server Message Block), CIFS (Common Internet File System) and the like. Accordingly, in at least some embodiments, the consistency models supported by the distributed file storage service may be at least as strong as the models supported by the industry-standard protocols—for example, the service may support sequential consistency. In a distributed system implementing a sequential consistency model, the result of an execution of operations implemented collectively at a plurality of executing entities (e.g., nodes or servers of the distributed system) is expected to be the same as if all the operations were executed in some sequential order. The file storage service may be designed for use by a wide variety of applications, such as file content serving (e.g. web server farms, software development environments, and content management systems), high performance computing (HPC) and "Big Data" applications such as media, financial, and scientific solutions requiring on-demand scaling of file store capacity and performance, and the like. The term "file store" may be used herein to indicate the logical equivalent of a file system—e.g., a given client may create two different NFS-compliant file stores FS1 and FS2, with the files of FS1 being stored within one set of subdirectories of a mountable root directory, and the files of FS2 being stored within a set of subdirectories of a different mountable root directory.

To help enable high levels of scalability, a modular architecture may be used for the service in at least some embodiments. For example, a physical storage subsystem including some number of multi-tenant storage nodes may be used for file store content, while a logically distinct metadata subsystem with its own set of metadata nodes may be used for managing the file store content in one implementation. The logical separation of metadata and data may be motivated, for example, by the fact that the performance, durability and/or availability requirements for metadata may in at least some cases differ from (e.g., more stringent than) the corresponding requirements for data. A front-end access subsystem, with its own set of access nodes distinct from the metadata and storage nodes, may be responsible for exposing network endpoints that allow clients to submit requests to create, read, update, modify and delete the file stores via the industry-standard interfaces, and for handling connection management, load balancing, authentication, authorization and other tasks associated with client interactions. Resources may be deployed independently to any one of the subsystems in some embodiments, e.g., to the access subsystem, the metadata subsystem, or the storage subsystem, without requiring corresponding deployment changes at the other subsystems. For example, if a triggering condition such as a potential performance bottleneck is identified in the access subsystem, or if some set of access subsystem nodes experience a network outage or other failure, additional access subsystem nodes may be brought online without affecting the storage or metadata subsystems, and without pausing the flow of client requests. Similar deployment changes may be made at other subsystems as well in response to various types of triggering conditions. In some embodiments, the access subsystem nodes in particular may be implemented in a largely stateless manner, so that recovery from access node failures may be especially efficient.

In at least some embodiments, the content of the file store metadata objects (e.g., data structures representing attributes of directory entries, links, etc.) may themselves be stored on devices managed by the storage subsystem—although, as described below, in some cases different policies may be applied to the storage objects being used for the data than are applied to the storage objects being used for metadata. In such embodiments, the metadata subsystem nodes may, for example, include various processes or threads of execution that execute metadata management logic and coordinate the storage of metadata content at the storage subsystem. A given storage subsystem node may include several different types of storage media in some embodiments, such as some number of devices employing rotating magnetic disks and some number of devices employing solid state drives (SSDs). In some embodiments a given storage subsystem node may store both metadata and data, either at respective different storage devices or on the same storage device. The term "file store object" may be used herein to refer collectively to data objects such as files, directories and the like that are typically visible to clients of the storage service, as well as to the internal metadata structures (including for example the mappings between logical blocks, physical pages and extents discussed below), used to manage and store the data objects.

In at least some embodiments, the distributed file storage service may be built using resources of a provider network, and may be designed primarily to fulfill storage requests from other entities within the provider network. Networks set up by an entity such as a company or a public sector organization to provide one or more network-accessible services (such as various types of cloud-based computing or storage services) accessible via the Internet and/or other networks to a distributed set of clients may be termed provider networks herein. Some of the services may be used to build higher-level services: for example, computing, storage or database services may be used as building blocks for a content distribution service or a streaming data processing service. At least some of the services of a provider network may be packaged for client use in service units called "instances": for example, a virtual machine instantiated by a virtualized computing service may represent a "compute instance". Computing devices at which such compute instances of the provider network are implemented may be referred to herein as "instance hosts" or more simply as "hosts" herein. A given instance host may include several compute instances, and the collection of compute instances at a particular instance host may be used to implement applications of one or more clients. In some embodiments, the file storage service may be accessible from some subset (or all) of the compute instances of a provider network, e.g., as a result of assigning the appropriate network addresses to the access subsystem nodes of the storage service, implementing the authorization/authentication protocols that are used for the virtual computing service, and so on. In some embodiments, clients outside the provider network may also be provided access to the file storage service. In various embodiments, at least some of the provider network services may implement a usage-based pricing policy—e.g., customers may be charged for a compute instance based at least partly on how long the instance was used, or on the number of requests of various types that were submitted from the compute instance. In at least some such embodiments, the file storage service may also employ usage-based pricing for at least some categories of client requests—e.g., the service may keep records of the particular file system interface requests that were completed on behalf of a given customer, and may generate billing amounts for the customer on the basis of those records.

The file store service may support high levels of data durability in some embodiments, e.g., using any of a number of different replication techniques. For example, in one embodiment, file store data and metadata may be physically stored using storage units called extents, and the content of an extent may be replicated at various physical storage devices. The content of an extent may be referred to herein as a "logical extent", to distinguish it from the physical copies at the different physical storage devices, which may be referred to as "extent replicas", "replica group members", or "extentlets" or a "replica group". In one implementation, for example, a file (or a metadata object) may be organized as a sequence of logical blocks, with each logical block being mapped to one or more physical data pages. A logical block may considered a unit of striping, in that at least in some implementations, the probability that the content of two different logical blocks of the same file (or the same metadata structure) are stored at the same storage device may be low. Each replica of a given logical extent may include some number of physical data pages. In some embodiments, erasure-coding based extent replicas may be used, while in other embodiments, other replication techniques such as full replication may be used. In at least one embodiment, a combination of erasure coding and full replication may be used. A given modification request from a client may accordingly be translated into a plurality of physical modifications at respective storage devices and/or respective storage subsystem nodes, depending on the nature of the replication policy in use for the corresponding file store object or metadata. In some embodiments, one or more of the extent replicas of a replica group may be designated as a master replica, and updates to the extent may be coordinated, e.g., using a consensus-based replicated state machine, by the storage service node that is hosting the current master. Such a storage service node may be termed a "master node" or a "leader" herein with respect to the extent for which it stores a master replica. In one implementation, if N extent replicas of a given logical extent are being maintained, a quorum of M (where $M>=N/2$) of the replicas may be needed, and such a quorum may be obtained using an update protocol initiated by the leader/master node, before a particular update is committed. In one embodiment, some extents may be used entirely for file content or data, while other extents may be used exclusively for metadata. In other embodiments, a given extent may store both data and metadata. In some implementations, a consensus-based protocol may be used to replicate log records indicating state changes of a given file store, and the content of the state may be replicated using a plurality of extents (e.g., using either full replication or erasure-coded replicas). Replicated state machines may also be used to ensure consistency for at least some types of read operations in various embodiments. For example, a single client read request may actually require a plurality of physical read operations (e.g., of metadata and/or data) at various extents, and the use of replicated state machines may ensure that the result of such a distributed read does not violate the read consistency requirements of the targeted file store.

A variety of different allocation and sizing policies may be used to determine the sizes of, and relationships among, logical blocks, physical pages, and/or the extents for data and metadata in different embodiments as described below. For example, in one straightforward implementation, a file may include some number of fixed size (e.g., 4-megabyte) logical blocks, each logical block may include some number of fixed size (e.g., 32-kilobyte) physical pages, and each extent may include sufficient storage space (e.g., 16 gigabytes) to store a fixed number of pages. In other embodiments, different logical blocks may differ in size, physical pages may differ in size, or extents may differ in size. Extents may be dynamically resized (e.g., grown or shrunk) in some embodiments. Static allocation may be used for logical blocks in some embodiments (e.g., all the physical storage for the entire logical block may be allocated in response to the first write directed to the block, regardless of the size of the write payload relative to the size of the block), while dynamic allocation may be used in others. Various techniques and policies governing logical block configurations and corresponding physical storage space allocations are described below in further detail. In some embodiments, different file stores managed by the file storage service may implement distinct block/page/extent sizing and configuration policies. Depending on the write sizes that the file system interfaces being used allow clients to specify, a given write operation from a client may result in the modification of only a part of a page rather than the whole page in some cases. If, in a given implementation, a physical page is the minimum level of atomicity with respect to writes supported by the storage subsystem, but write requests can be directed to arbitrary amounts of data (i.e., writes do not have to be page-aligned and do not have to modify all the content of an integral number of pages), some writes may be treated internally within the storage service as read-modify-write sequences. Details regarding an optimistic conditional-write technique that may be employed for writes that do not cross page boundaries in some such embodiments are provided below. In general, each storage device and/or storage service node may support operations for, and/or store data for, a plurality of different customers in at least some embodiments.

In general, metadata and/or data that may have to be read or modified for a single file store operation request received from a customer may be distributed among a plurality of storage service nodes. For example, delete operations, rename operations and the like may require updates to multiple elements of metadata structures located on several different storage devices. In accordance with the sequential consistency model, in at least one embodiment an atomic metadata operation including a group of file system metadata modifications may be performed to respond to a single client request, including a first metadata modification at one metadata subsystem node and a second metadata modification at a different metadata subsystem node. Various distributed update protocols that support sequential consistency may be used in different embodiments—e.g., a distributed transaction system described below in further detail may be used in at least some embodiments for such multi-page, multi-node or multi-extent updates. Of course, depending on the replication strategy being used, each one of the metadata modifications may in turn involve updates to a plurality of extent replicas in some embodiments.

In some embodiments, optimization techniques associated with various aspects of the file storage service, such as the use of object renaming protocols, load balancing techniques that take connection longevity into account, name space management techniques, client session metadata caching, offset-based congestion control policies, and the like, may be employed. Details on these features of the storage service are provided below in conjunction with the description of various figures.

Distributed File Storage Service Overview

Figure 16:
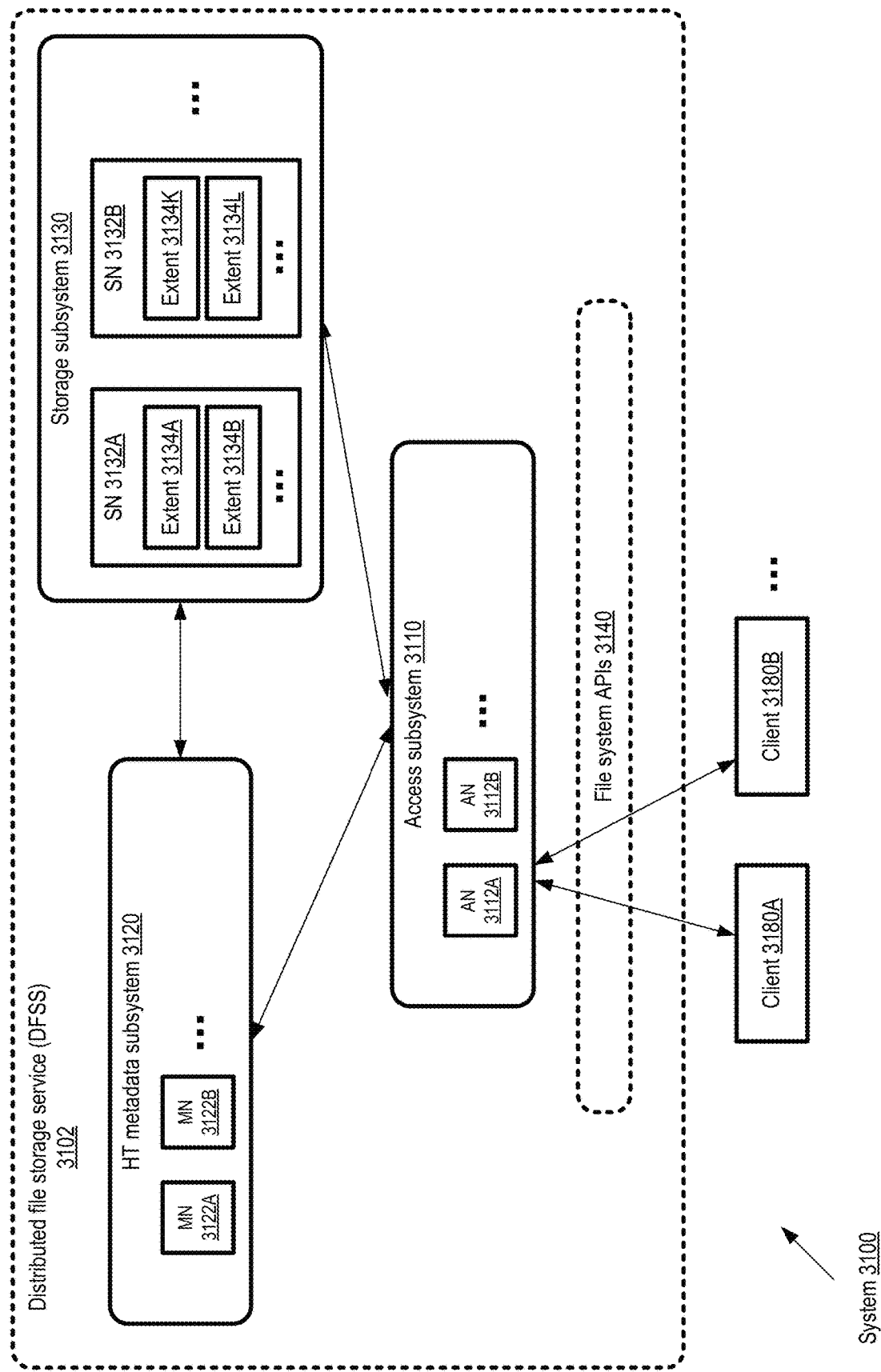
FIG. 16 provides a high-level overview of a distributed file storage service, according to at least some embodiments.

FIG. 16 provides a high-level overview of a distributed file storage service, according to at least some embodiments. As shown, system 3100 including storage service 3102 may be logically divided into at least three subsystems: a storage subsystem 3130, a metadata subsystem 3120 and an access subsystem 3110. Each subsystem may include a plurality of nodes, such as storage nodes (SNs) 3132A and 3132B of storage subsystem 3130, metadata nodes (MNs) 3122A and 3122B of metadata subsystem 3120, and access nodes (ANs) 3112A and 3112B of the access subsystem 3110. Each node may, for example, be implemented as a set of processes or threads executing at a respective physical or virtualized server in some embodiments. The number of nodes in any given subsystem may be modified independently of the number of nodes in the other subsystems in at least some embodiments, thus allowing deployment of additional resources as needed at any of the subsystems (as well as similarly independent reduction of resources at any of the subsystems). The terms "access server", "metadata server" and "storage server" may be used herein as equivalents of the terms "access node", "metadata node" and "storage node" respectively.

In the depicted embodiment, the storage nodes 3132 may be responsible for storing extents 3134 (such as extents 3134A and 3134B at storage node 3132A, and extents 3134K and 3134L at storage node 3132B), e.g., using some combination of SSDs and rotating disks. An extent, which may for example include some number of gigabytes of (typically but not always) contiguous storage space at some set of physical storage devices, may represent a unit of storage replication in some embodiments—thus, a number of physical replicas of any given logical extent may be stored. Each extent replica may be organized as a number of physical pages in some embodiments, with the pages representing the smallest units in which reads or writes are implemented within the storage subsystem. As discussed below with respect to FIG. 18, a given file store object (e.g., a file or a metadata structure) may be organized as a set of logical blocks, and each logical block may be mapped to a set of pages within a data extent. Metadata for the file store object may itself include a set of logical blocks (potentially of different sizes than the corresponding logical blocks for data), and may be stored in pages of a different extent 3134. Replicated state machines may be used to manage updates to extent replicas in at least some embodiments.

The access subsystem 3110 may present one or more file system interfaces to clients 3180, such as file system APIs (application programming interfaces) 3140 in the depicted embodiment. In at least some embodiments, as described below in further detail, a set of load balancers (e.g., software or hardware devices that may be configured independently of the storage service itself) may serve as intermediaries between the clients of the storage service and the access subsystem. In some cases, at least some aspects of load balancing functionality may be implemented within the access subsystem itself. In at least some embodiments the access subsystem nodes 3112 may represent service endpoints established within the appropriate network fabric that is concurrently being used by clients 3180. In some embodiments, special network addresses associated with isolated virtual networks may be assigned to ANs 3112. ANs 3112 may authenticate an incoming client connection, e.g., based on the client's network identity as well as user identity; in some cases the ANs may interact with identity/authentication services similar to Active Directory Service or Kerberos. Some file system protocols that may be supported by the distributed file storage service 3102 (such as NFSv4 and SMB2.1) may require a file server to maintain state, for example pertaining to locks and opened file identifiers. In some embodiments, durable server state, including locks and open file states, may be handled by the metadata subsystem 3120 rather than the access subsystem, and as a result the access subsystem may be considered a largely stateless server fleet that can be scaled up and down as needed. In some embodiments, ANs 3112 may cache metadata state pertaining to various file store objects, and may use the cached metadata to submit at least some internal I/O requests directly to storage nodes without requiring interactions with metadata nodes.

The metadata subsystem 3120 may be responsible for managing various types of file store metadata structures in the depicted embodiment, including for example the logical equivalents of inodes, file/directory attributes such as access control lists (ACLs), link counts, modification times, real file size, logical block maps that point to storage subsystem pages, and the like. In addition, the metadata subsystem may keep track of the open/closed state of the file store objects and of locks on various file store objects in some embodiments. The metadata subsystem 3120 may sequence and coordinate operations so as to maintain desired file store object consistency semantics, such as the close-to-open semantics expected by NFS clients. The metadata subsystem may also ensure sequential consistency across operations that may involve multiple metadata elements, such as renames, deletes, truncates and appends, e.g., using the distributed transaction techniques described below. Although the metadata subsystem 3120 is logically independent of the storage subsystem 3130, in at least some embodiments, persistent metadata structures may be stored at the storage subsystem. In such embodiments, even though the metadata structures may be physically stored at the storage subsystem, the metadata subsystem nodes may be responsible for such tasks as identifying the particular storage nodes to be used, coordinating or sequencing storage operations directed to the metadata, and so on. In at least some embodiments, the metadata subsystem may reuse some of the state management techniques employed by the storage subsystem in some embodiments, such as the storage subsystem's consensus-based state replication machinery.

Provider Network Implementations of a Distributed File Storage Service

In some embodiments the distributed storage service may be implemented using resources of a provider network, and may be used for file-related operations by applications or clients running at compute instances of the provider network. FIGS. 20 through 23 illustrate an example provider network environment, according to some embodiments. In some embodiments, a provider network may be organized into a plurality of geographical regions, and each region may include one or more availability containers, which may also be termed "availability zones" herein. An availability container in turn may include one or more distinct locations or data centers, engineered in such a way (e.g., with independent infrastructure components such as power-related equipment, cooling equipment, and physical security components) that the resources in a given availability container are insulated from failures in other availability containers. A failure in one availability container may not be expected to result in a failure in any other availability container; thus, the availability profile of a resource is intended to be independent of the availability profile of resources in a different availability container. Various types of applications may be protected from failures at a single location by launching multiple application instances in respective availability containers. Nodes of the various subsystems of the storage service may also be distributed across several different availability containers in some embodiments, e.g., in accordance with the availability/uptime goals of the service and/or the data redundancy requirements for various file stores. At the same time, in some implementations, inexpensive and low latency network connectivity may be provided between resources (such as the hosts or storage devices being used for the distributed file storage service) that reside within the same geographical region, and network transmissions between resources of the same availability container may be even faster. Some clients may wish to specify the locations at which at least some of the resources being used for their file stores are reserved and/or instantiated, e.g., at either the region level, the availability container level, or a data center level, to maintain a desired degree of control of exactly where various components of their applications are run. Other clients may be less interested in the exact location where their resources are reserved or instantiated, as long as the resources meet the client requirements, e.g., for performance, high availability, and so on.

In at least some embodiments, the resources within a given data center may be further partitioned into sub-groups based on differences in expected availability or failure resilience levels. For example, one or more server racks at a data center may be designated as a lower-level availability container, as the probability of correlated failures within a rack may at least in some cases be higher than the probability of correlated failures across different racks. At least in some embodiments, when deciding where to instantiate various components or nodes of the storage service, any combination of the various levels of availability containment described (e.g., the region level, the data center level, or at the rack level) may be taken into account together with performance goals and durability goals. Thus, for some types of storage service components, redundancy/replication at the rack level may be considered adequate, so in general different racks may be used for different components providing the same function (or storing replicas of the same data/metadata). For other components, redundancy/replication may also or instead be implemented at the data center level or at the region level.

Figure 17:
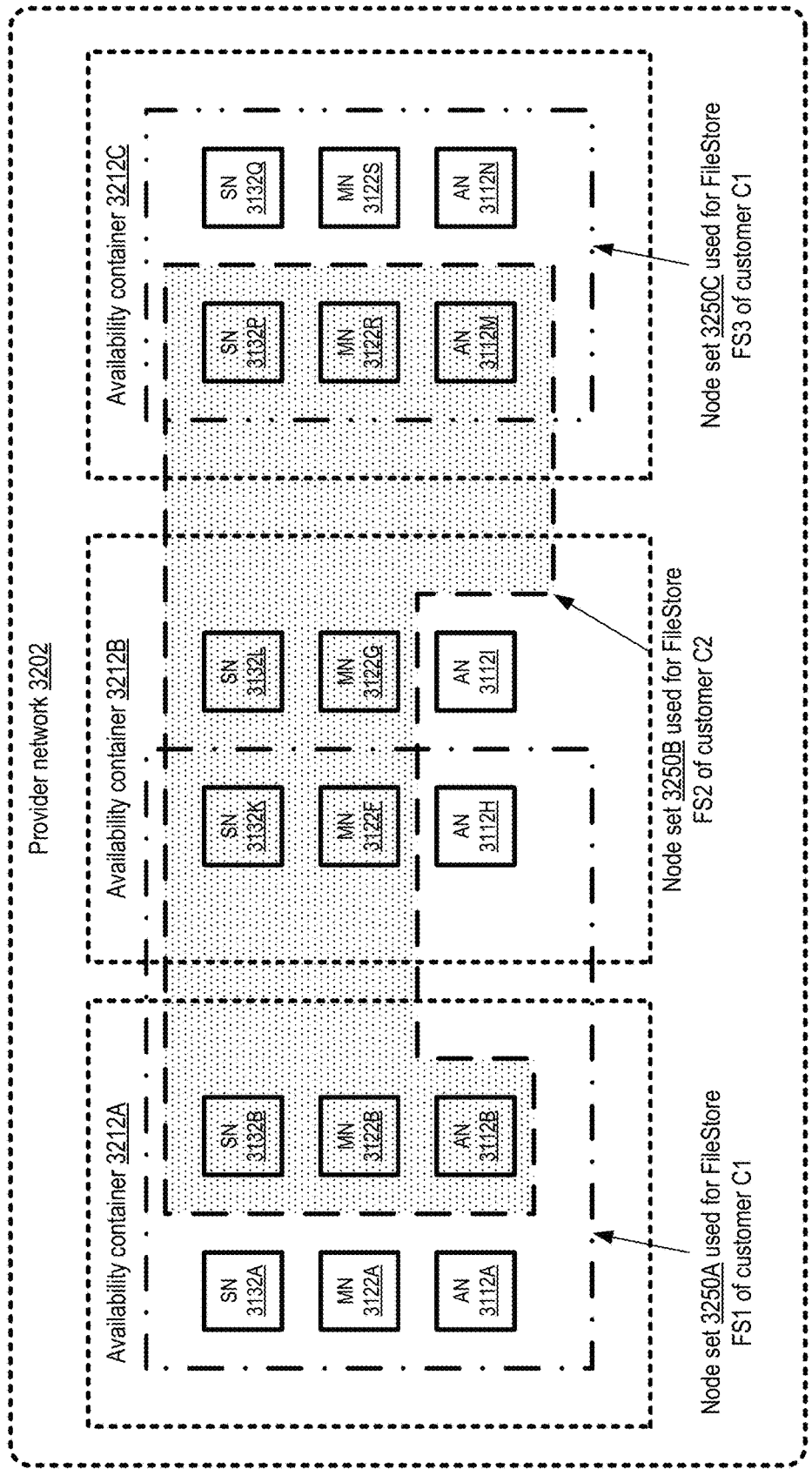
FIG. 17 illustrates the use of resources at a plurality of availability containers of a provider network to implement a file storage service, according to at least some embodiments.

FIG. 17 illustrates the use of resources at a plurality of availability containers 3212 of a provider network 3202 to implement a file storage service, according to at least some embodiments. In the embodiment depicted, three availability containers 3212A, 3212B and 3212C are shown, each of which include some number of storage nodes, metadata nodes and access nodes of the storage service. Since each availability container is typically set up so as to prevent correlated failure events that cross availability container boundaries, the set of storage service nodes that are assigned to a given file store may typically be spread across different availability containers. It is noted that some file stores may have lower availability or durability requirements than others, and may therefore be implemented within a single availability container in at least some embodiments. In one embodiment, when the file storage service is set up, a pool of nodes may be established for each of the three subsystems in each of several availability containers 3212, from which specific nodes may be assigned to a given file store as needed. In other embodiments, instead of establishing pre-configured storage service node pools, new nodes may be instantiated as needed.

The collection of ANs, MNs and SNs that collectively implement file storage for a given file store or file system may be referred to as a "node set" 3250 for that file store. In the embodiment shown in FIG. 17, the storage service nodes are multi-tenant, in that a given node of any of the subsystems may be responsible for handling requests from several different clients and/or several different customers. It is noted that in various embodiments, a given customer (e.g., a business entity or individual on whose behalf a billing account has been established at the storage service) may set up several different file stores in the depicted embodiment, and that many different client devices (computing devices from which programmatic interfaces may be invoked) may be used to issue file service requests to a single file store by, or on behalf of, a given customer. In at least some embodiments, multiple user accounts (e.g., one or more user accounts for each of several employees of a customer business organization) may be set up under the aegis of a single billing account, and each of the user accounts may submit file storage requests from a variety of client devices.

Node set 3250A of FIG. 17, used for file store FS1 of customer C1, includes SNs 3132A, 3132B and 3132K, MNs 3122A, 3122B and 3122F, and ANs 3112A, 3112B and 3112H, distributed among two availability containers 3212A and 3212B. Node set 3250B, used for file store FS2 of a different customer C2, includes nodes in three availability containers 3212A, 3212B and 3212C: SNs 3132B, 3132K, 3132L and 3132P, MNs 3122B 3122F, 3122G and 3122R, and ANs 3112B and 3112M. Node set 3250C, used for file store FS3 of customer C1, uses nodes of availability container 3212C alone: SNs 3132P and 3132Q, MNs 3122R and 3122S, and ANs 3112M and 3112N. The specific nodes that are to be used for a given file store may be selected on demand based on various factors, e.g., by a placement component of the storage service, and the node set may change over time in view of changing storage space needs, performance needs, failures and the like. A given storage device at a single storage node may store data and/or metadata belonging to different clients in at least some embodiments. In at least some embodiments, a single extent may include data and/or metadata of a plurality of clients or customers.

At least with respect to the SNs, redundancy or replication may be implemented along several different dimensions for a given file store in some embodiments. As the amount of data in a given file grows, for example, the various logical blocks of the file may in general be mapped to different logical extents. Thus, file striping may be implemented at the logical-block level, which may help to improve performance for certain patterns of I/O requests and may also reduce the time taken to recover a large file in case one of the storage nodes or devices being used for the file fails. Metadata for the file may also be striped across multiple metadata logical extents and managed by multiple MNs in some implementations. Each logical extent (whether for data or metadata) in turn may be replicated across multiple SNs at different availability containers 3212, e.g., using erasure coding or full replication, to achieve the desired degree of data durability. As noted earlier, in at least one embodiment replication may be implemented across lower-level availability containers, e.g., by choosing different racks within the same data center for different replicas. ANs and MNs may also be organized into redundancy groups in some embodiments, so that if some AN or MN fails, its workload may be quickly taken up by a different member of its redundancy group.

In some embodiments, a provider network 3202 may support establishment of "isolated virtual networks" (IVNs) on behalf of various customers. An IVN (which may also be referred to in some environments as a virtual private cloud or VPC) set up for a given customer may include a collection of computing and/or other resources in a logically isolated section of the provider network, over which the customer is granted substantial control with respect to networking configuration. In some embodiments, for example, a customer may select the IP (Internet Protocol) address ranges to be used for the IVN resources, manage the creation of subnets within the IVN, and the configuration of route tables, gateways, etc. for the IVN. For at least some of the devices within an IVN in some embodiments, the network addresses may not be visible outside the IVN, at least by default. In order to enable connectivity between an IVN and the customer's external network (e.g., devices at the customer's data center or office premises), a virtual interface that is configured for use with private addresses (and may therefore be termed a private virtual interface) and a virtual private gateway may be set up. In some embodiments one or more VPNs (virtual private networks) may be configured between the customer's IVN and external networks (such as the customer's office network or the customer's data centers). In at least some embodiments, such VPNs may utilize secure networking protocols such as IPSec (Internet Protocol Security), SSL/TLS (Secure Sockets Layer/Transport Layer Security), DTLS (Datagram Transport Layer Security) and the like.

In some embodiments, for security or other reasons, access to a given file store managed by a distributed storage service may be limited to a specific set of client devices within one or more IVNs. FIG. 3 illustrates a configuration in which network addresses associated with isolated virtual networks 302 are assigned to access subsystem nodes of a storage service, according to at least some embodiments. As a consequence of such address assignments, only those clients whose network addresses also lie within the IVN may be able to access the file store via the ANs 3112. As shown, the provider network 3202 in FIG. 3 includes SNs 3132A-132F, MNs 3122A-122F, and ANs 3112A-112F. Two IVNs 302A and 302B have been set up in the provider network 3202, for customers A and B respectively. Each IVN includes a number of compute instances (CIs) of virtual computing service 302, at which applications that require file storage services may be run. In addition to the CIs shown within the IVNs 302A (e.g., CIs 380A and 380B) and 302B (CIs 380K and 380L), other CIs (e.g., 380P and 380Q) may also run on instance hosts outside the IVNs in the depicted embodiment—thus, not all clients of the file storage service need necessarily belong to an IVN 302.

In order to enable access to the file storage service from CIs within IVN 302A, ANs 3112A and 3112D have been assigned private IP (Internet Protocol) addresses 350A associated with IVN 302A. As a result, client CIs 380A and 380B of IVN 302A may invoke the file storage service interfaces using addresses 350A, and may be able to rely on various network isolation and security features already implemented for IVNs when interacting with the file storage service. Similarly, ANs 3112D and 3112E may be assigned private network addresses of IVM 302B, enabling secure access from client CIs 380K and 380L of IVN 302B. It is noted that a given AN (such as 3112D) may be assigned more than one network address in at least some embodiments, allowing a single AN's resources to be shared by multiple IVNs. In other embodiments, each AN may be restricted to network addresses of no more than one IVN. In addition to the private addresses, in some embodiments, public network addresses (e.g., IP addresses accessible from the public Internet) may also be used for at least some ANs such as AN 3112C, enabling access from CIs such as 380P or 380Q that are not part of an IVN. In one embodiment, clients located outside the provider network 3202 may also be able to access the storage service using public IP addresses. In some embodiments, a single (private or public) network address may be assigned to a plurality of ANs 3112, so that, for example, incoming work requests may be balanced across multiple ANs, and AN failover may be implemented without impacting clients (e.g., clients may continue to send file store requests to the same address even after a particular AN fails, because the remaining ANs with the same network address may continue to respond to client requests).

Logical Blocks, Pages, and Extents

Figure 18:
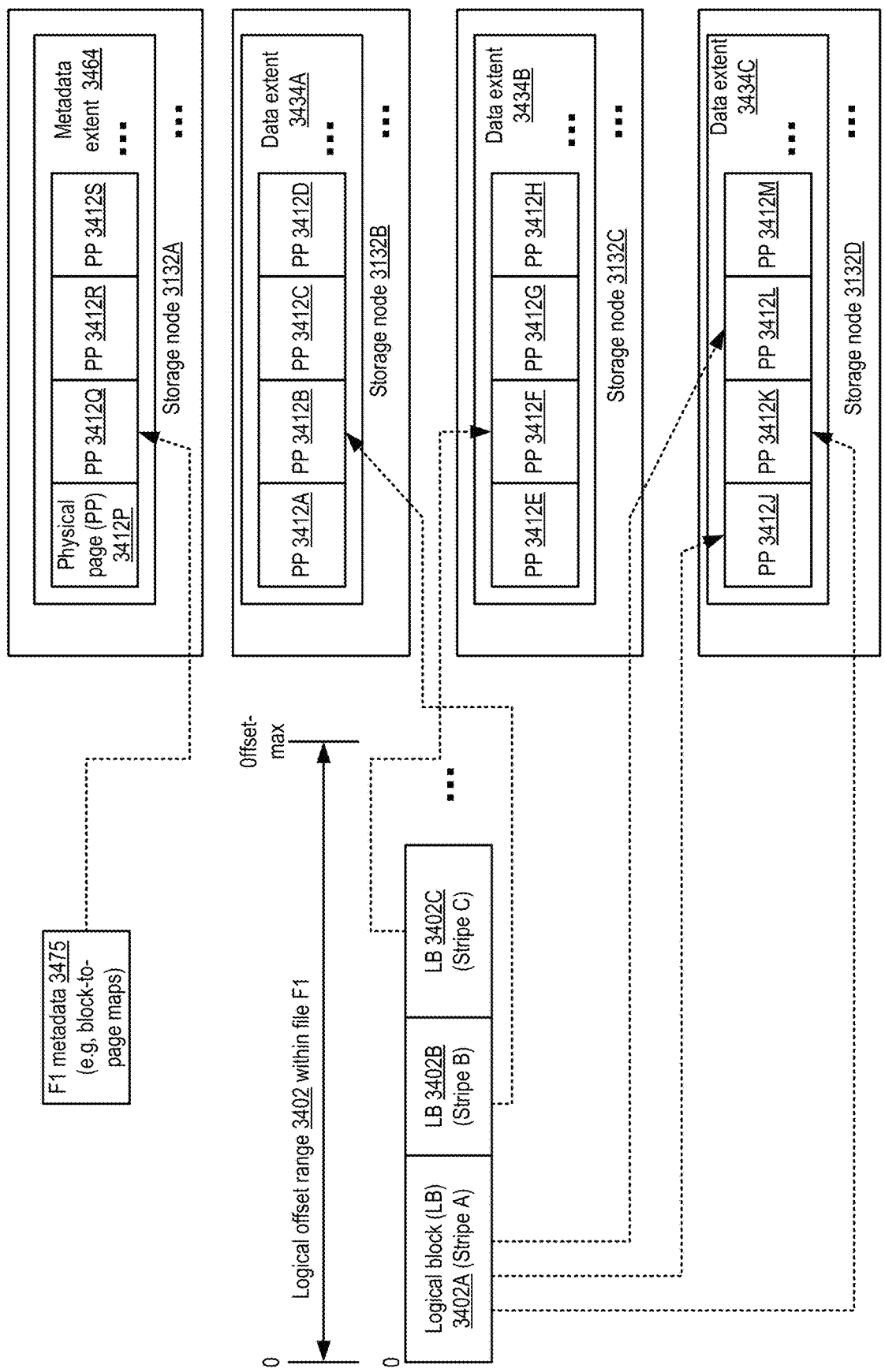
FIG. 18 illustrates a mapping between file storage service objects, logical blocks, and physical pages at one or more extents, according to at least some embodiments.

FIG. 18 illustrates a mapping between file storage service objects, logical blocks, and physical pages at one or more extents, according to at least some embodiments. Three logical blocks LB 3402A, 3402B and 3402C have been configured for a file F 1. Logical blocks may also be referred to herein as stripes, as the content of different logical blocks of a given object such as file or metadata structure may typically be stored at distinct storage locations. In some embodiments, physical separation of stripes such as stripes A, B and C of file F1 may be enforced—e.g., no two stripes of a given object may be stored at the same physical storage device. In other embodiments, physical separation of stripes may occur with a high probability without explicit enforcement, e.g., due to the use of random or near-random distribution of stripes across large numbers of physical devices. In at least some embodiments, logical block sizes may vary within a given file or metadata structure. In other embodiments, all the logical blocks of at least some storage service objects may be of the same size. The content of each logical block 3402 may be stored in one or more physical pages (PPs) 3412 of a given data extent 3434 in the depicted embodiment. Thus, for example, content of LB 3402 have been written to PPs 3412J, 3412K and 3412L at data extent 3434C of storage node 3132D. Content of LB 3403 are stored in PP 3412B within data extent 3434A of storage node 3132B, and content of LB 3404 are stored in PP 3412F of storage extent 3434B at storage node 3132C. To simplify the discussion of the mapping between blocks and pages, extent replicas are not shown in FIG. 18. At least in the depicted embodiment, the techniques used for replication of extents may be independent of the techniques used for mapping blocks to pages.

In at least some embodiments, as described below in further detail, dynamic on-demand allocation may be used for physical storage, in accordance with which only the set of pages actually needed to store the write payload of a given write request may actually be allocated when the write request is received. Consider an example scenario in which the logical block size of a particular LB is 8 megabytes, a fixed page size of 64 kilobytes is being used for the extent to which the LB is mapped, and the first write directed to the LB includes a write payload of 56 kilobytes. In such a scenario, only one page (64 kilobytes) of storage space may be allocated in response to the request in embodiments in which on-demand allocation is being used. In other embodiments, physical storage for the entire LB may be set aside in response to the first write request directed to the LB, regardless of the write payload size.

When a client writes to a particular file for the first time, a selected metadata subsystem node may generate metadata 3475 for one or more logical blocks 3402 (e.g., depending on the size of the write payload relative to the logical block size, more than one logical block may be required in some cases). This metadata 3475 itself may be stored in one or more physical pages such as PP 3412Q of a metadata extent 3464 in the depicted embodiment. The block sizes and/or page sizes being used for metadata structures may differ from those being used for the corresponding data in at least some embodiments. In at least one embodiment, the metadata extents may be stored using a different class or type of storage device (e.g., SSDs) than are used for data (e.g., rotating disks). In some implementations, at least a portion of the metadata and at least a portion of metadata for the same file store object may be stored on the same extent.

In some embodiments, as discussed above, the content of data extents 3434 and/or metadata extents 3464 may be replicated, e.g., in order to meet respective data durability requirements. In such embodiments, as described in further detail below, a particular replica of a logical extent may be chosen as the master replica, and updates to the extent may be initiated and/or coordinated by the master replica (or the storage node where the master replica resides), e.g., by propagating the updates to the required number of replicas from the master before indicating that the corresponding update request has succeeded.

The order in which content of a given logical block is written at the storage device at which any given replica of the extent is stored may vary—i.e., if two 32-kilobyte physical pages P1 and P2 corresponding to a particular 1-megabyte logical block are located in the order "P1 followed by P2" on the disk or SSD, this may not necessarily imply that the data in P1 has a lower starting offset within the logical block than the data in P2. In some embodiments, pages may be moved (i.e., rearranged within their storage device) after they are first written, e.g., to facilitate improved sequential read or write performance. Within a given extent or extent replica, physical pages associated with several different files may be stored—for example, in metadata extent 634, block-to-page maps (or other metadata) of one or more files other than F1 may be stored in PPs 3412P, 3412R and 3412S. Similarly, pages 3412A, 3412C, 3412D, 3412E, 3412G, 3412H, and 3412M may all store content of files other than F1. In some embodiments, a large enough number of extents may be established that the probability of any two logical blocks of the same file being mapped to the same extent (e.g., to the same replica group of extents) may be quite low. In such a scenario, it may be possible to respond in parallel to concurrent I/O requests directed to different logical blocks of the same file, as the requests may be directed (in most cases) to different storage nodes and different storage devices. In at least one embodiment, the storage system may in general tend to distribute logical blocks in an apparently random or near-random manner among available extents, e.g., by selecting the extent to be used for a particular block based on factors such as the amount of available free space at the time that the particular block is first written.

Figure 19:
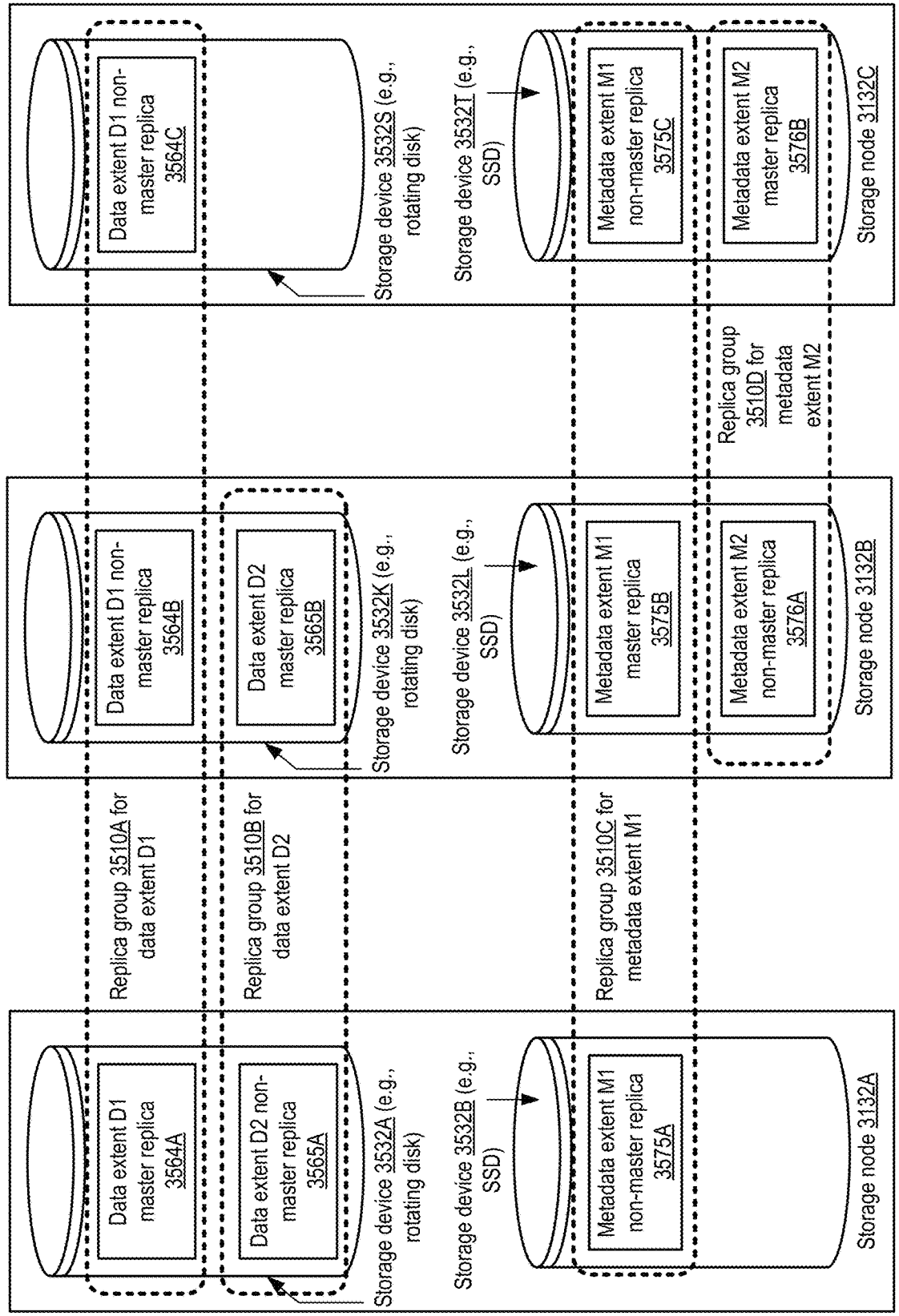
FIG. 19 illustrates a configuration of replica groups for data and metadata extents, according to at least some embodiments.

FIG. 19 illustrates a configuration of replica groups 3510 for data and metadata extents, according to at least some embodiments. Two replica groups 3510A and 3510B for data extents D1 and D2 are shown, and two replica groups 3510C and 3510D for metadata extents M1 and M2 are shown. Each replica group illustrated includes two or more replicas at respective storage devices 3532 at respective storage nodes 3132 of the storage subsystem, although in general it may sometimes be the case that two physical replicas of the same logical extent are stored on the same storage device or on different storage devices at the same storage node.

Each replica group 3510 is shown as including one master replica and one or more non-master replicas. The master replica may be responsible for coordinating writes to the members of the replica group, e.g., using a replicated state machine and/or a consensus-based update protocol. In some embodiments, a replicated state machine and/or a consensus-based protocol may also be used for reads as well. The total number of replicas in a replication group may vary as a function of the durability requirements for the file data and/or metadata being stored at the replicas. In FIG. 19, replica 3564A is the master replica of group 3510A, replica 3565B is the master replica of group 3510B, replica 3575B is the master replica of replica group 3510C, and replica 3576B is the master replica of replica group 3510D. Replica groups 3510A and 3510C include two non-master replicas each (replicas 3564B and 3564C for group 3510A, and replicas 3575A and 3575C for group 3510B). Different types of replication techniques may be used in various embodiments, such as erasure-coding techniques, full replication, or a combination of full and erasure-coded replicas. In some embodiments, different replication techniques may be used for different file stores.

In at least some embodiments, a variety of different storage devices may be available for storing extent replicas, such as one or more types of SSDs and/or individual or arrayed devices based on rotating magnetic disks. In some embodiments, a given storage node 3132 may include several different types of storage devices, while in other embodiments a given storage node may only have a single type of storage device available. In the depicted embodiment, storage nodes 3132A, 3132B and 3132C each have an SSD device (devices 3532B, 3532L and 3532T respectively at the three nodes) as well as a rotating disk-based device (3532A, 3532K and 3532S respectively). In some implementations, one particular storage device technology may be preferred, for storing data extent replicas, metadata extent replicas, or for storing both types of extents as long as space is available. In one implementation, for example, metadata extents may be stored on SSDs when possible, while data extents may be stored on cheaper rotating disks. In some embodiments, data and/or metadata extents, or portions thereof, may be migrated from one type of storage device to another, for example based on usage levels.

Example Provider Network Environment

This section describes example provider network environments in which embodiments of the methods and apparatus described in reference to FIGS. 1 through 19 may be implemented. However, these example provider network environments are not intended to be limiting.

Figure 20:
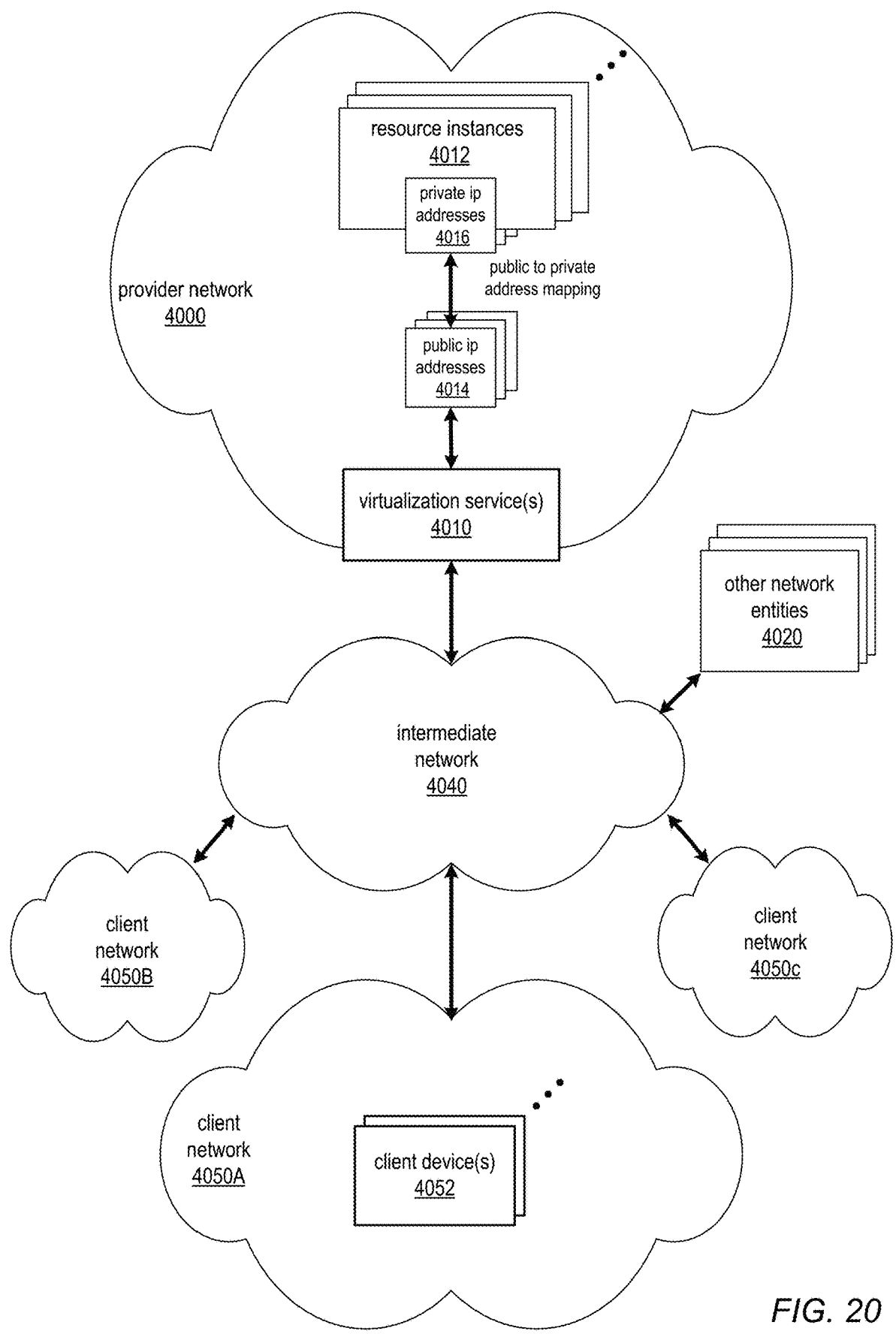
FIG. 20 illustrates an example provider network environment, according to some embodiments.

FIG. 20 illustrates an example provider network environment, according to some embodiments. A provider network 4000 may provide resource virtualization to clients via one or more virtualization services 4010 that allow clients to purchase, rent, or otherwise obtain instances 4012 of virtualized resources, including but not limited to computation and storage resources, implemented on devices within the provider network or networks in one or more data centers. Private IP addresses 4016 may be associated with the resource instances 4012; the private IP addresses are the internal network addresses of the resource instances 4012 on the provider network 4000. In some embodiments, the provider network 4000 may also provide public IP addresses 4014 and/or public IP address ranges (e.g., Internet Protocol version 4 (IPv4) or Internet Protocol version 6 (IPv6) addresses) that clients may obtain from the provider 4000.

Conventionally, the provider network 4000, via the virtualization services 4010, may allow a client of the service provider (e.g., a client that operates client network 4050A) to dynamically associate at least some public IP addresses 4014 assigned or allocated to the client with particular resource instances 4012 assigned to the client. The provider network 4000 may also allow the client to remap a public IP address 4014, previously mapped to one virtualized computing resource instance 4012 allocated to the client, to another virtualized computing resource instance 4012 that is also allocated to the client. Using the virtualized computing resource instances 4012 and public IP addresses 4014 provided by the service provider, a client of the service provider such as the operator of client network 4050A may, for example, implement client-specific applications and present the client's applications on an intermediate network 4040, such as the Internet. Other network entities 4020 on the intermediate network 4040 may then generate traffic to a destination public IP address 4014 published by the client network 4050A; the traffic is routed to the service provider data center, and at the data center is routed, via a network substrate, to the private IP address 4016 of the virtualized computing resource instance 4012 currently mapped to the destination public IP address 4014. Similarly, response traffic from the virtualized computing resource instance 4012 may be routed via the network substrate back onto the intermediate network 4040 to the source entity 4020.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a private IP address of a resource instance is the default launch configuration for all resource instance types.

At least some public IP addresses may be allocated to or obtained by clients of the provider network 4000; a client may then assign their allocated public IP addresses to particular resource instances allocated to the client. These public IP addresses may be referred to as client public IP addresses, or simply client IP addresses. Instead of being assigned by the provider network 4000 to resource instances as in the case of standard IP addresses, client IP addresses may be assigned to resource instances by the clients, for example via an API provided by the service provider. Unlike standard IP addresses, client IP Addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

Figure 21:
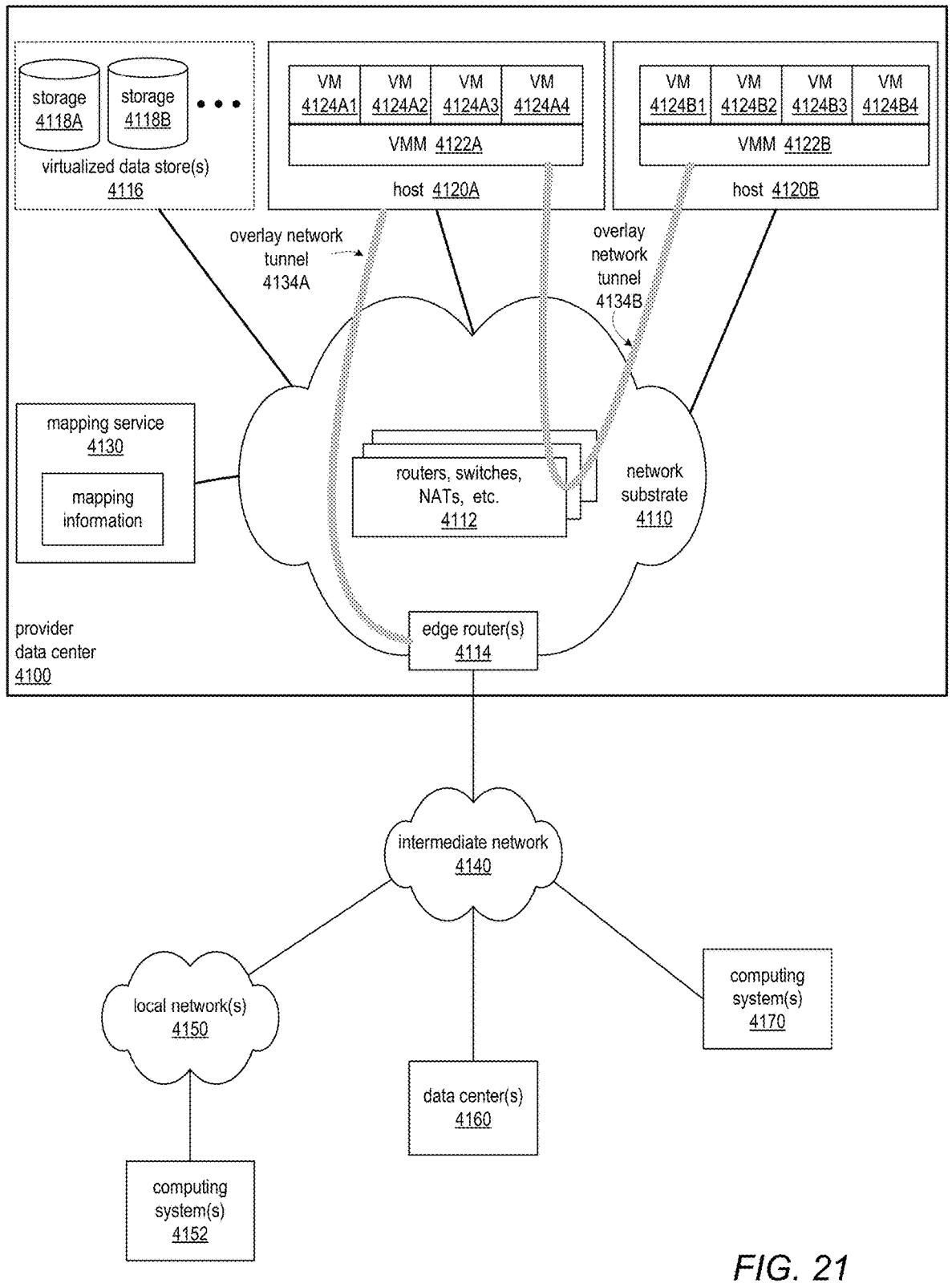
FIG. 21 illustrates an example data center that implements an overlay network on a network substrate using IP tunneling technology, according to some embodiments.

FIG. 21 illustrates an example data center that implements an overlay network on a network substrate using IP tunneling technology, according to some embodiments. A provider data center 4100 may include a network substrate that includes networking devices 4112 such as routers, switches, network address translators (NATs), and so on. Some embodiments may employ an Internet Protocol (IP) tunneling technology to provide an overlay network via which encapsulated packets may be passed through network substrate 4110 using tunnels. The IP tunneling technology may provide a mapping and encapsulating system for creating an overlay network on a network (e.g., a local network in data center 4100 of FIG. 21) and may provide a separate namespace for the overlay layer (the public IP addresses) and the network substrate 4110 layer (the private IP addresses). Packets in the overlay layer may be checked against a mapping directory (e.g., provided by mapping service 4130) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 4130) that knows where the IP overlay addresses are.

In some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 21, an example overlay network tunnel 4134A from a virtual machine (VM) 4124A on host 4120A to a device on the intermediate network 4150 and an example overlay network tunnel 4134B between a VM 4124B on host 4120B and a VM 4124C on host 4120C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

Referring to FIG. 21, at least some networks in which embodiments may be implemented may include hardware virtualization technology that enables multiple operating systems to run concurrently on a host computer (e.g., hosts 4120A and 4120B of FIG. 21), i.e. as virtual machines (VMs) 4124 on the hosts 4120. The VMs 4124 may, for example, be rented or leased to clients of a network provider. A hypervisor, or virtual machine monitor (VMM) 4122, on a host 4120 presents the VMs 4124 on the host with a virtual platform and monitors the execution of the VMs 4124. Each VM 4124 may be provided with one or more private IP addresses; the VMM 4122 on a host 4120 may be aware of the private IP addresses of the VMs 4124 on the host. A mapping service 4130 may be aware of all network IP prefixes and the IP addresses of routers or other devices serving IP addresses on the local network. This includes the IP addresses of the VMMs 4122 serving multiple VMs 4124. The mapping service 4130 may be centralized, for example on a server system, or alternatively may be distributed among two or more server systems or other devices on the network. A network may, for example, use the mapping service technology and IP tunneling technology to, for example, route data packets between VMs 4124 on different hosts 4120 within the data center 4100 network; note that an interior gateway protocol (IGP) may be used to exchange routing information within such a local network.

In addition, a network such as the provider data center 4100 network (which is sometimes referred to as an autonomous system (AS)) may use the mapping service technology, IP tunneling technology, and routing service technology to route packets from the VMs 4124 to Internet destinations, and from Internet sources to the VMs 4124. Note that an external gateway protocol (EGP) or border gateway protocol (BGP) is typically used for Internet routing between sources and destinations on the Internet. FIG. 21 shows an example provider data center 4100 implementing a network that provides resource virtualization technology and that provides full Internet access via edge router(s) 4114 that connect to Internet transit providers, according to some embodiments. The provider data center 4100 may, for example, provide clients the ability to implement virtual computing systems (VMs 4124) via a hardware virtualization service and the ability to implement virtualized data stores 4116 on storage resources 4118 via a storage virtualization service.

The data center 4100 network may implement IP tunneling technology, mapping service technology, and a routing service technology to route traffic to and from virtualized resources, for example to route packets from the VMs 4124 on hosts 4120 in data center 4100 to Internet destinations, and from Internet sources to the VMs 4124. Internet sources and destinations may, for example, include computing systems 4170 connected to the intermediate network 4140 and computing systems 4152 connected to local networks 4150 that connect to the intermediate network 4140 (e.g., via edge router(s) 4114 that connect the network 4150 to Internet transit providers). The provider data center 4100 network may also route packets between resources in data center 4100, for example from a VM 4124 on a host 4120 in data center 4100 to other VMs 4124 on the same host or on other hosts 4120 in data center 4100.

A service provider that provides data center 4100 may also provide additional data center(s) 4160 that include hardware virtualization technology similar to data center 4100 and that may also be connected to intermediate network 4140. Packets may be forwarded from data center 4100 to other data centers 4160, for example from a VM 4124 on a host 4120 in data center 4100 to another VM on another host in another, similar data center 4160, and vice versa.

While the above describes hardware virtualization technology that enables multiple operating systems to run concurrently on host computers as virtual machines (VMs) on the hosts, where the VMs may be rented or leased to clients of the network provider, the hardware virtualization technology may also be used to provide other computing resources, for example storage resources 4118, as virtualized resources to clients of a network provider in a similar manner.

Figure 22:
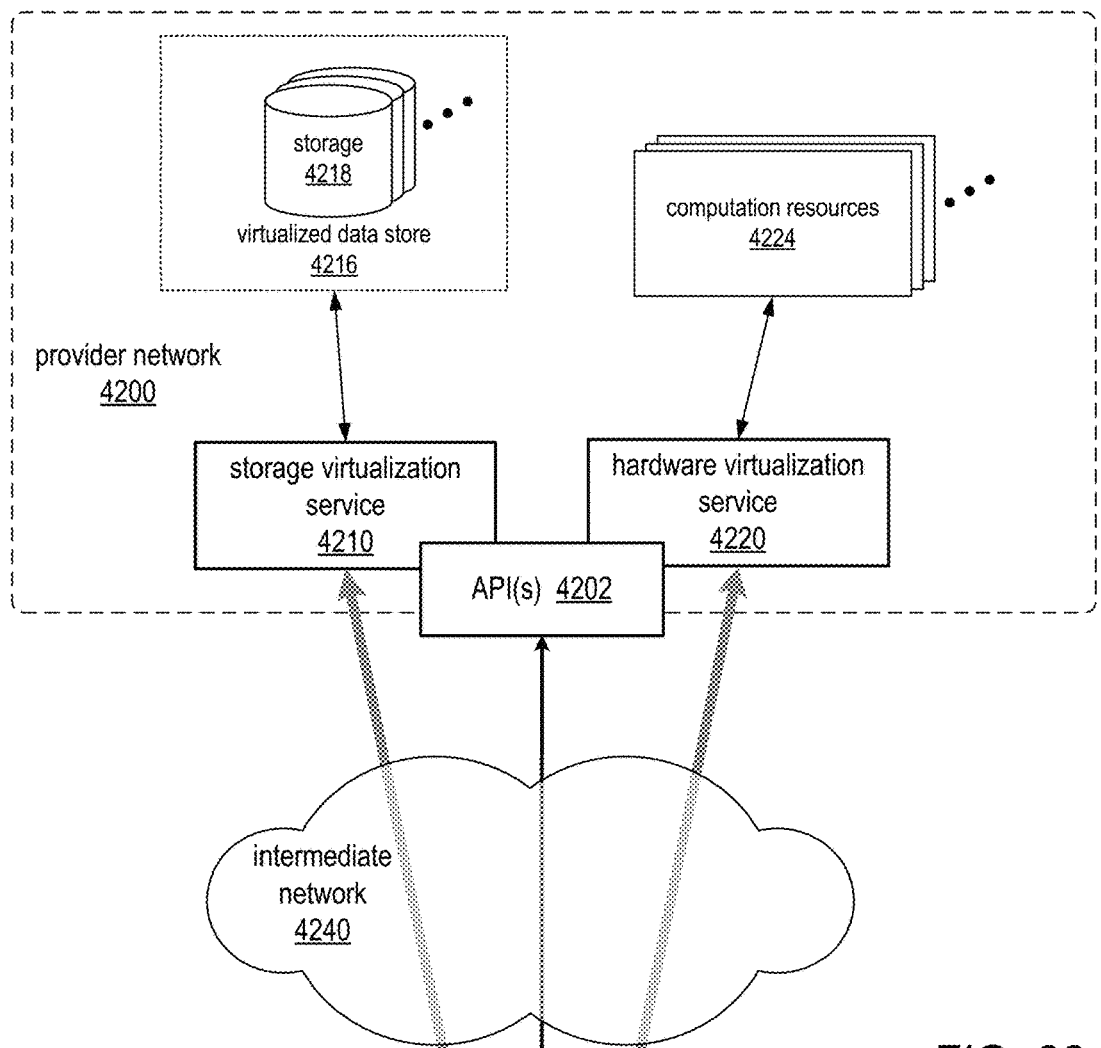
FIG. 22 is a block diagram of an example provider network that provides a storage virtualization service and a hardware virtualization service to clients, according to some embodiments.
Figure 22:
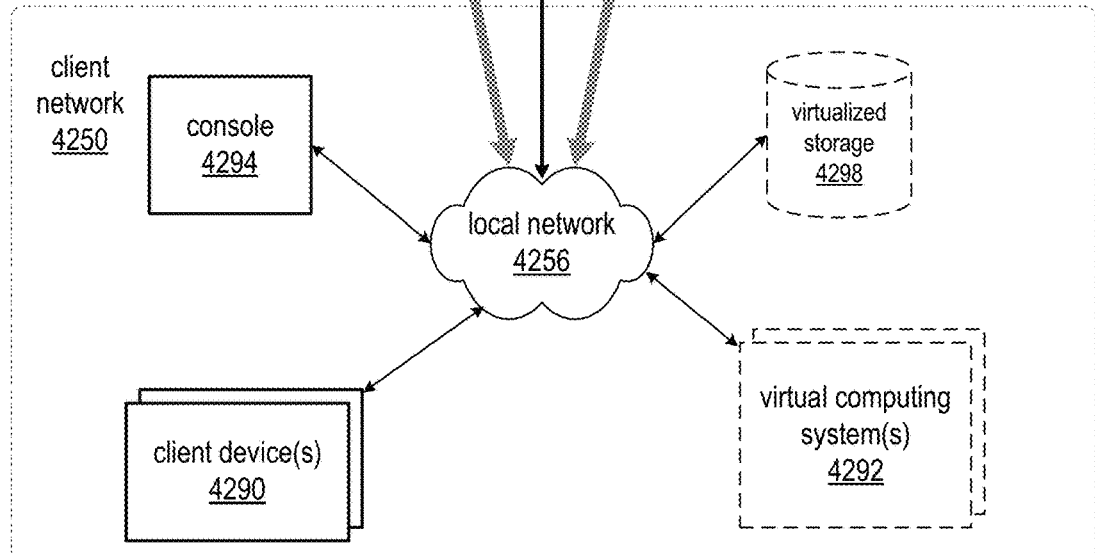

FIG. 22 is a block diagram of an example provider network that provides a storage virtualization service and a hardware virtualization service to clients, according to some embodiments. Hardware virtualization service 4220 provides multiple computation resources 4224 (e.g., VMs) to clients. The computation resources 4224 may, for example, be rented or leased to clients of the provider network 4200 (e.g., to a client that implements client network 4250). Each computation resource 4224 may be provided with one or more private IP addresses. Provider network 4200 may be configured to route packets from the private IP addresses of the computation resources 4224 to public Internet destinations, and from public Internet sources to the computation resources 4224.

Provider network 4200 may provide a client network 4250, for example coupled to intermediate network 4240 via local network 4256, the ability to implement virtual computing systems 4292 via hardware virtualization service 4220 coupled to intermediate network 4240 and to provider network 4200. In some embodiments, hardware virtualization service 4220 may provide one or more APIs 4202, for example a web services interface, via which a client network 4250 may access functionality provided by the hardware virtualization service 4220, for example via a console 4294. In some embodiments, at the provider network 4200, each virtual computing system 4292 at client network 4250 may correspond to a computation resource 4224 that is leased, rented, or otherwise provided to client network 4250.

From an instance of a virtual computing system 4292 and/or another client device 4290 or console 4294, the client may access the functionality of storage virtualization service 4210, for example via one or more APIs 4202, to access data from and store data to a virtual data store 4216 provided by the provider network 4200. In some embodiments, a virtualized data store gateway (not shown) may be provided at the client network 4250 that may locally cache at least some data, for example frequently accessed or critical data, and that may communicate with virtualized data store service 4210 via one or more communications channels to upload new or modified data from a local cache so that the primary store of data (virtualized data store 4216) is maintained. In some embodiments, a user, via a virtual computing system 4292 and/or on another client device 4290, may mount and access virtual data store 4216 volumes, which appear to the user as local virtualized storage 4298.

While not shown in FIG. 22, the virtualization service(s) may also be accessed from resource instances within the provider network 4200 via API(s) 4202. For example, a client, appliance service provider, or other entity may access a virtualization service from within a respective private network on the provider network 4200 via an API 4202 to request allocation of one or more resource instances within the private network or within another private network.

Figure 23:
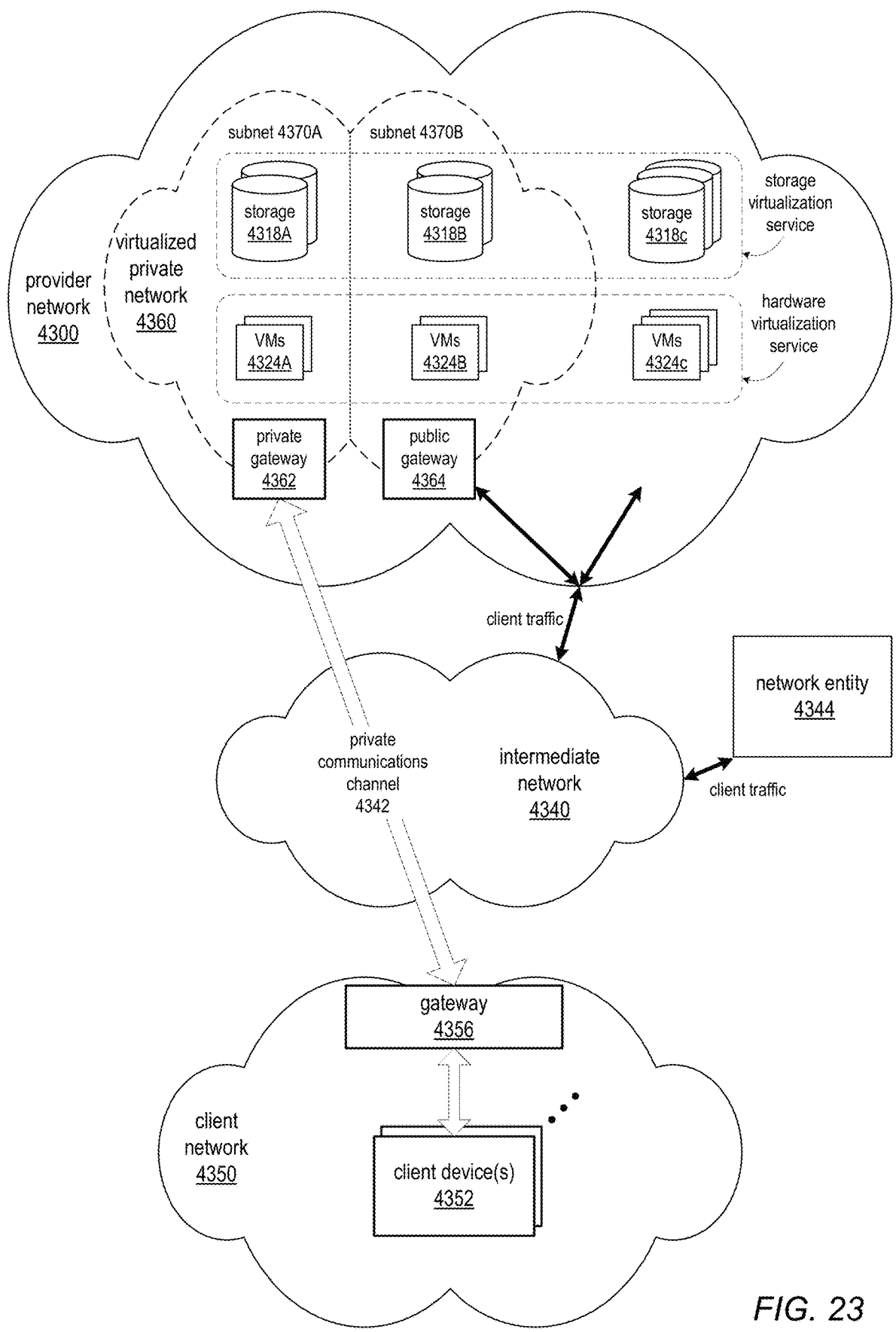
FIG. 23 illustrates an example provider network that provides virtualized private networks to at least some clients, according to some embodiments.

FIG. 23 illustrates an example provider network that provides private networks on the provider network to at least some clients, according to some embodiments. A client's virtualized private network 4360 on a provider network 4300, for example, enables a client to connect their existing infrastructure (e.g., devices 4352) on client network 4350 to a set of logically isolated resource instances (e.g., VMs 4324A and 4324B and storage 4318A and 4318B), and to extend management capabilities such as security services, firewalls, and intrusion detection systems to include their resource instances.

A client's virtualized private network 4360 may be connected to a client network 4350 via a private communications channel 4342. A private communications channel 4342 may, for example, be a tunnel implemented according to a network tunneling technology or some other technology over an intermediate network 4340. The intermediate network may, for example, be a shared network or a public network such as the Internet. Alternatively, a private communications channel 4342 may be implemented over a direct, dedicated connection between virtualized private network 4360 and client network 4350.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a client network.

To establish a virtualized private network 4360 for a client on provider network 4300, one or more resource instances (e.g., VMs 4324A and 4324B and storage 4318A and 4318B) may be allocated to the virtualized private network 4360. Note that other resource instances (e.g., storage 4318C and VMs 4324C) may remain available on the provider network 4300 for other client usage. A range of public IP addresses may also be allocated to the virtualized private network 4360. In addition, one or more networking devices (routers, switches, etc.) of the provider network 4300 may be allocated to the virtualized private network 4360. A private communications channel 4342 may be established between a private gateway 4362 at virtualized private network 4360 and a gateway 4356 at client network 4350.

In some embodiments, in addition to, or instead of, a private gateway 4362, virtualized private network 4360 may include a public gateway 4364 that enables resources within virtualized private network 4360 to communicate directly with entities (e.g., network entity 4344) via intermediate network 4340, and vice versa, instead of or in addition to via private communications channel 4342.

Virtualized private network 4360 may be, but is not necessarily, subdivided into two or more subnetworks, or subnets, 4370. For example, in implementations that include both a private gateway 4362 and a public gateway 4364, the private network may be subdivided into a subnet 4370A that includes resources (VMs 4324A and storage 4318A, in this example) reachable through private gateway 4362, and a subnet 4370B that includes resources (VMs 4324B and storage 4318B, in this example) reachable through public gateway 4364.

The client may assign particular client public IP addresses to particular resource instances in virtualized private network 4360. A network entity 4344 on intermediate network 4340 may then send traffic to a public IP address published by the client; the traffic is routed, by the provider network 4300, to the associated resource instance. Return traffic from the resource instance is routed, by the provider network 4300, back to the network entity 4344 over intermediate network 4340. Note that routing traffic between a resource instance and a network entity 4344 may require network address translation to translate between the public IP address and the private IP address of the resource instance.

Some embodiments may allow a client to remap public IP addresses in a client's virtualized private network 4360 as illustrated in FIG. 23 to devices on the client's external network 4350. When a packet is received (e.g., from network entity 4344), the network 4300 may determine that the destination IP address indicated by the packet has been remapped to an endpoint on external network 4350 and handle routing of the packet to the respective endpoint, either via private communications channel 4342 or via the intermediate network 4340. Response traffic may be routed from the endpoint to the network entity 4344 through the provider network 4300, or alternatively may be directly routed to the network entity 4344 by the client network 4350. From the perspective of the network entity 4344, it appears as if the network entity 4344 is communicating with the public IP address of the client on the provider network 4300. However, the network entity 4344 has actually communicated with the endpoint on client network 4350.

While FIG. 23 shows network entity 4344 on intermediate network 4340 and external to provider network 4300, a network entity may be an entity on provider network 4300. For example, one of the resource instances provided by provider network 4300 may be a network entity that sends traffic to a public IP address published by the client.

Illustrative System

In some embodiments, a system that implements a portion or all of the methods and apparatus for post data synchronization in migration of domains in network environments as described herein may include a general-purpose computer system that includes or is configured to access one or more computer-accessible media, such as computer system 5000 illustrated in FIG. 24. In the illustrated embodiment, computer system 5000 includes one or more processors 5010 coupled to a system memory 5020 via an input/output (I/O) interface 5030. Computer system 5000 further includes a network interface 5040 coupled to I/O interface 5030.

In various embodiments, computer system 5000 may be a uniprocessor system including one processor 5010, or a multiprocessor system including several processors 5010 (e.g., two, four, eight, or another suitable number). Processors 5010 may be any suitable processors capable of executing instructions. For example, in various embodiments, processors 5010 may be general-purpose or embedded processors implementing any of a variety of instruction set architectures (ISAs), such as the x86, PowerPC, SPARC, or MIPS ISAs, or any other suitable ISA. In multiprocessor systems, each of processors 5010 may commonly, but not necessarily, implement the same ISA.

System memory 5020 may be configured to store instructions and data accessible by processor(s) 5010. In various embodiments, system memory 5020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for providing client-defined rules for clients' resources in provider network environments, are shown stored within system memory 5020 as code 5025 and data 5026.

In one embodiment, I/O interface 5030 may be configured to coordinate I/O traffic between processor 5010, system memory 5020, and any peripheral devices in the device, including network interface 5040 or other peripheral interfaces. In some embodiments, I/O interface 5030 may perform any necessary protocol, timing or other data transformations to convert data signals from one component (e.g., system memory 5020) into a format suitable for use by another component (e.g., processor 5010). In some embodiments, I/O interface 5030 may include support for devices attached through various types of peripheral buses, such as a variant of the Peripheral Component Interconnect (PCI) bus standard or the Universal Serial Bus (USB) standard, for example. In some embodiments, the function of I/O interface 5030 may be split into two or more separate components, such as a north bridge and a south bridge, for example. Also, in some embodiments some or all of the functionality of I/O interface 5030, such as an interface to system memory 5020, may be incorporated directly into processor 5010.

Network interface 5040 may be configured to allow data to be exchanged between computer system 5000 and other devices 5060 attached to a network or networks 5050, such as other computer systems or devices as illustrated in FIGS. 1 through 23, for example. In various embodiments, network interface 5040 may support communication via any suitable wired or wireless general data networks, such as types of Ethernet network, for example. Additionally, network interface 5040 may support communication via telecommunications/telephony networks such as analog voice networks or digital fiber communications networks, via storage area networks such as Fibre Channel SANs, or via any other suitable type of network and/or protocol.

In some embodiments, system memory 5020 may be one embodiment of a computer-accessible medium configured to store program instructions and data as described above for FIGS. 1 through 10 for implementing embodiments of methods and apparatus for post data synchronization in migration of domains in provider network environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 5000 via I/O interface 5030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 5000 as system memory 5020 or another type of memory. Further, a computer-accessible medium may include transmission media or signals such as electrical, electromagnetic, or digital signals, conveyed via a communication medium such as a network and/or a wireless link, such as may be implemented via network interface 5040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
providing, by a distributed storage service implemented in a provider network, a plurality of file systems to a plurality of respective clients, wherein the provider network is accessible via one or more intermediate networks, and the file systems are provided using computing resources of the provider network including a plurality of file servers and a storage system;
maintaining, by one of the plurality of file servers associated with a respective one of a plurality of file systems provided by the distributed storage service, a block pool for the file system indicating respective block identifiers of a plurality of blocks in the storage system, wherein the blocks are allocated by the storage system to the file system but not assigned to a particular file system object in the file system;
receiving, by the file server, a request for the file system, wherein the request indicates a file system operation that requires allocation of one or more new blocks for a file system object in the storage system;
writing, by the file server, one or more journal entries to a metadata journal maintained in the storage system, the one or more journal entries specifying the file system operation and one or more of the block identifiers indicated in the block pool for the one or more new blocks;
sending, by the file server, a response message to the request indicating that the file system operation has completed; and
committing the file system operation specified by the one or more journal entries in the metadata journal to the storage system subsequent to sending the response message, wherein said committing comprises assigning the one or more blocks to the file system object.

2. The method as recited in claim 1, further comprising writing, by the distributed storage service, file system data to at least one of the one or more new blocks indicated by the one or more block identifiers.

3. The method as recited in claim 1, further comprising maintaining a free block list in a local memory of the file server indicating the blocks in the block pool.

4. The method as recited in claim 3, further comprising obtaining, by the file server, the one or more block identifiers indicated in the block pool from the free block list maintained in the local memory of the file server.

5. The method as recited in claim 3, further comprising:
transitioning the file system from the file server to a new file server, wherein the block pool is persisted in the storage system across the transition; and
generating, by the new file server, a new free block list in its local memory according to the block pool.

6. The method as recited in claim 1, further comprising:
monitoring a count of blocks in the block pool; and
pre-allocating one or more additional blocks to the block pool upon detecting that the count of blocks in the block pool is below a threshold.

7. The method as recited in claim 1, further comprising:
monitoring a block allocation rate for the file system; and
pre-allocating one or more additional blocks to the block pool upon detecting that the block allocation rate has increased.

8. The method as recited in claim 1, wherein the file system uses two or more different types of blocks, and said maintaining of the block pool includes maintaining respective lists of blocks for individual ones of the two or more types of blocks in the block pool.

9. The method as recited in claim 1, wherein said assigning the one or more blocks to the file system object comprises modifying one or more fields in a block header of a block to indicate that the block is assigned to the file system object.

10. One or more non-transitory computer-readable storage media storing program instructions that when executed on or across one or more processors cause the one or more processors to:
implement a file server in a distributed storage service implemented in a provider network, wherein the distributed storage service provides a plurality of file systems to a plurality of respective clients, the provider network is accessible via one or more intermediate networks, and the file systems are provided using computing resources of the provider network including a plurality of file servers and a storage system; and
cause the file server to:
maintain a block pool for a file system indicating respective block identifiers of a plurality of blocks in the storage system, wherein the blocks are allocated by the storage system to the file system but not assigned to a particular file system object in the file system;
receive a request for the file system, wherein the request indicates a file system operation that requires allocation of one or more new blocks for a file system object in the storage system;
write one or more journal entries to a metadata journal maintained in the storage system, the one or more journal entries specifying the file system operation and one or more of the block identifiers indicated in the block pool for the one or more new blocks; and
send a response message to the request indicating that the file system operation has completed, and
wherein the writing of the one or more journal entries to the metadata journal causes the storage system to commit the file system operation to the storage system subsequent to sending the response message by the file server, said committing comprising assigning the one or more blocks to the file system object.

11. The one or more non-transitory computer-readable storage media as recited in claim 10, wherein the program instructions when executed on or across the one or more processors cause the file server to:
maintain a free block list in local memory indicating the blocks in the block pool.

12. The one or more non-transitory computer-readable storage media as recited in claim 11, wherein the program instructions when executed on or across the one or more processors cause the file server to:
in response to a transition of the file system from an old file server to the file server, obtain the block pool for the file system from the storage system, and generate the free block list in the local memory according to the block pool.

13. The one or more non-transitory computer-readable storage media as recited in claim 10, wherein the program instructions when executed on or across the one or more processors cause the file server to:
add one or more additional blocks to the block pool upon detecting that the count of blocks in the block pool is below a threshold or upon detecting that a block allocation rate for the file system has increased.

14. The one or more non-transitory computer-readable storage media as recited in claim 10, wherein the program instructions when executed on or across the one or more processors cause the file server to:

determine that another write of another journal entry to the metadata journal was not successful, wherein the other write is generated by another request to the file system; and in response to the determination that other write is not successful, notify an access node that the other request is not successful.

15. The one or more non-transitory computer-readable storage media as recited in claim 10, wherein the program instructions when executed on or across the one or more processors cause the file server to send the response message to the request asynchronously from the committing of the file system operation at the storage system.

16. A system, comprising:

one or more hardware processors with associated memory that implement a distributed storage service in a provider network, configured to:

provide a plurality of file systems to a plurality of respective clients, wherein the provider network is accessible via one or more intermediate networks, and the file systems are provided using computing resources of the provider network including a plurality of file servers and a storage system; and wherein one of the plurality of file servers associated with a respective one of a plurality of file systems is configured to:

maintain a block pool for the file system indicating respective block identifiers of a plurality of blocks in the storage system, wherein the blocks are allocated by the storage system to the file system but not assigned to a particular file system object in the file system;

receive a request for the file system, wherein the request indicates a file system operation that requires allocation of one or more new blocks for a file system object in the storage system;

write one or more journal entries to a metadata journal maintained in the storage system, the one or more journal entries specifying the file system operation and one or more of the block identifiers indicated in the block pool for the one or more new blocks; and send a response message to the request indicating that the file system operation has completed; and wherein the storage system is configured to:

commit the file system operation specified by the one or more journal entries in the metadata journal subsequent to sending the response message by the file server, wherein said committing comprises assigning the one or more blocks to the file system object.

17. The system as recited in claim 16, wherein the file server is configured to:

maintain a free block list in local memory indicating the blocks in the block pool.

18. The system as recited in claim 17, wherein the file server is configured to:

determine that the file system is to be migrated to another file server;

persist the free block list in local memory to the storage system to be loaded by the other file system.

19. The system as recited in claim 17, wherein the other file server is configured to:

attempt a write barrier operation on the metadata journal in the storage system; and if the write barrier operation is successful, add a journal entry to the metadata journal indicating that the other file server is associated with the file system.

20. The system as recited in claim 17, wherein the file server is configured to:

in response to a determination that the file system is to be converted from a low-latency mode to a high-latency mode:

stop writes to the metadata journal for the file system; and flush contents of the metadata journal generated by the file server to the storage system.

\* \* \* \* \*